(12) United States Patent  (10) Patent No.: US 8,630,904 B2
Yoo  (45) Date of Patent: Jan. 14, 2014

(54) TRANSACTION AUTHENTICATION WITH A VARIABLE-TYPE USER-STORED ACCOUNT IDENTIFIER

(75) Inventor: David Yoo, San Mateo, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 13/465,432

(22) Filed: May 7, 2012

(65) Prior Publication Data

US 2013/0211932 A1 Aug. 15, 2013

Related U.S. Application Data

(60) Provisional application No. 61/598,647, filed on Feb. 14, 2012.

(51) Int. Cl.
*G06Q 20/00* (2012.01)

(52) U.S. Cl.
USPC ........... 705/16; 705/26.35; 713/155; 380/277

(58) Field of Classification Search
None
See application file for complete search history.

(56) References Cited

U.S. PATENT DOCUMENTS

| | | | |
|---|---|---|---|
| 6,535,855 B1 * | 3/2003 | Cahill et al. | 705/346 |
| 2005/0105745 A1 * | 5/2005 | Bowen et al. | 381/89 |
| 2005/0187873 A1 | 8/2005 | Labrou et al. | |
| 2007/0198432 A1 | 8/2007 | Pitroda et al. | |
| 2008/0010190 A1 | 1/2008 | Rackley, III et al. | |
| 2008/0208762 A1 | 8/2008 | Arthur et al. | |
| 2009/0070205 A1 | 3/2009 | Altberg et al. | |
| 2009/0104888 A1 | 4/2009 | Cox | |
| 2009/0138302 A1 | 5/2009 | Breznik et al. | |
| 2010/0312703 A1 * | 12/2010 | Kulpati et al. | 705/44 |
| 2011/0035302 A1 | 2/2011 | Martell et al. | |
| 2011/0217994 A1 * | 9/2011 | Hirson et al. | 455/466 |
| 2012/0173413 A1 | 7/2012 | Yoo | |
| 2012/0215609 A1 | 8/2012 | Yoo | |
| 2012/0215619 A1 | 8/2012 | Yoo | |

OTHER PUBLICATIONS

International Application No. PCT/US2012/024912, International Filing Date: Feb. 13, 2012, International Search Report and Written Opinion mailed on Jun. 8, 2012.
International Application No: PCT/US11/66824, International Filing Date: Dec. 22, 2011, International Search Report and Written Opinion, mailed on Apr. 19, 2012.

\* cited by examiner

*Primary Examiner* — Luna Champagne
(74) *Attorney, Agent, or Firm* — Stephen M. De Klerk

(57) ABSTRACT

Each of a plurality of consumer accounts in a data store has a first consumer account identifier. Login information is received from a consumer device over the network interface device. The first consumer account identifier is received from the consumer device and stored in association the consumer account. The first consumer account identifier is storable as one of at least two types of identifiers and the storing by the consumer device of the first consumer account identifier is only permitted upon successful login based on the login information. The charge request is received over a network interface device, the charge request including the amount and the second consumer account identifier. A selected one of the consumer accounts is identified by associating one of the first consumer account identifiers with the second consumer account identifier, and the charge request is processed based on an account detail of the selected consumer account.

30 Claims, 51 Drawing Sheets

Merchant Campaigns powered by •boku

[Campaigns] [Transactions]

Welcome back Skell!
Need Help?  Log out

Campaign Dashboard  [New Campaign]

Starbucks  ↻ Running
6/14/2011 – 6/17/2011
$1.00 Off  Locations: Coffee shops, Lunch spots
View Report

Jamba Juice  📅 Scheduled
6/25/2011 – 6/29/2011
$1.00 Off  Locations: Coffee shops, Lunch spots
Edit Delete

Smoothie Bar  📅 Scheduled
6/14/2011 – 7/17/2011
$1.00 Off  Locations: Coffee shops, Lunch spots
Edit Delete

Coffee Hut  ✓ Complete
5/14/2011 – 5/17/2011
$1.50 Off  Locations: Coffee shops, Lunch spots
Edit Delete Need Help?  BOKU Corporate Site  Privacy Policy  Terms of Use  Contact Us  |  ©2011 BOKU, Inc.

FIG. 5G

Step 3: Personal Information

| | |
|---|---|
| email address | jshade@zembla.com |

| | |
|---|---|
| date of birth | April 22, 1899 |

| | |
|---|---|
| address 1 | 8 Duncannon St. |
| address 2 | |
| postal code | WC2N 4JF |

By clicking the "Continue" button below, you acknowledge your receipt, review and acceptance of our Privacy Statement and an Important Notice Concerning User Privacy.

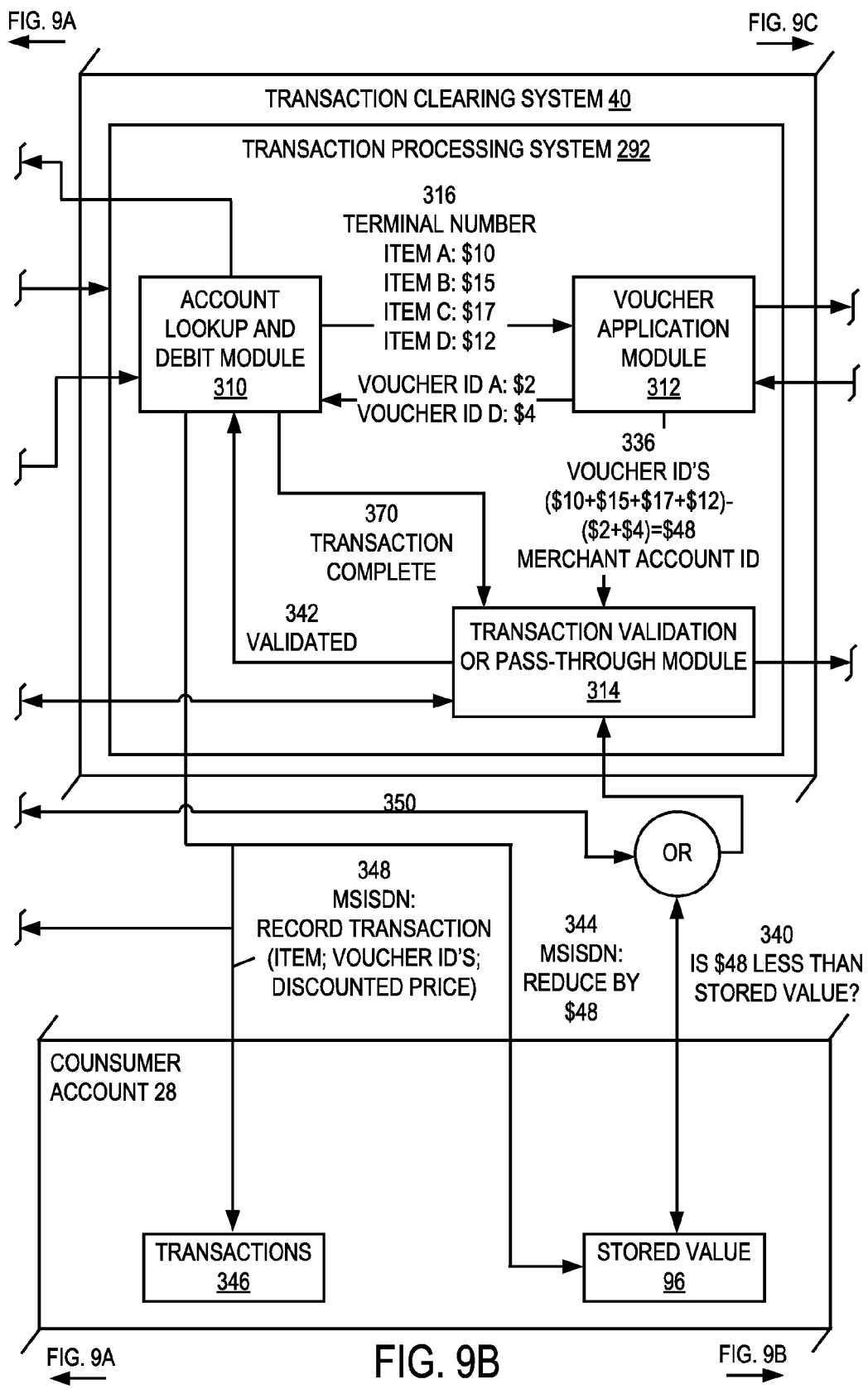

TRANSACTION AUTHENTICATION WITH A VARIABLE-TYPE USER-STORED ACCOUNT IDENTIFIER

CROSS-REFERENCE TO RELATED APPLICATIONS

This nonprovisional application claims priority from U.S. Provisional Patent Application No. 61/598,647, filed on Feb. 14, 2012, all of which is incorporated herein by reference.

BACKGROUND OF THE INVENTION

1). Field of the Invention

This invention relates generally to a transactions network and to a method and system for managing electronic transactions.

2). Discussion of Related Art

A customer who visits a store often uses a point-of-sale instrument such as a bank card or a credit card to pay for an item or items that are being purchased. The point-of-sale instrument communicates with a point-of-sale device such as a credit card reader. The point-of-sale device forms part of a point-of-sale network that communicates a charge request to a merchant acquirer computer system and the merchant acquirer computer system routes the charge to an issuer computer system forming part of the point-of-sale network. The issuer computer system may for example include a credit card account to which an amount recorded on the point-of-sale device can be charged if sufficient funds or credit are available. The issuer computer system then returns a confirmation through the merchant acquirer computer system to the point-of-sale device that the transaction is good, whereafter an operator of the point-of-sale device will allow the customer to leave the store with the goods that are being purchased.

Electronic transactions can be conducted in a similar manner. In the case of electronic transactions, a user can enter details of a point-of-sale instrument into an interface. Once the details are received, a charge request can be transmitted to a merchant acquirer computer system, and then be processed in a similar manner.

SUMMARY OF THE INVENTION

The invention provides a computer system for managing electronic transactions, including a server computer system including a processor, a computer-readable medium connected to the processor, a network interface device connected to the processor and a set of instructions on the computer-readable medium, the set of instructions being executable by the processor and further including a data store, a plurality of consumer accounts stored in the data store, each consumer account having a first consumer account identifier, a communication and routing module that receives a charge request over the network interface device, the charge request including an amount and a second consumer account identifier and identifies a selected one of the consumer accounts by associating one of the first consumer account identifiers with the second consumer account identifier, and a transaction processing system that processes the charge request based on an account detail of the selected consumer account.

The system may further include a login module receiving login information from a consumer device over the network interface device, an identifier storing module receiving the first consumer account identifier from the consumer device and storing the first consumer account identifier in association with the consumer account, the storing by the consumer device of the first consumer account identifier only being permitted upon successful login based on the login information.

The system may further include that the first consumer account identifier may be storable as one of at least two types of identifiers.

The system may further include that the two types of identifiers may have different lengths.

The system may further include that the first consumer account identifier may be variable to be at least two of a PAN, an MSISDN, an email address, a social security number, and a driver's license number.

The system may further include that the first consumer account identifier may be an MSISDN.

The system may further include that the second consumer account identifier may not be a PAN.

The system may further include that each consumer account may have a respective a first PIN and the charge request includes a second PIN, the processing of the charge request only being permitted upon a favorable comparison of the first PIN and the second PIN.

The system may further include that the second consumer account identifier may be an MSISDN.

The system may further include that the second consumer account identifier may not be an MSISDN.

The system may further include an authorization module transmitting an authorization request over the network interface device to a consumer device and receiving a response to the authorization request over the network interface device from the consumer device, wherein the charge request is processed if the response is an authorization response.

The system may further include that the authorization module may extract an MSISDN from the consumer account, wherein the consumer device is a mobile phone having the MSISDN that is extracted from the account to contact the mobile phone.

The system may further include a point-of-sale device receiving the second consumer account identifier.

The system may further include that the second consumer account identifier may be an MSISDN.

The system may further include that the point-of-sale device may transmit the charge request to a merchant acquirer computer system, which routes the charge request to the processor.

The system may further include that the set of instructions may further include a stored value in the consumer account, a funding module receiving a top-up instruction from a consumer account funding infrastructure, and increasing the stored value based on the top-up instruction, wherein the transaction processing system may also include an account lookup and debit module that reduces the stored value based on the amount.

The system may further include that the transaction processing system may include a transaction validation module that compares the stored value with the amount, wherein the account lookup and debit module only reduces the stored value with the amount, wherein the stored value is (i) only reduced if the stored value is at least as much as the amount and (ii) not reduced if the stored value is less than the amount, and transmits a confirmation over the network interface device (i) to accept the charge request only reduced if the stored value is at least as much as the amount and (ii) to deny the charge request if the stored value is less than the amount.

The system may further include that the set of instructions may also include a payment source storing module storing a plurality of payment sources associated with the respective consumer account having the respective consumer account identifier, a payment source selector set upon receiving a payment source selection over the network interface device to indicate a selected one of the payment sources, the payment source selector indicating a selected one of the payment sources based on the payment source selection, and the transaction processing system determining a payment source selected with the payment source selector, wherein the charge request is processed based on the payment source selected by the payment source selector.

The system may further include that a first of the payment sources may be a stored value in the consumer account, wherein the charge request is processed by reducing the stored value if the payment selector is set to use the first payment source.

The system may further include that a second of the payment sources may include routing information for a bank account, wherein the charge request is processed by transmitting a pass-through request over the network interface device based on the routing information if the payment selector is set to use the second payment source.

The system may further include that the transaction processing system may include a transaction bypass module that may either (i) reduce the stored value if the payment selector is set to use the first payment source, or (ii) transmit the pass-through request over the network interface device based on the routing information if the payment selector is set to use the second payment source.

The system may also include that the set of instructions may further include a login module receiving login information from a user computer system over the network interface device, access to the payment source storing module by the user computer system to store the plurality of payment sources only being permitted upon successful login based on the login information.

The invention also provides a computer-based method of managing electronic transactions including storing, with a processor, a plurality of consumer accounts in a data store, each consumer account having a first consumer account identifier, receiving, with the processor, a charge request over a network interface device, the charge request including an amount and a second consumer account identifier, identifying, with the processor, a selected one of the consumer accounts by associating one of the first consumer account identifiers with the second consumer account identifier, and processing, with the processor, the charge request based on an account detail of the selected consumer account.

The method may further include receiving, with the processor, login information from a consumer device over the network interface device, receiving, with the processor, the first consumer account identifier from the consumer device, and storing the first consumer account identifier in association with the consumer account, the storing by the consumer device of the first consumer account identifier only being permitted upon successful login based on the login information.

The method may further include that the first consumer account identifier may be storable as one of at least two types of identifiers.

The method may further include that the two types of identifiers may have different lengths.

The method may further include that the first consumer account identifier may be variable to be at least two of a PAN, an MSISDN, an email address, a social security number, and a driver's license number.

The method may further include that the first consumer account identifier may be an MSISDN.

The method may further include that the second consumer account identifier may not be a PAN.

The method may further include that each consumer account may have a respective a first PIN and the charge request includes a second PIN, the processing of the charge request only being permitted upon a favorable comparison of the first PIN and the second PIN.

The method may further include that the second consumer account identifier may be an MSISDN.

The method may further include that the second consumer account identifier may not be an MSISDN.

The method may further include transmitting, with the processor, an authorization request over the network interface device to a consumer device and receiving, with the processor, a response to the authorization request over the network interface device from the consumer device, wherein the charge request is processed if the response is an authorization response.

The method may further include extracting an MSISDN from the consumer account, wherein the consumer device is a mobile phone having the MSISDN that is extracted from the account to contact the mobile phone.

The method may further include receiving the second consumer account identifier in a point-of-sale device.

The method may further include that the second consumer account identifier may be an MSISDN.

The method may further include transmitting, with the point-of-sale device, the charge request to a merchant acquirer computer system, which routes the charge request to the processor and may further include saving, with the processor, a stored value in the consumer account, receiving, with the processor, a top-up instruction from a consumer account funding infrastructure, increasing, with the processor, the stored value based on the top-up instruction, reducing, with the processor, the stored value based on the amount; and may also include comparing, with the processor, the stored value with the amount, wherein the stored value is (i) only reduced if the stored value is at least as much as the amount and (ii) not reduced if the stored value is less than the amount and transmitting, with the processor, a confirmation over the network interface device to (i) to accept the charge request only reduced if the stored value is at least as much as the amount and (ii) to deny the charge request if the stored value is less than the amount.

The method may further include storing, with the processor, a plurality of payment sources associated with the respective consumer account having the respective consumer account identifier, receiving, with the processor, a payment source selection over the network interface device to indicate a selected one of the payment sources, setting, with the processor, a payment source selector to indicate a selected one of the payment sources based on the payment source selection, and determining, with the processor, a payment source selected with the payment source selector, wherein the charge request is processed based on the payment source selected by the payment source selector.

The method may further include that a first of the payment sources may be a stored value in the consumer account, wherein the charge request is processed by reducing the stored value if the payment selector is set to use the first payment source.

The method may further include that a second of the payment sources may include routing information for a bank account, wherein the charge request is processed by transmitting a pass-through request over the network interface device based on the routing information if the payment selector is set to use the second payment source.

The method may further include receiving, with the processor, login information from a user computer system over the network interface device, the storing by the user computer system of the plurality of payment sources only being permitted upon successful login based on the login information.

BRIEF DESCRIPTION OF THE DRAWINGS

The invention is described by way of example with reference to the accompanying drawings, wherein:

FIG. 3B is a view similar to FIG. 3A for the consumer to manage funding sources;

FIG. 3D is view similar to FIG. 3C for the consumer to select automatic top-up of the stored value;

FIG. 5C is a view similar to FIG. 5B where the merchant can upload a voucher image;

FIG. 5G is a view similar to FIG. 5F displaying multiple campaigns based on the merchant account;

FIG. 7B is a view similar to FIG. 7A for the consumer to enter further details of the account;

DETAILED DESCRIPTION OF THE INVENTION

Figure 1:
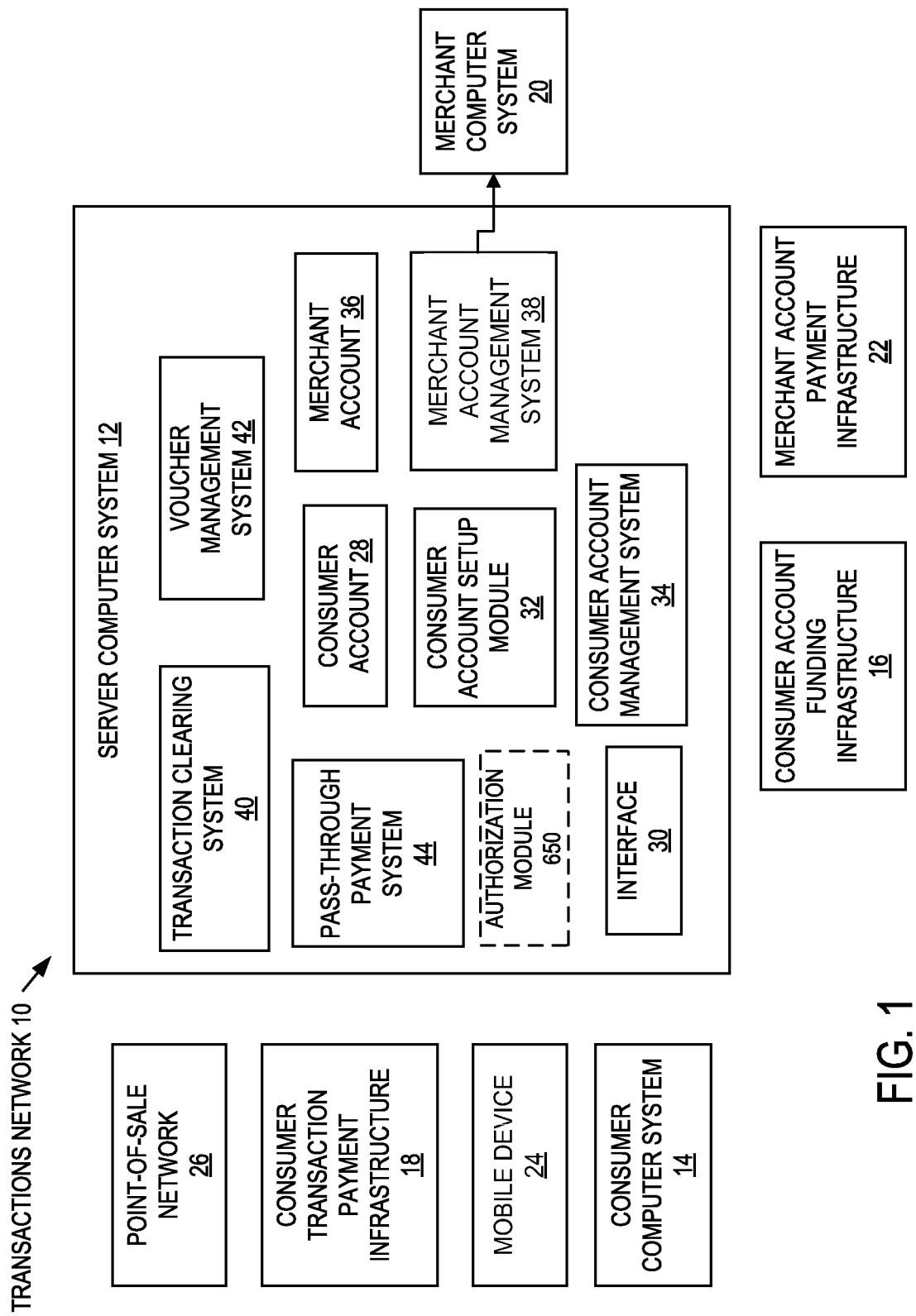
FIG. 1 is a block diagram of a transactions network according to an embodiment of the invention.

FIG. 1 of the accompanying drawings illustrates a transactions network 10, according to an embodiment of the invention, including a server computer system 12, a consumer computer system 14, a consumer account funding infrastructure 16, a consumer transaction payment infrastructure 18, a merchant computer system 20, a merchant account payment infrastructure 22, a mobile device 24, and a point-of-sale network 26.

The server computer system 12 includes a plurality of consumer accounts (only one consumer account 28 shown), an interface 30 for establishing a consumer account 28, a consumer account setup module 32, a consumer account management system 34, a plurality of merchant accounts (only one merchant account 36 shown), a merchant account management system 38, a transaction clearing system 40, a voucher management system 42, a pass-through payment system 44, and an optional authorization module 650.

Figure 2A:
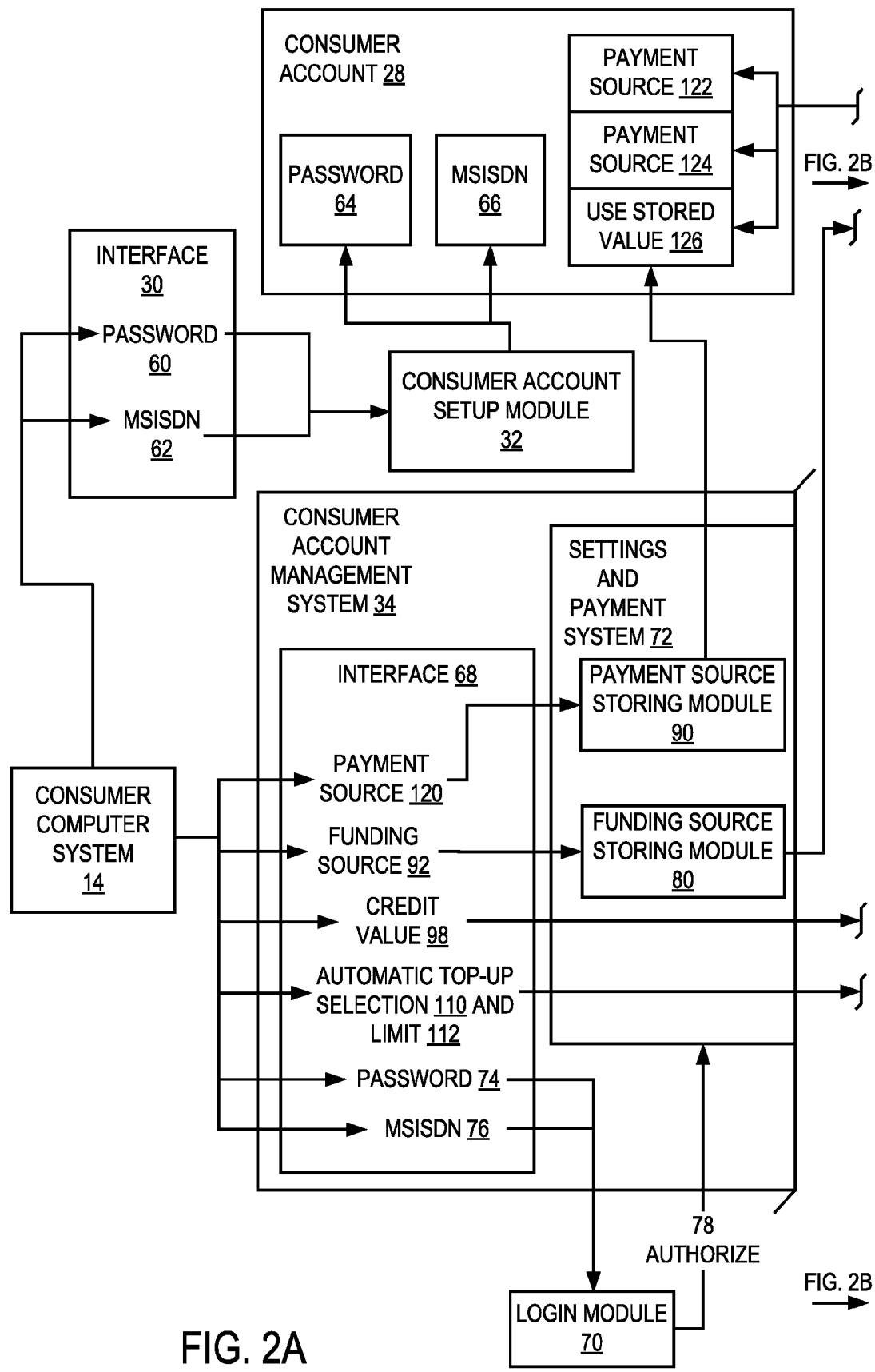
FIGS. 2A and B are a block diagram illustrating interaction between a consumer computer system and a consumer account setup module to establish a consumer account, interaction between the consumer computer system and a settings and payment system to store a funding source, transfer funds from a consumer account funding infrastructure to a stored value, set automatic top-up of the stored value, and select payment sources for pass-through payment.

The consumer computer system 14 is connected over the Internet to the server computer system 12 and can download via the interface 30. As shown in FIG. 2A, a consumer at the computer system 14 establishes a consumer account 28 by providing a password 60 and a phone number, also referred to herein as a "Mobile Subscriber Integrated Services Digital Network Number" or "MSISDN" 62 through the interface 30 to the consumer account setup module 32. The consumer account setup module 32 then establishes one consumer account 28 with a password 64 corresponding to the password 60 and a MSISDN 66 corresponding to the MSISDN 62. The MSISDN 66 serves as a consumer account identifier for the respective consumer account 28. Each consumer account 28 will therefore have a different MSISDN 66.

The consumer account management system 34 includes an interface 68, a login module 70, and a settings and payment system 72. A consumer at the consumer computer system 14 can download via the interface 68 onto the consumer computer system 14. The consumer at the consumer computer system 14 can then enter a password 74 and a MSISDN 76 into the interface 68. The password 74 and the MSISDN 76 are transmitted from the consumer computer system 14 to the server computer system 12 and are received by the login module 70. The login module 70 then compares the password 74 with the password 64 of the consumer account 28 and compares the MSISDN 76 with the MSISDN 66 of the consumer account 28. Upon a favorable comparison of the passwords 74 and 64 and the MSISDNs 76 and 66, the login module 70 at 78 authorizes access to the functionality of the settings and payment system 72 for the consumer account 28 having the respective MSISDN 66 corresponding to the MSISDN 76. The authorization 78 is thus not provided to the consumer computer system 14 upon an unfavorable login through the login module 70.

Referring to FIGS. 2A and B in combination, the settings and payment system 72 includes a funding source storing module 80, a funding module 82, an account lookup and credit module 84, an automatic top-up settings module 86, an automatic top-up execution module 88, and a payment source storing module 90.

A consumer at the consumer computer system 14 can enter a funding source 92 through the interface 68 into the settings and payment system 72. The funding source storing module 80 then stores the funding source 92 as a funding source 94 within the consumer account 28 having the appropriate MSISDN 66. The consumer account 28 also has a stored value 96 that is initially set at $0. Should the consumer at the consumer computer system 14 wish to increase the stored value 96, the consumer enters a credit value 98 through the interface 68 into the settings and payment system 72. The funding module 82 receives the credit value 98. The credit value 98 may for example be for $40. At 100, the funding module 82 retrieves the funding source 94 and the MSISDN 66 from the consumer account 28. At 102, the funding module 82 communicates with the consumer account funding infrastructure 16 by transmitting a funding request. The consumer account funding infrastructure 16 may for example include a bank account number. The funding source 92 includes routing information for the bank account number. At 102, the funding module 82 thus uses the routing information of the funding source 92 to reach the respective bank account number in the consumer account funding infrastructure 16. At 102, the respective credit value 98, in the present example $40, is also transmitted to the consumer account funding infrastructure 16. The signal transmitted at 102 also includes an IP address of the server computer system 12 for purposes of return communication.

The consumer account infrastructure 16 then makes a determination whether sufficient funds are available within the consumer account funding infrastructure 16 to allow for a transfer of the credit value 98. At 104, the consumer account funding infrastructure 16 utilizes the IP address received at 102 to transmit a top-up confirmation to the funding module 82. A top-up confirmation is only transmitted if sufficient funds are available within the consumer account funding infrastructure 16 to cover the credit value 98. If insufficient funds are available within the consumer account funding infrastructure 16, then no top-up confirmation will be transmitted at 104 and a decline signal will instead be transmitted to the funding module 82.

If a decline signal is received by the funding module 82 from the consumer account funding infrastructure 16, the funding module 82 will update the interface 68 to indicate that the stored value 96 will not be increased. If the top-up confirmation 104 is received by the funding module 82, the funding module at 106 then transmits the MSISDN 66 received at 100 and the credit value 98 to the account lookup and credit module 84. The account lookup and credit module 84 then, at 108, utilizes the MSISDN 66 to access the respective consumer account 28 and increases the stored value 96 by the credit value 98. In the present example the stored value 96 is thus increased from $0 to $40.

The consumer at the consumer computer system 14 may also enter an automatic top-up selection 110 and limit 112 through the interface 68 into the settings and payment system 72. The automatic top-up settings module 86 then stores the automatic top-up selection 110 as an automatic top-up selector 114 in the consumer account 28 and stores the automatic top-up limit 112 as an automatic top-up limit 116 in the consumer account 28. The automatic top-up selector 114 indicates whether an automatic top-up should be performed, or not, based on the automatic top-up selection 110. The automatic top-up limit 116 is a value below which the consumer does not want the stored value 96 to go.

The automatic top-up execution module 88 periodically, e.g. daily, reads the automatic top-up selector 114 and the automatic top-up limit 116. The automatic top-up execution module 88 only executes the funding module 82 if the automatic top-up selector 114 is set to an "on" status for automatic top-up and the stored value 96 is below the automatic top-up limit 116. The automatic top-up execution module 88 therefore does not execute the funding module 82 if either the automatic top-up selector 114 is set to "off" indicating no automatic top-up, or if the automatic top-up limit 116 is above the stored value 96.

When the automatic top-up execution module 88 executes the funding module 82, the automatic top-up execution module 88 transmits a credit value to the funding module 82 and the funding module 82 then transmits the credit value in the funding request 102 to the consumer account funding infrastructure 16. The credit value may for example be the difference between the stored value 96 and the automatic top-up limit 116. Upon a favorable top-up confirmation 104, the funding module 82 then automatically transmits the MSISDN 66 and a credit value at 106 to the account lookup and credit module 84 for increasing the stored value 96 by the credit value. The stored value 96 is thus automatically updated based on the automatic top-up selector 114 and the automatic top-up limit 116.

The consumer at the consumer computer system 14 can also enter a payment source 120 through the interface 68 into the settings and payment system 72. The payment source storing module 90 then stores the payment source 120 as a payment source 122 in the consumer account 28. The process may be repeated so that the consumer at the consumer computer system 14 can enter an additional payment source that is stored by the payment source storing module 90 as a payment source 124 in the consumer account 28. In addition, the consumer account 28 has a setting for use stored value 126. The consumer account 28 also has a payment source selector 128. The payment source selector 128 is set to point to only one of the payment sources 122 or 124, or to the setting for use stored value 126.

Figure 2B:
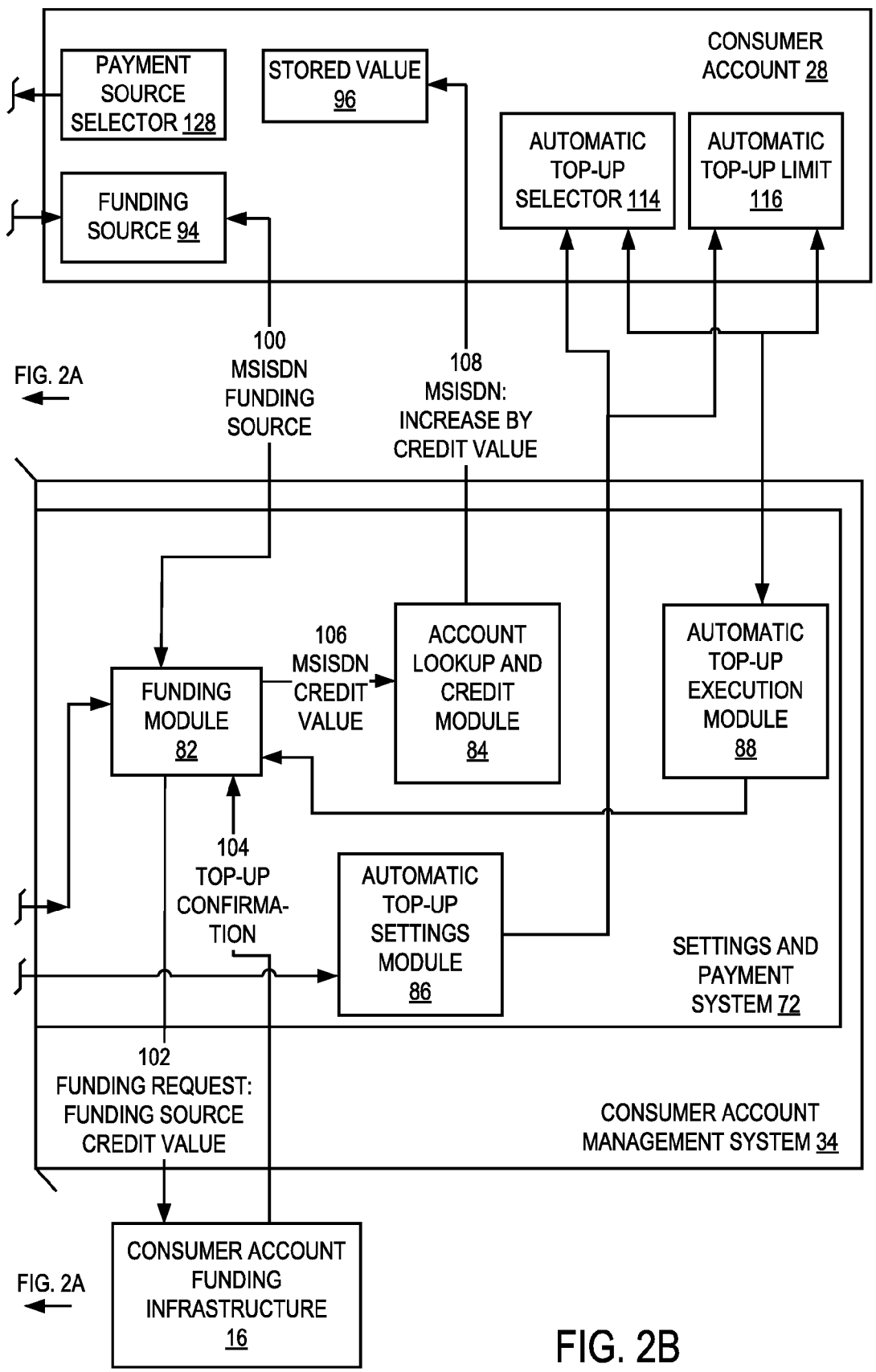
Figure 3A:
FIG. 3A is a screenshot that is displayed within a browser of the consumer computer system after logging into the consumer account and showing details of the consumer account.

FIG. 3A illustrates the interface 68 as it appears within a browser window of a browser application at the consumer computer system 14 in FIG. 2 after a consumer has entered the correct MSISDN and password. The screenshot in FIG. 3A allows for the consumer to update or modify personal information. Of significance is that the user can update a MSISDN in the field "Mobile Number."

Figure 3B:
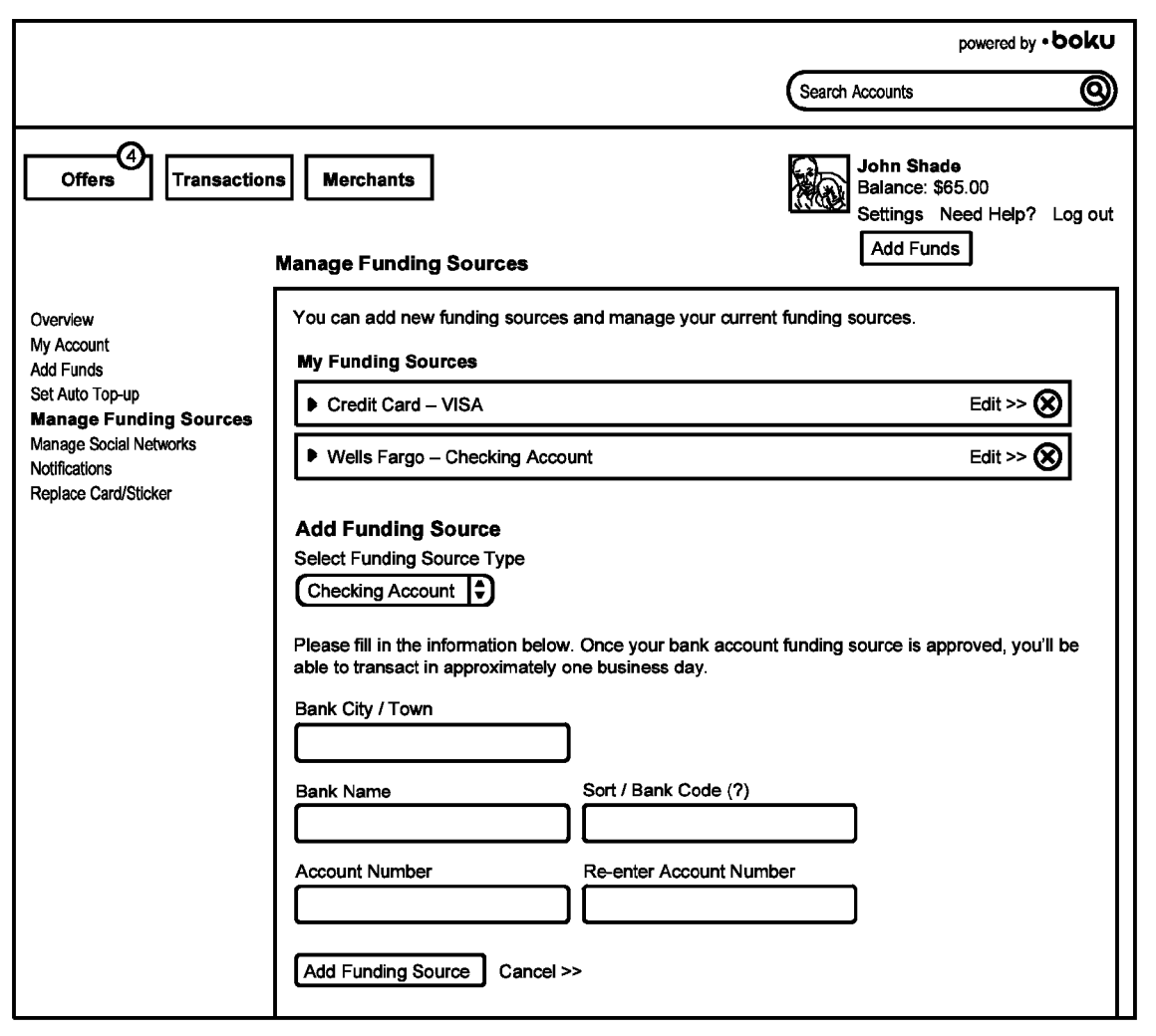

FIG. 3B illustrates a screenshot that allows for the consumer to manage funding sources such as the funding source 94 in FIG. 2B. Two funding sources are already stored, one for "Credit Card—VISA" and another for "Wells Fargo—Checking Account." The consumer also has the option of adding further funding sources, or to edit or delete existing funding sources.

Figure 3C:
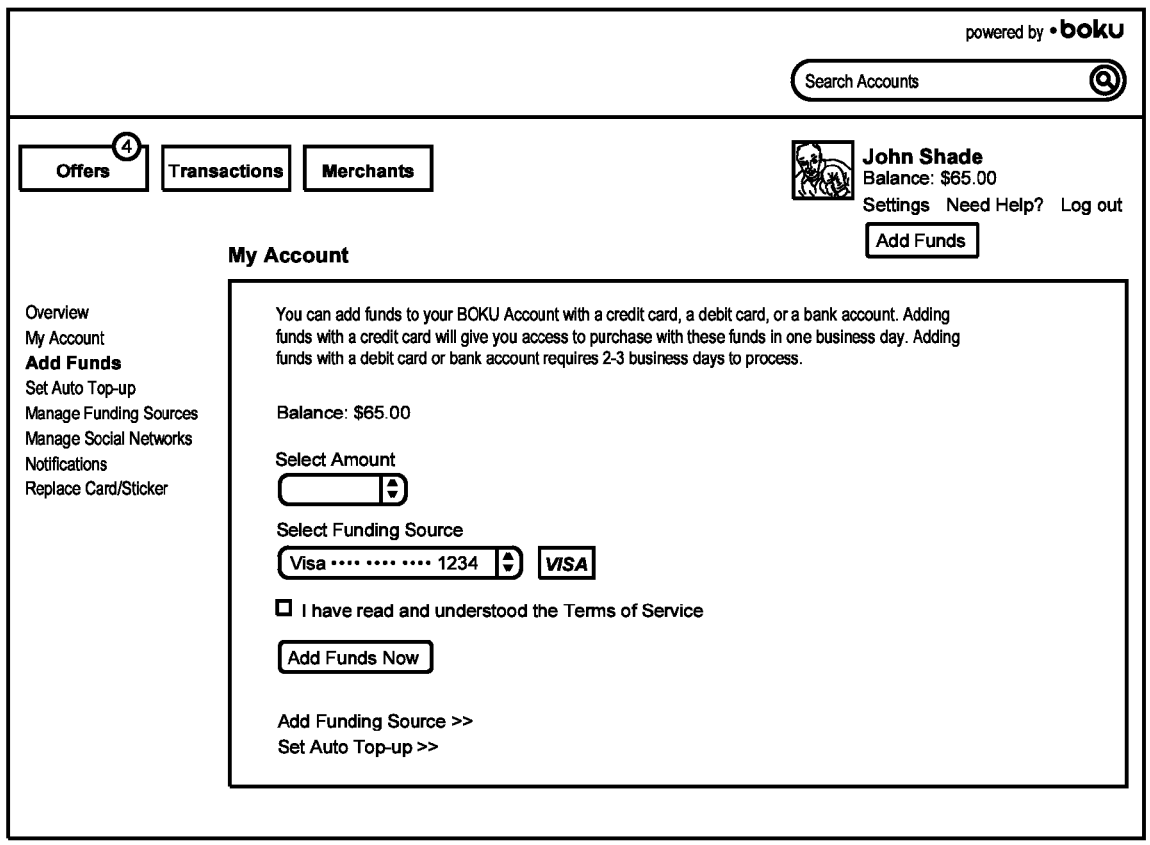
FIG. 3C is a view similar to FIG. 3B for the consumer to replenish the stored valued.

In FIG. 3C the consumer transfers funds from one of the funding sources to the stored value, i.e. from a funding source within the consumer account funding infrastructure 16 to the stored value 96 in FIG. 2B. Fields are provided for a credit amount ("Select Amount") and for the respective funding source ("Select Funding Source") which is to be used for the transfer.

Figure 3D:
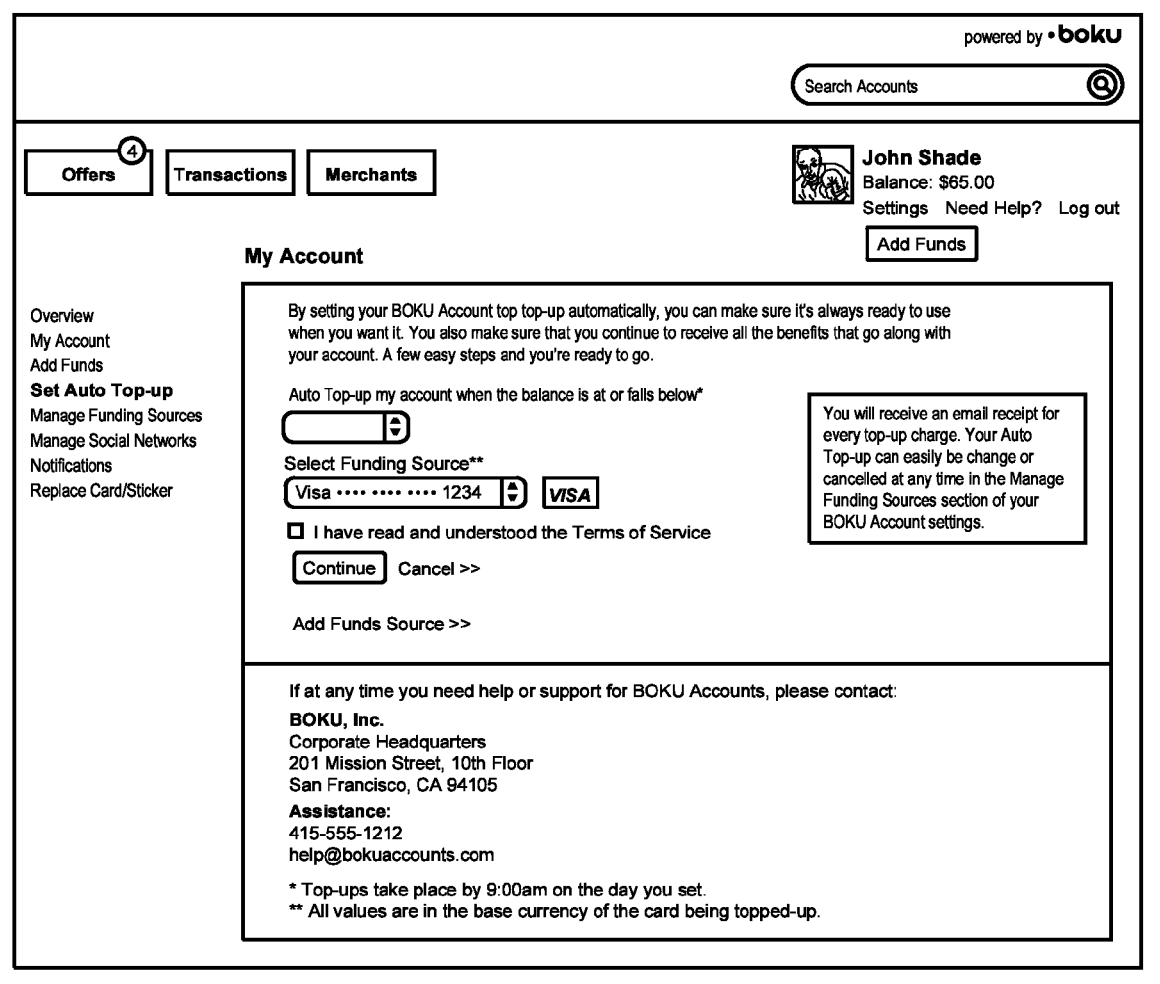

In FIG. 3D the consumer is given the option to select automatic top-up details of the stored value, as described with reference to FIG. 2B. A field is provided for the consumer to select automatic top-up when the account balance falls below a certain amount. If the field is left empty, the automatic top-up selector 114 in FIG. 2B will be set to "Off." If any amount is entered into the field, the automatic top-up selector 114 in FIG. 2B will be set to "On" and the respective amount selected would be stored in the automatic top-up limit 116 in FIG. 2B. The consumer is also given an option to select the respective funding source from which the automatic top-up should take place.

Figure 4A:
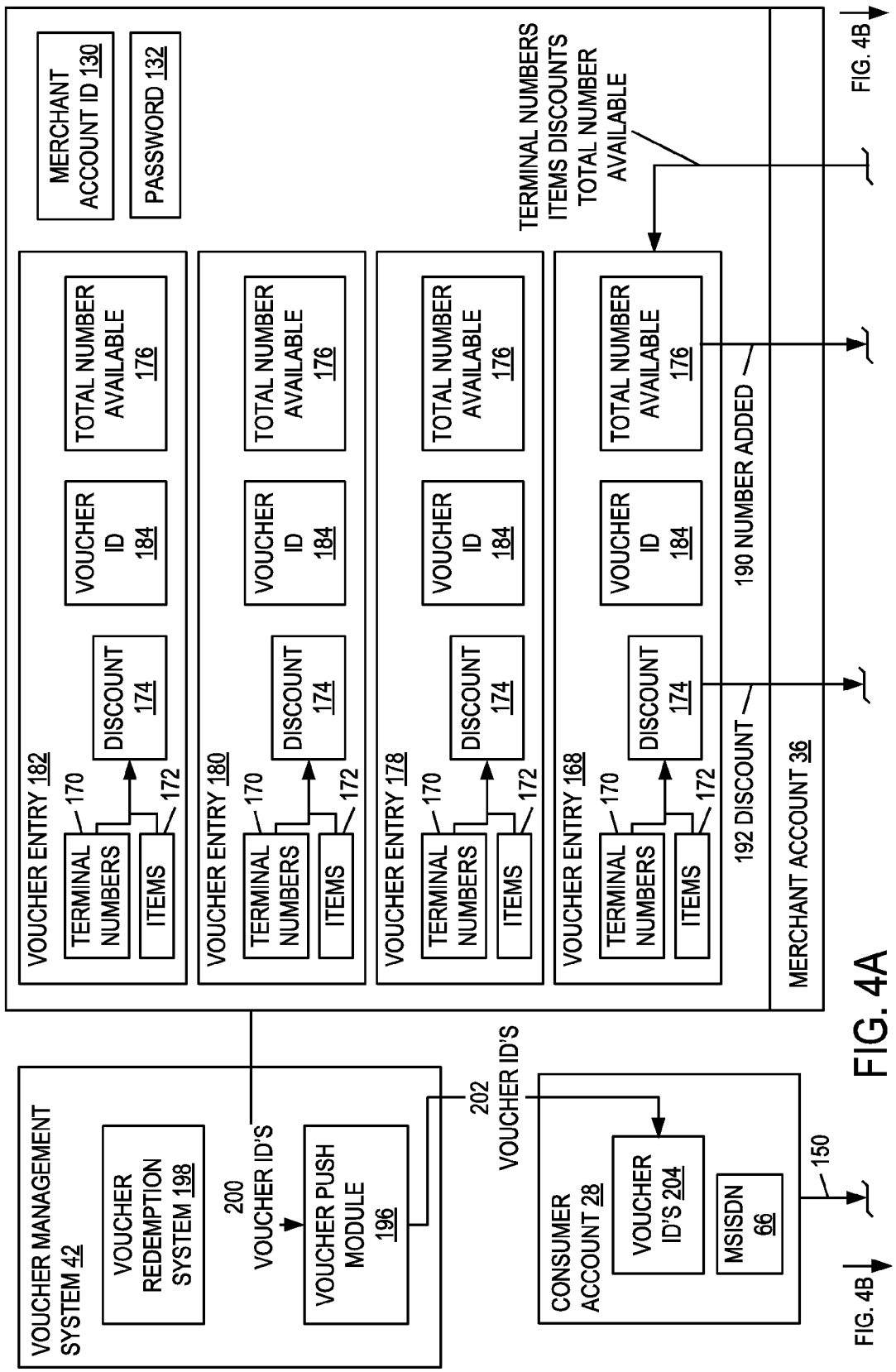
FIGS. 4A and B are a block diagram illustrating an interaction between a merchant computer system and a merchant account management system to establish offers in the form of vouchers, which are then forwarded by voucher management system and entered into one or more consumer accounts.

As shown in FIGS. 4A and B, the merchant account 36 is established by assigning a merchant account identifier (ID) 130 and a password 132. Each merchant account 36 will thus have a different merchant account ID 130.

The merchant account management system 38 includes an interface 134, a login module 136, an upload and payment module 138, and a consumer targeting system 140.

A merchant at the merchant computer system 20 can log into the merchant account 36 by downloading the interface 134 and entering a merchant account ID 142 and a password 144 via the interface 134 into the merchant account management system 38. The login module 136 then compares the merchant account ID 142 and the password 144 with the merchant account ID 130 and password 132 to identify and provide access to the respective merchant account 36. The login module 136 then at 146 authorizes access to the upload and payment module 138 by the merchant computer system 20 only for purposes of the respective merchant account 36 having the merchant account ID 130 matching the merchant account ID 142. At 148, the login module 136 similarly authorizes access to the consumer targeting system 140 by the merchant computer system 20.

At 150, the consumer targeting system 140 receives data from the consumer account 28 and all other consumer accounts. At 152, the merchant computer system 20 accesses the data received by the consumer targeting system 140 at 150. A merchant at the merchant computer system 20 can then selectively target a specific consumer account 28 or groups of consumer accounts based on the data received at 150. Table 1 illustrates selective targeting by select merchants.

TABLE 1

|  | Merchant Account 1 | Merchant Account 2 | Merchant Account 3 |
|---|---|---|---|
| Consumer Account 1 | Selective targeting | Selective targeting | No selective targeting |
| Consumer Account 2 | No selective targeting | Selective targeting | No selective targeting |
| Consumer Account 3 | Selective targeting | No selective targeting | Selective targeting |

The upload and payment module 138 includes a voucher upload module 154, a payment calculation module 156, and a payment module 158. A merchant at the merchant computer system 20 uses the interface 134 to enter voucher information, including terminal numbers 160, items 162, discounts 164 and the total number available 166. The voucher upload module 154 then stores a respective voucher entry 168 in or associated with the merchant account 36 having the merchant account ID 130. The voucher entry 168 includes terminal numbers 170 corresponding to the terminal numbers 160, items 172 corresponding to the items 162, a discount 174 corresponding to one of the discounts 164, and a total number available 176 corresponding to the total number available 166. By way of example, the terminal numbers 170 may be terminals 2 and 5, the items 172 may be one can of Coca-Cola™ and one can of Pepsi™, the discount 174 may be 50 cents and the total number available 176 may be 60.

Similarly, additional voucher entries 178, 180 and 182 can be entered from the merchant computer system 20 through the interface 134 and the voucher upload module 154. Each voucher entry 178, 180 and 182 has a respective data set for terminal numbers 170, items 172, a discount 174 and the total number available 176. Each voucher entry 168, 178, 180 and 182 also has a respective voucher ID 184.

Once a voucher entry, for example the voucher entry 168, has been uploaded into the merchant account 36, the payment calculation module 156 calculates a payment to be made based on the voucher entry. In the example, it is assumed that the voucher entry 168 was pre-existing with a certain number, for example 20 as the total number available. The payment calculation module 156 at 190 receives or calculates the number added to the total number available 176. In the present example, the total number available 176 has increased from 20 to 60, such that the number added is 40. The payment calculation module 156 at 192 also receives the discount 174. The payment calculation module 156 then multiplies the number added by the discount 174. In the present example, the number added is 40 and the discount is 50 cents, which results in a payment of $20.

The payment calculation module 156 then submits the $20 charge to the payment module 158. The merchant then enters a payment 194 into the interface 134, which is received by the payment module 158. The payment module 158 communicates with the merchant account payment infrastructure 22 by submitting a charge request and receiving a confirmation to either confirm or deny the charge request. In another example, the merchant account 36 may have a stored value 96 that can be updated from a funding source and the payment module 158 can decrement the stored value 96 by entering a debit against the stored value 96. The voucher management system 42 includes a voucher push module 196 and a voucher redemption system 198.

The voucher push module 196 at 200 receives all the voucher ID's 184 of the voucher entries 168, 178, 180 and 182. The voucher push module 196 at 202 then enters the voucher ID's 184 as voucher ID's 204 in the consumer account 28 and all other consumer accounts that have been targeted by a merchant. As such, merchant offers in the form of voucher ID's are associated with one of the consumer accounts 28 having a MSISDN 66 as a consumer account ID. The merchant offers in the form of the voucher ID's 204 can then be further processed based on the association of the voucher ID's 204 with the MSISDN 66 of the respective consumer account 28. In particular, the voucher ID's 204 can be transmitted to a mobile device 24 and be received by a mobile application that has been logged into the respective consumer account 28 by way of an identifier of the consumer account 28 having the MSISDN 66 as a consumer account identifier. As will be shown, it is the MSISDN 66 itself that serves as the identifier for login to the mobile application of the consumer account 28. The MSISDN 66 thus serves as a consumer account identifier for the consumer account 28 and as an identifier for the mobile application.

Figure 4B:
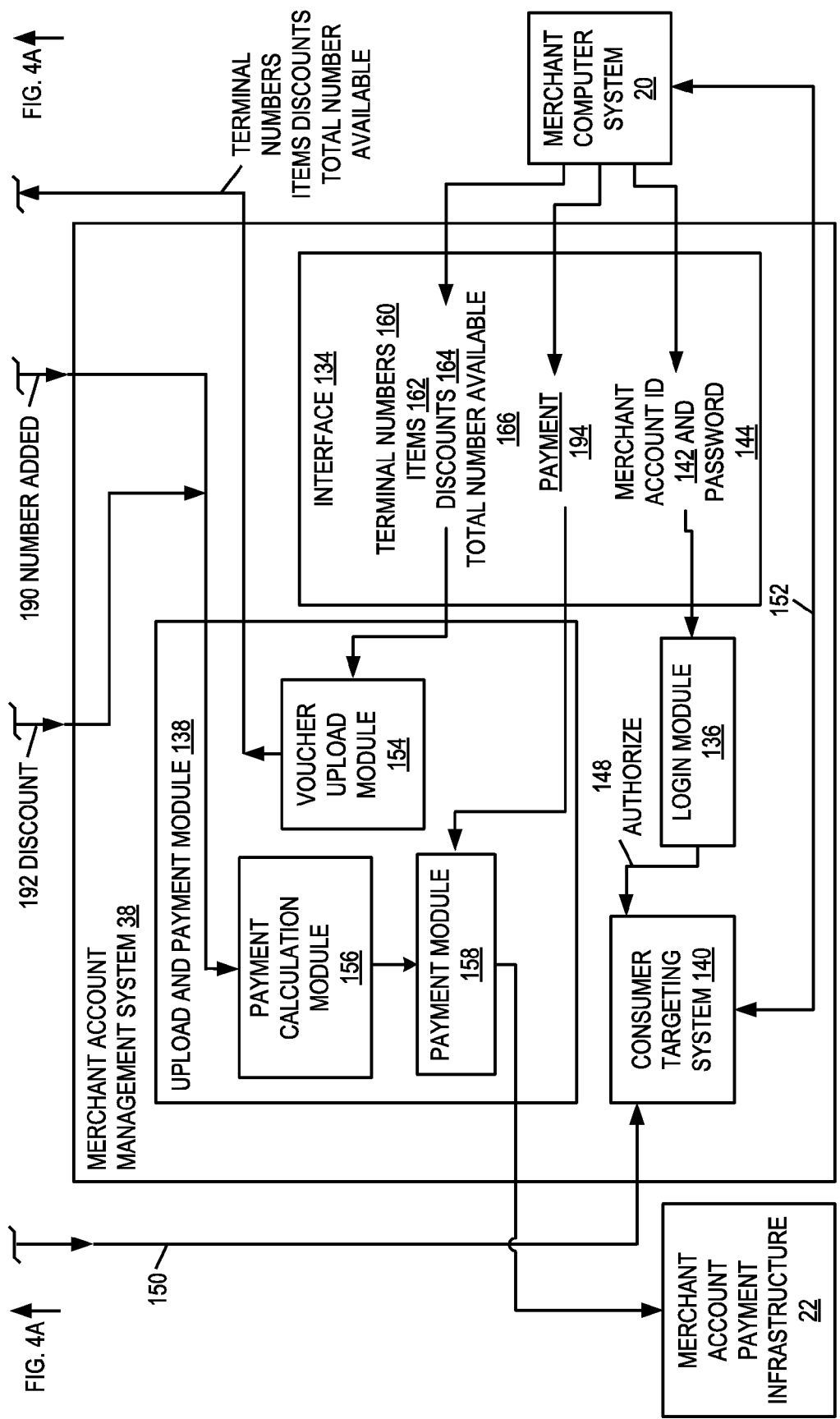
Figure 5A:
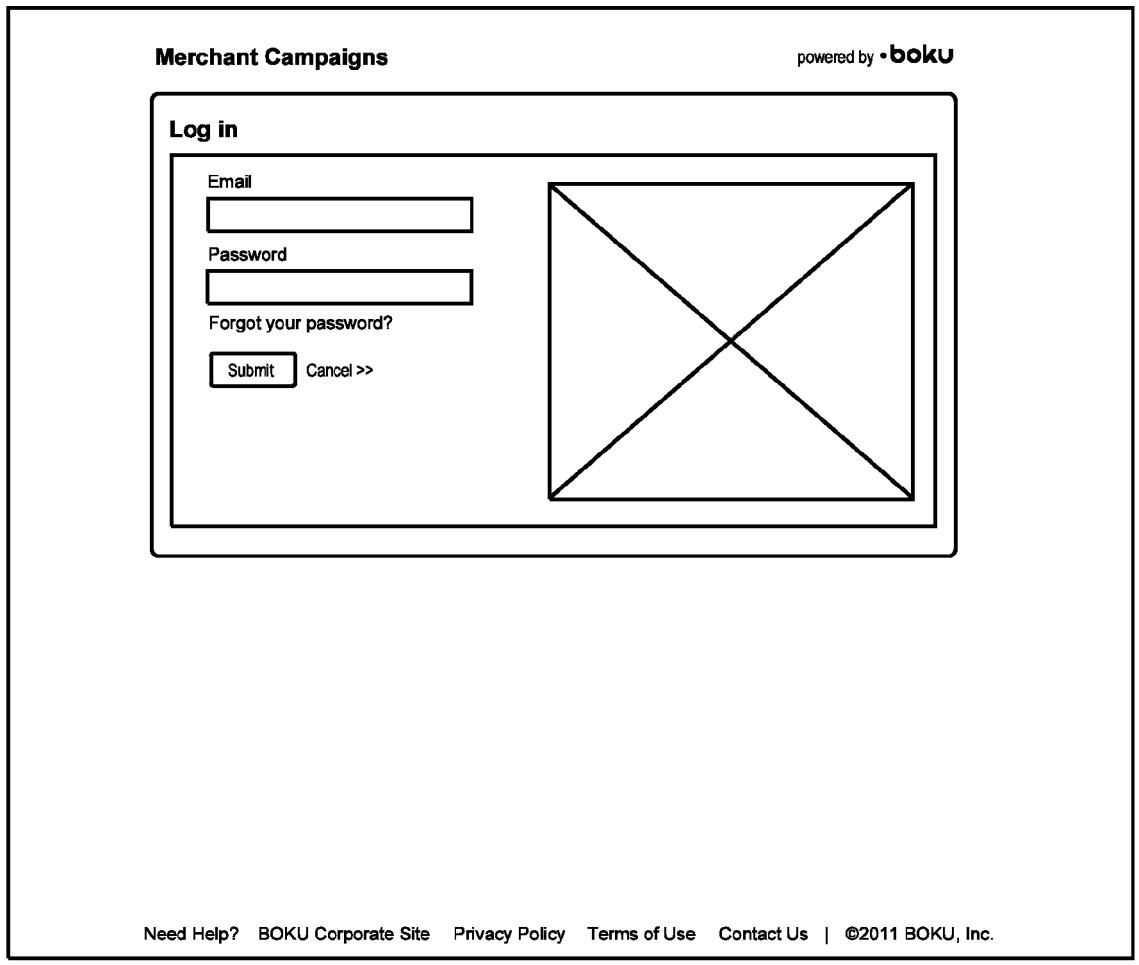
FIG. 5A is a screenshot that appears within a browser of the merchant computer system for a merchant to log into the account.

FIG. 5A illustrates a screenshot that appears in the interface 134 when viewed within a browser window of a browser application at the merchant computer system 20 in FIG. 4B. The merchant logs in using an email and a password.

Figure 5B:
FIG. 5B is a view similar to FIG. 5A permitting the merchant to enter initial details of a voucher, including a discount amount and start and end dates.

FIG. 5B illustrates a screenshot that is displayed at the merchant computer system 20 after login and when a merchant begins to enter details of an offer. The interface 134 allows for entry of a discount ("Discount Amount") and start and end dates of the offer. A preview of the offer is also displayed.

Figure 5C:
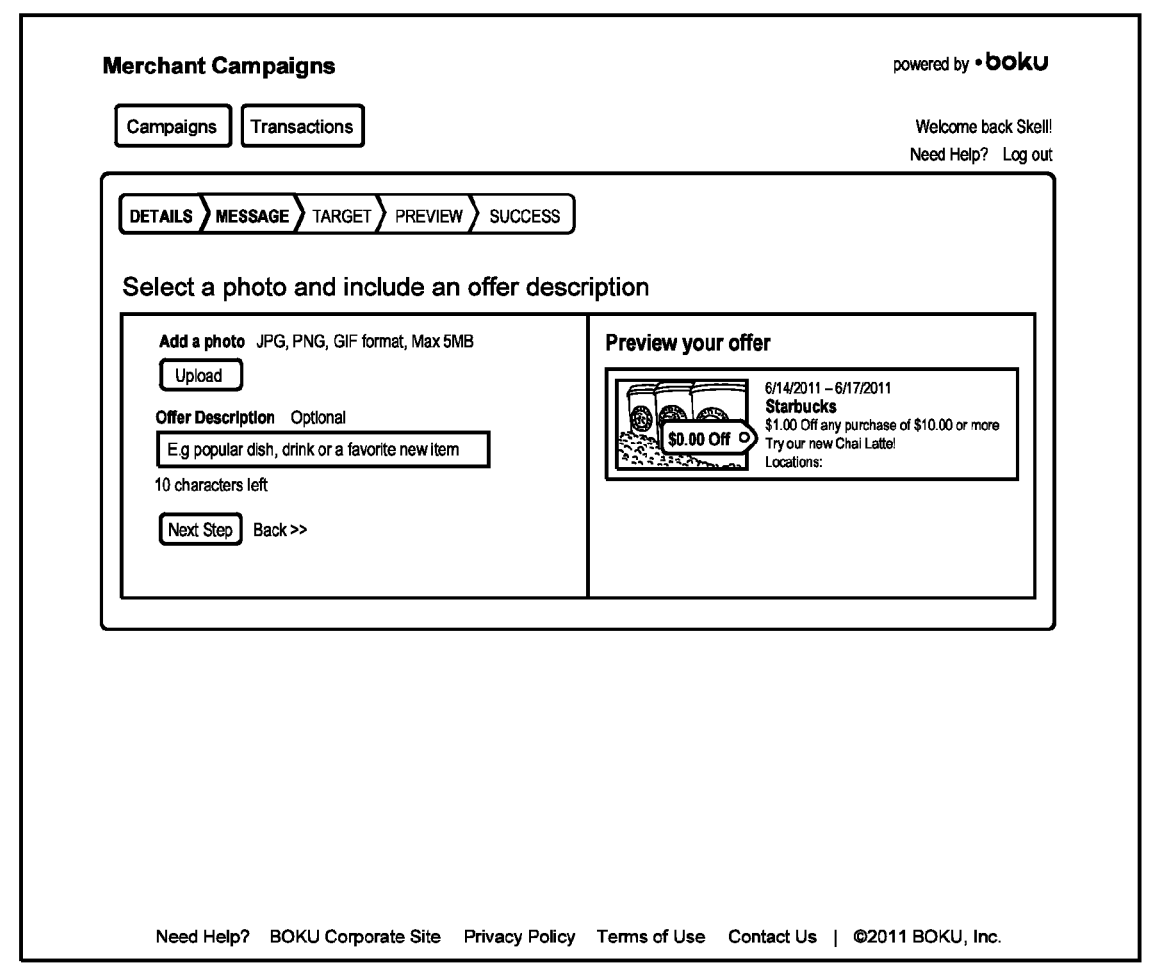

In FIG. 5C the merchant is given an opportunity to upload a photo or other image of the offer. The photo or image will then be displayed within the respective voucher entry, e.g. the voucher entry 168 in FIG. 4A. The photo or image can be uploaded from the merchant computer system 20 or from another location on a network.

Figure 5D:
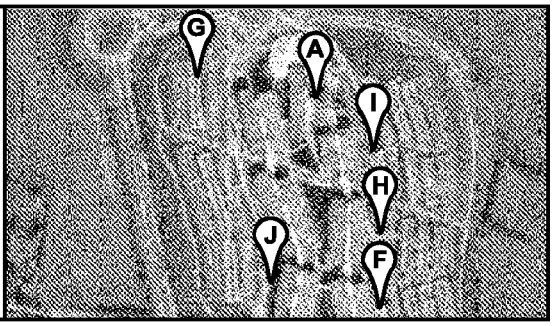
FIG. 5D is a view similar to FIG. 5C where the merchant can select specific terminals or groups of terminals where the offer will be valid.

In FIG. 5D the merchant is given an opportunity to restrict the offer to certain locations, while excluding other locations.

Figure 5E:
FIG. 5E is a view similar to FIG. 5D where the merchant can view the offer before approving the offer.

In FIG. 5E the merchant is given an opportunity to preview the offer as it will appear before approving the offer. The merchant then selects a button "Run Campaign" to approve the offer.

Figure 5F:
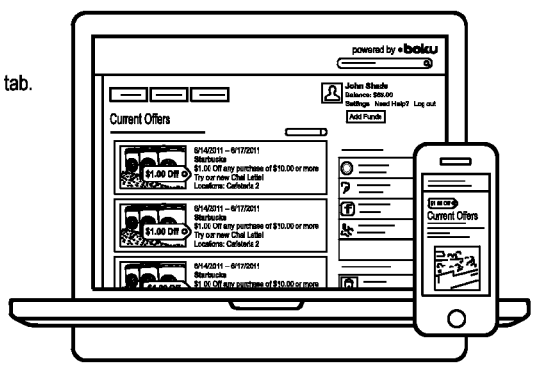
FIG. 5F is a view similar to FIG. 5E after the offer has been approved by the merchant.

FIG. 5F is a screenshot displaying to the merchant that the offer is successful. The consumer can then select a button "Campaigns."

FIG. 5G illustrates a screenshot that is subsequently displayed to the merchant, illustrating the offer that has just been approved by the merchant and all other offers that are scheduled, completed or presently running based on the respective merchant account having the merchant account ID 130 in FIG. 4A.

Figure 6A:
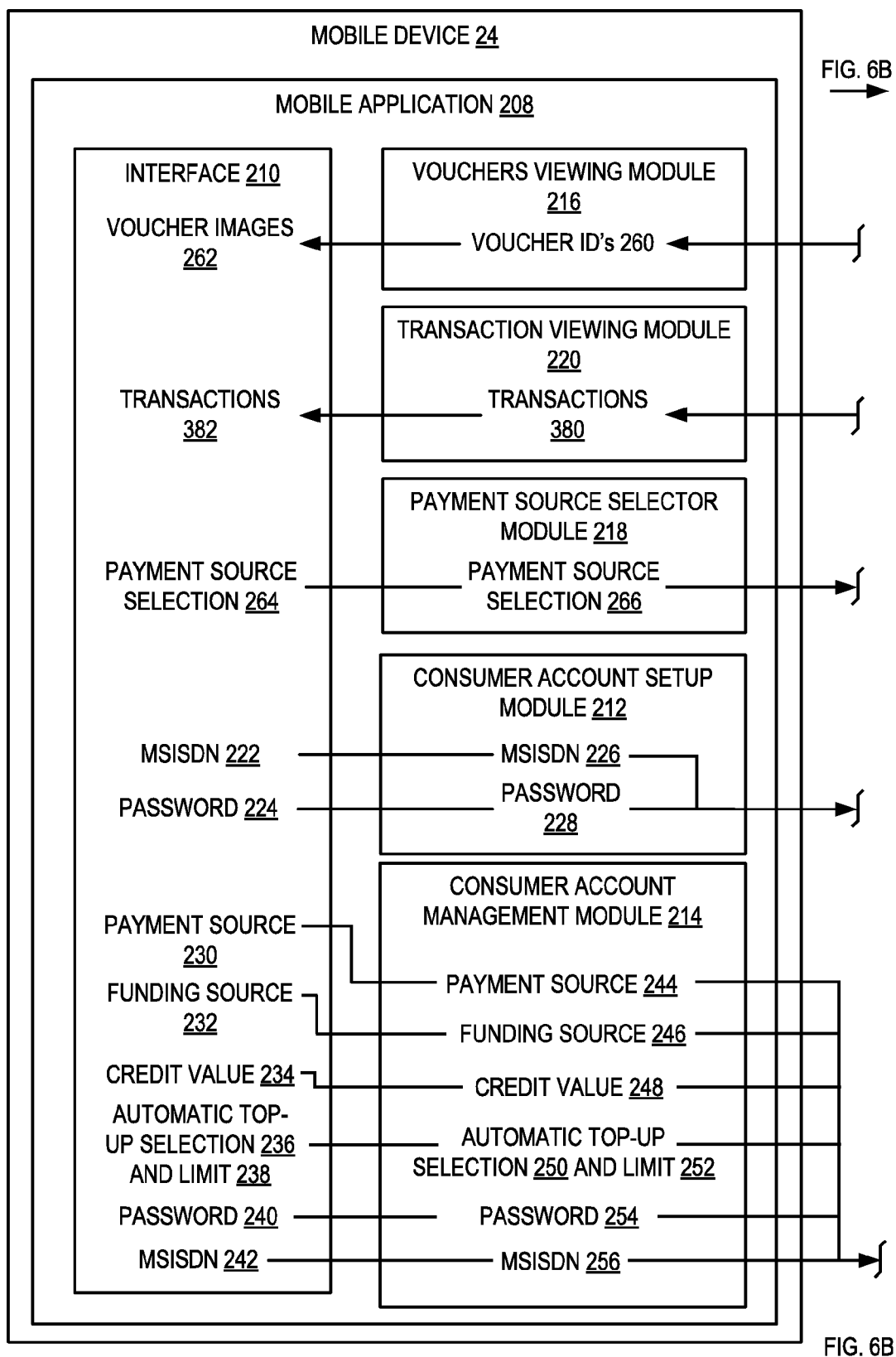
FIGS. 6A and B are a block diagram illustrating interaction between a mobile application on a mobile device on the one hand and on the other with a consumer account setup module, the consumer management system, and components of the consumer account.

Referring to FIGS. 6A and B, the mobile device 24 includes a mobile application 208. The mobile application 208 has an interface 210, a consumer account setup module 212, a consumer account management module 214, a vouchers viewing module 216, a payment source selector module 218, and a transaction viewing module 220.

When the application 208 is initially downloaded onto the mobile device 24, the user is provided access to the consumer account setup module 212. The user can enter a MSISDN 222 and a password 224 into the interface 210. The MSISDN 222 and the password 224 are received as a MSISDN 226 and a password 228 within the consumer account setup module 212 and are transmitted by the consumer account setup module 212 to the consumer account setup module 32 in FIG. 1. The consumer account 28 can thus be established on the mobile application 208 in a manner similar to the manner that the consumer account 28 can be established from the consumer computer system 14 as hereinbefore described with reference to FIGS. 2A and B.

In addition, the consumer account management module 214 allows for entry of a payment source 230, a funding source 232, a credit value 234, an automatic top-up selection 236 and limit 238, password 240, and MSISDN 242 into the interface 210 and are respectively received by the consumer account management module 214 as a payment source 244, funding source 246, credit value 248, automatic top-up selection 250 and limit 252, password 254 and MSISDN 256, and are then provided to the consumer account management system 34 as hereinbefore described with reference to FIGS. 2A and B.

Following login of the mobile application 208 into the consumer account 28, the vouchers viewing module 216 is accessible by a consumer operating the mobile device 24. The consumer then directs the vouchers viewing module 216 to download the voucher ID's 204 from the consumer account 28 as voucher ID's 260 received by the vouchers viewing module 216. Each voucher ID 260 has an associated image and the images are collectively displayed as voucher images 262 within the interface 210. Each voucher entry 168, 178, 180 and 182 within the merchant account 36 (FIG. 4A) may for example have a respective voucher image and the voucher images are separately downloaded by the voucher viewing module 216 based on the voucher ID's 260. What is important to note however, is that the voucher ID's 260 and the voucher images 262 are transmitted by the server computer system 12 and are received by the mobile device 24 based on a matching of the MSISDN 256 transmitted by the mobile application 208 and the MSISDN 66 of the respective consumer account 28.

The payment source selector module 218 allows for entry of the payment source selection 264 in the interface 210, which is received within the payment source selector module 218 as a payment source selection 266. The payment source selector module 218 then transmits the payment source selection 266 to the consumer account 28 to set the payment source selector 128. A selection made as a payment source selection 264 within the interface 210 will thus set the payment source selector 128 to point to one of the payment sources 122 or 124 or to the setting for use stored value 126. The payment source selector 128 can only point to one of the payment sources 122 or 124 or used stored value 126 at any particular time, depending on the selection made by the payment source selection 264.

Figure 7A:
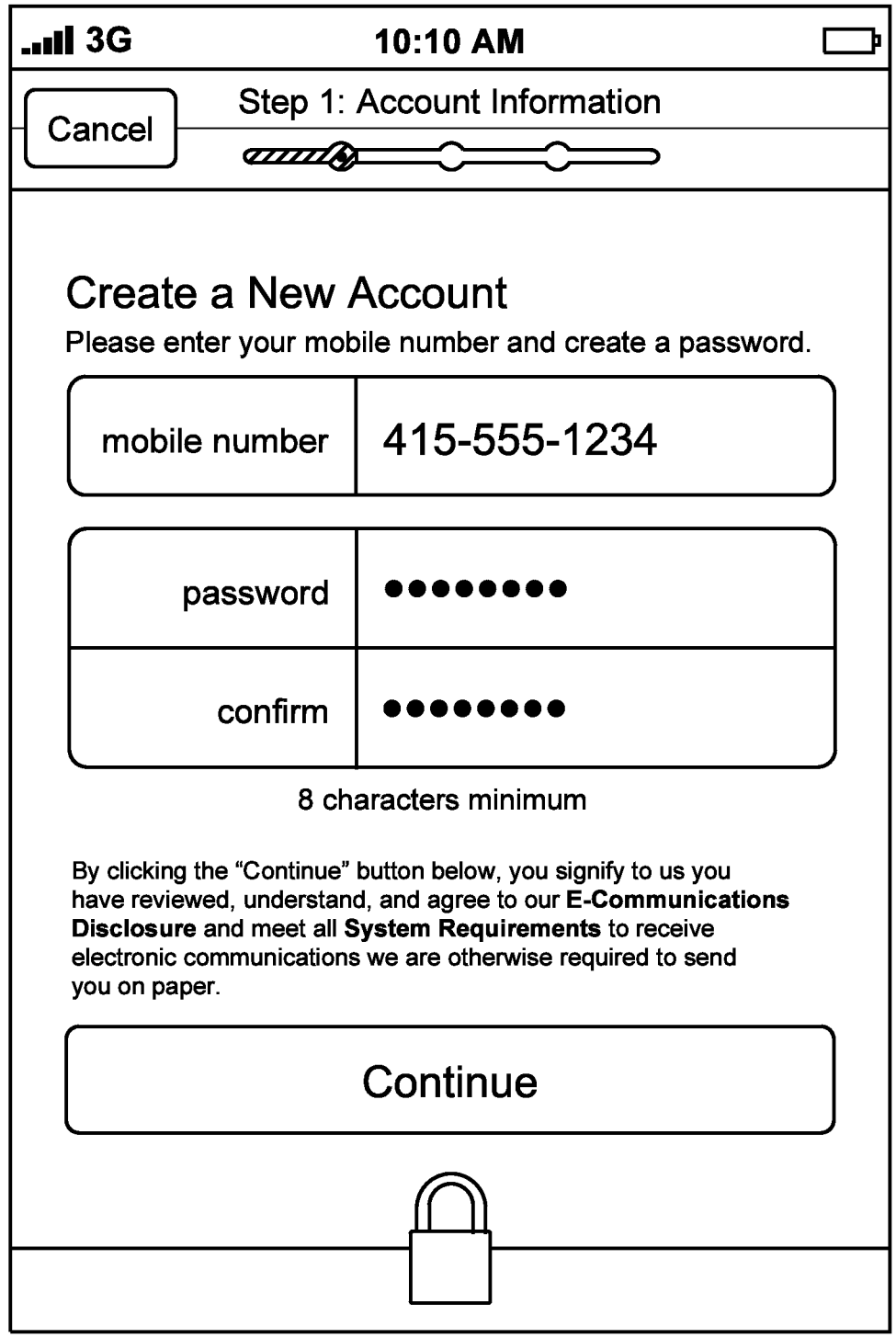
FIG. 7A is a screenshot that appears on an interface provided by the mobile application for a consumer to establish an account.

FIG. 7A illustrates a screenshot on the Interface 210 in FIG. 6A when the consumer first establishes an account using the consumer account setup module 212. FIG. 7B is a view similar to FIG. 7A for the consumer to enter further details of the account.

Figure 7C:
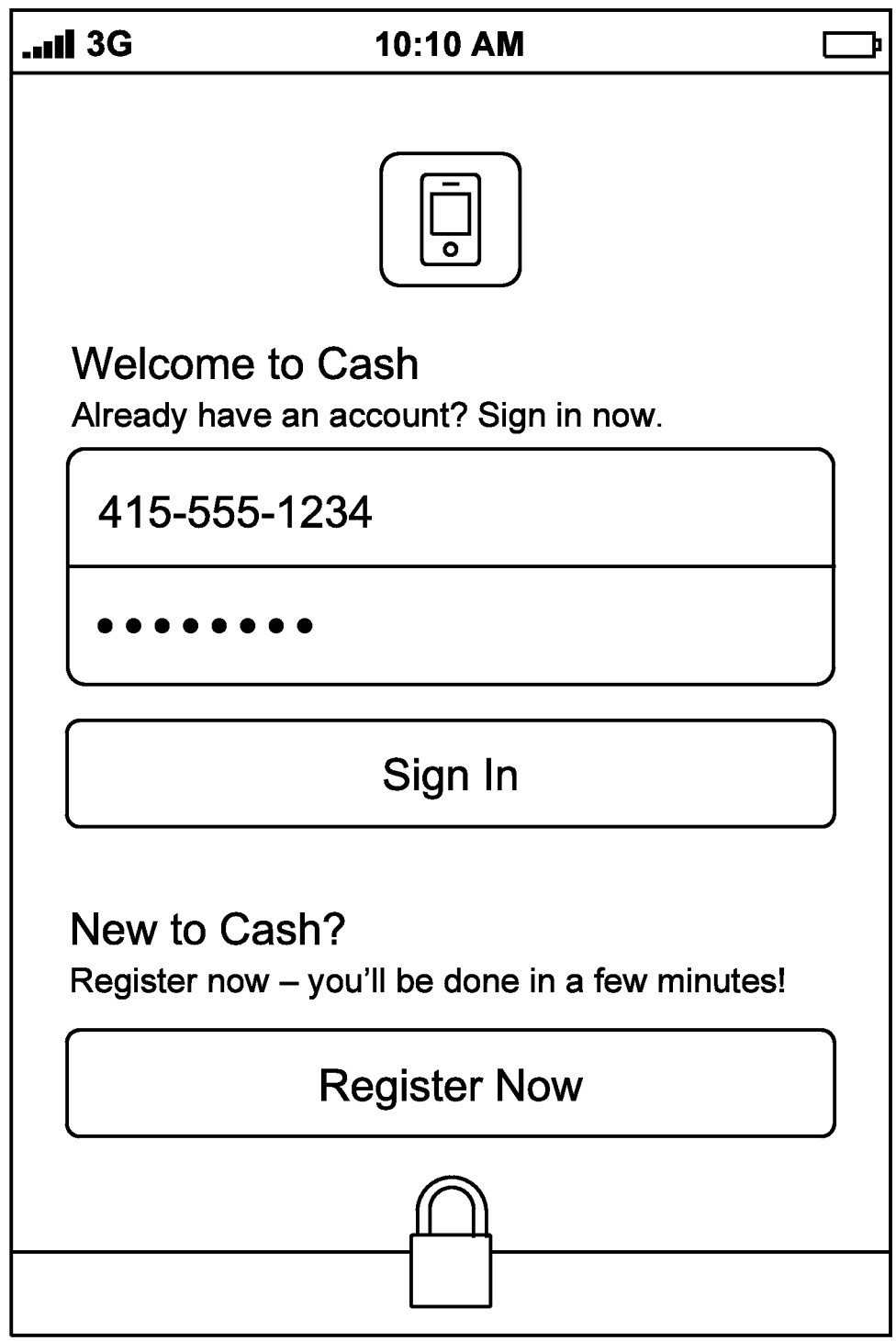
FIG. 7C is a view similar to FIG. 7B for the consumer to log into the account.
Figure 7D:
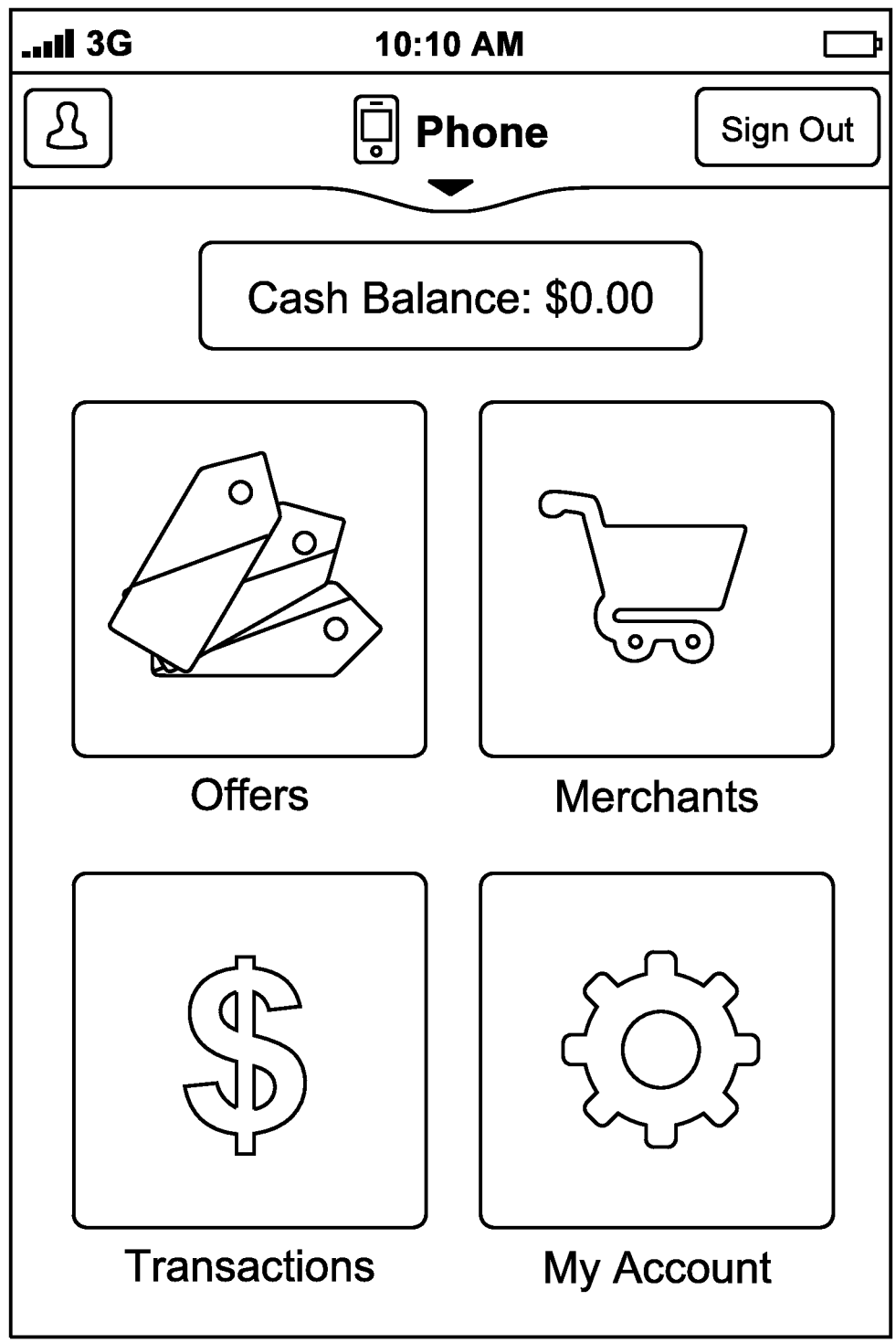
FIG. 7D is a view similar to FIG. 7C after the consumer has logged into the account.
Figure 7E:
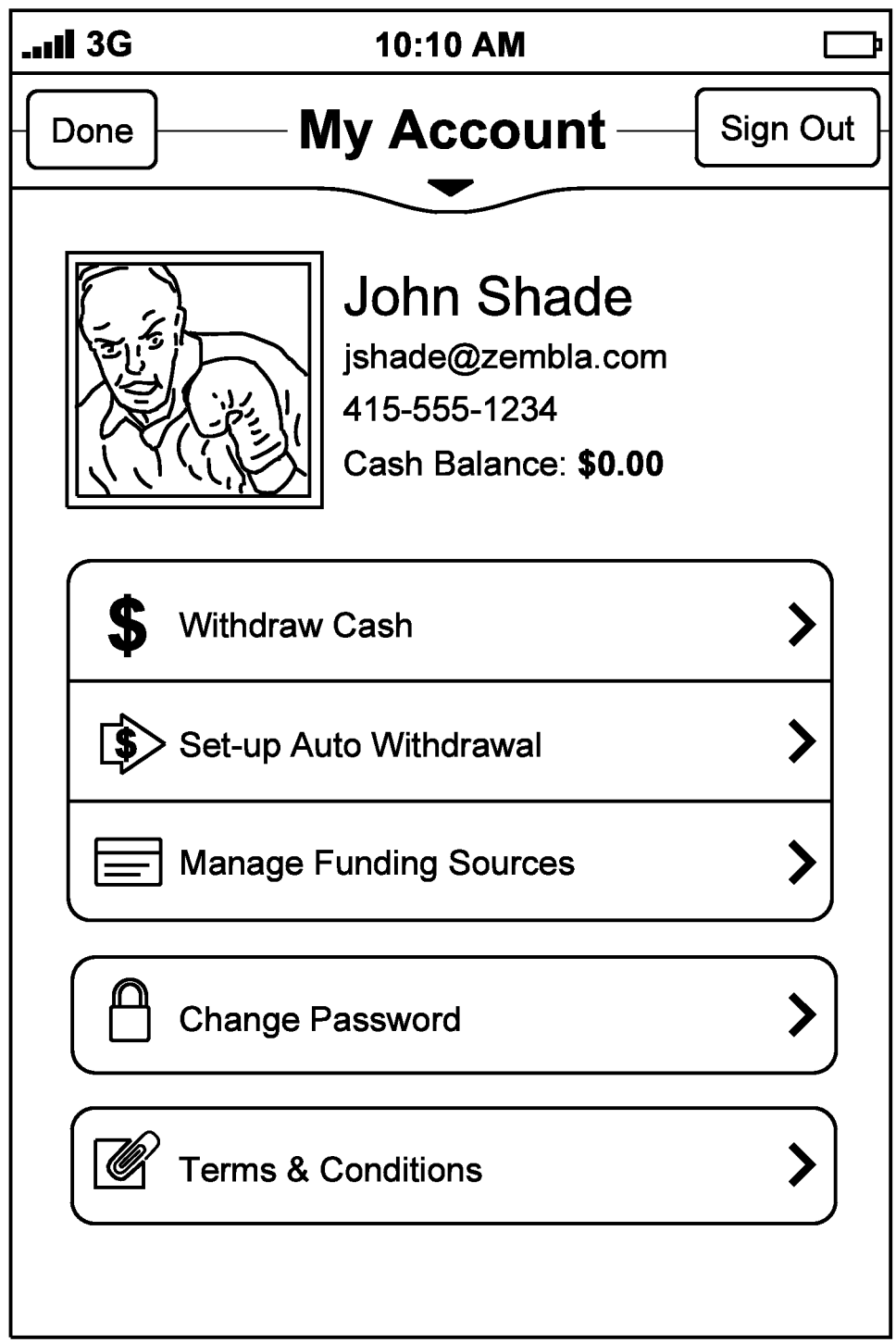
FIG. 7E is a view similar to FIG. 7D after the consumer has navigated to an account management page.

FIG. 7C is a view that is displayed on the interface 210 in FIG. 6A when the consumer uses the consumer account management module 214 to enter the password 240 and the MSISDN 242 in order to log into the respective consumer account. FIG. 7D is a view that is displayed on the Interface 210 following login by the consumer. The view in 7D includes links to "Offers," "Merchants," "Transactions," and "My Account." FIG. 7E is a view that is displayed on the Interface 210 after the consumer has selected the link to "My Account" in FIG. 7D.

Figure 7F:
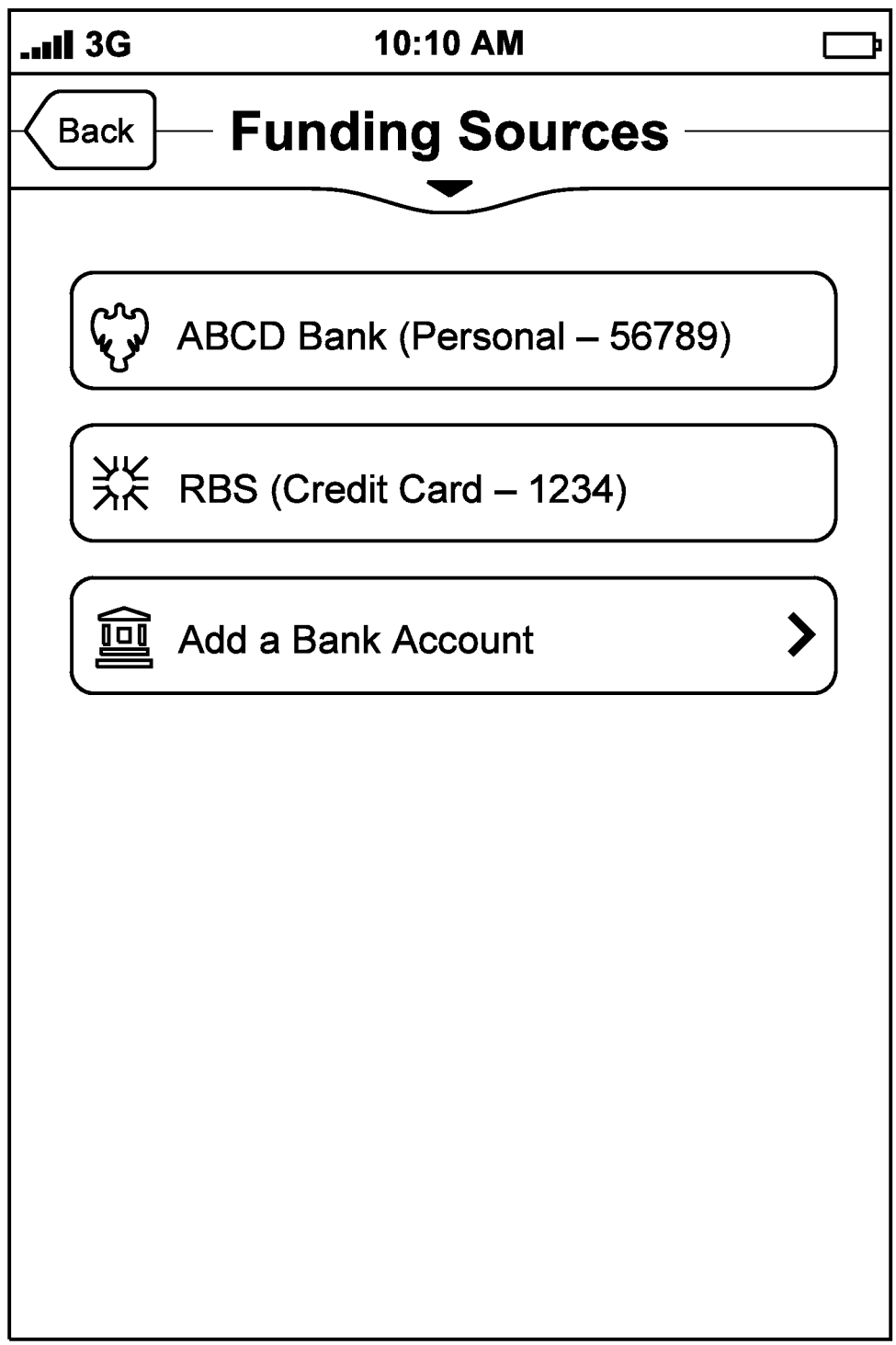
FIG. 7F is a view similar to FIG. 7E displaying funding sources of the account.
Figure 7G:
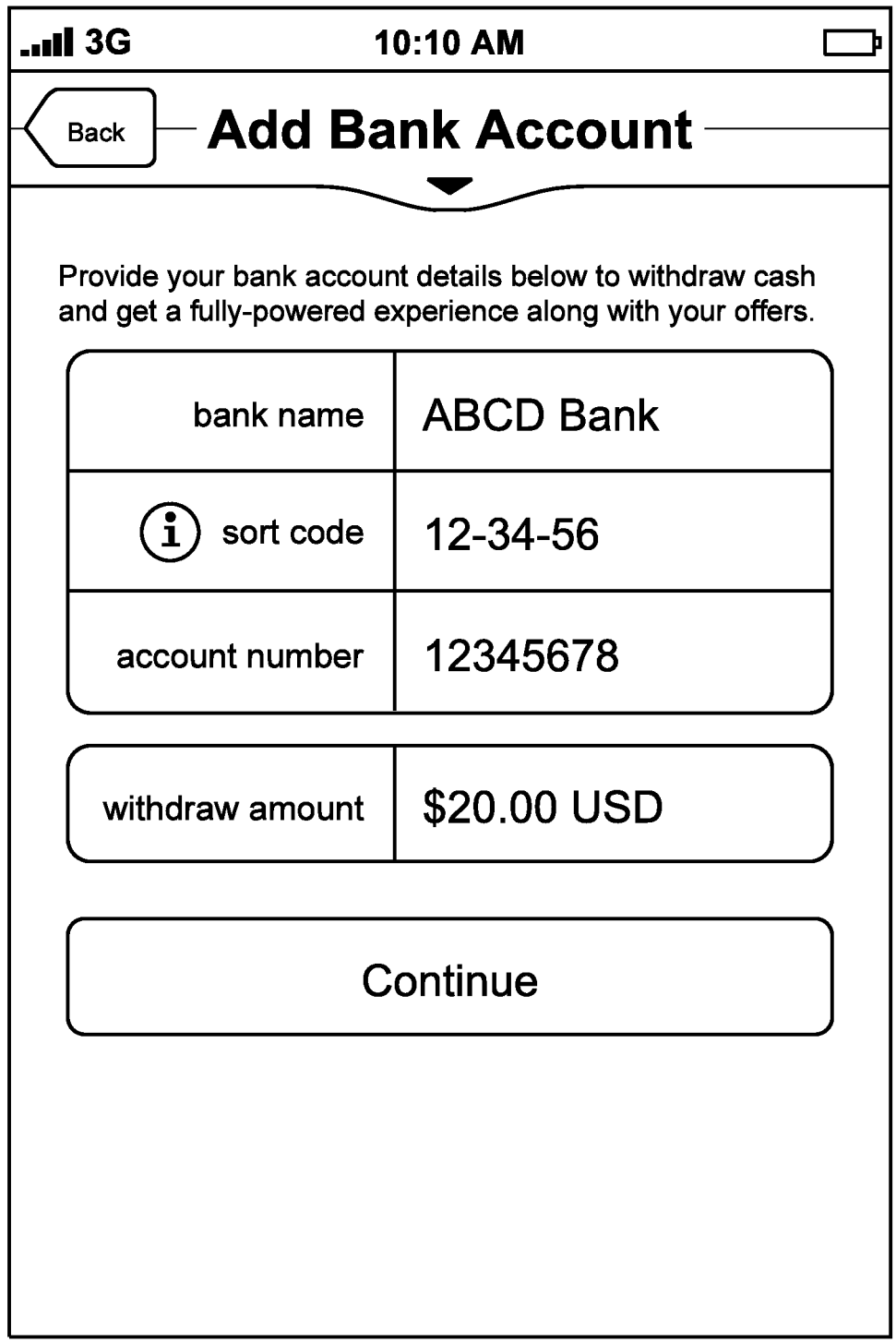
FIG. 7G is a view similar to FIG. 7F for the consumer to enter a further funding source.

In FIG. 7F the funding sources that have been established by the consumer are displayed. FIG. 7G is a view that allows for the consumer to add a funding source such as the funding source 232 in FIG. 6A.

Figure 7H:
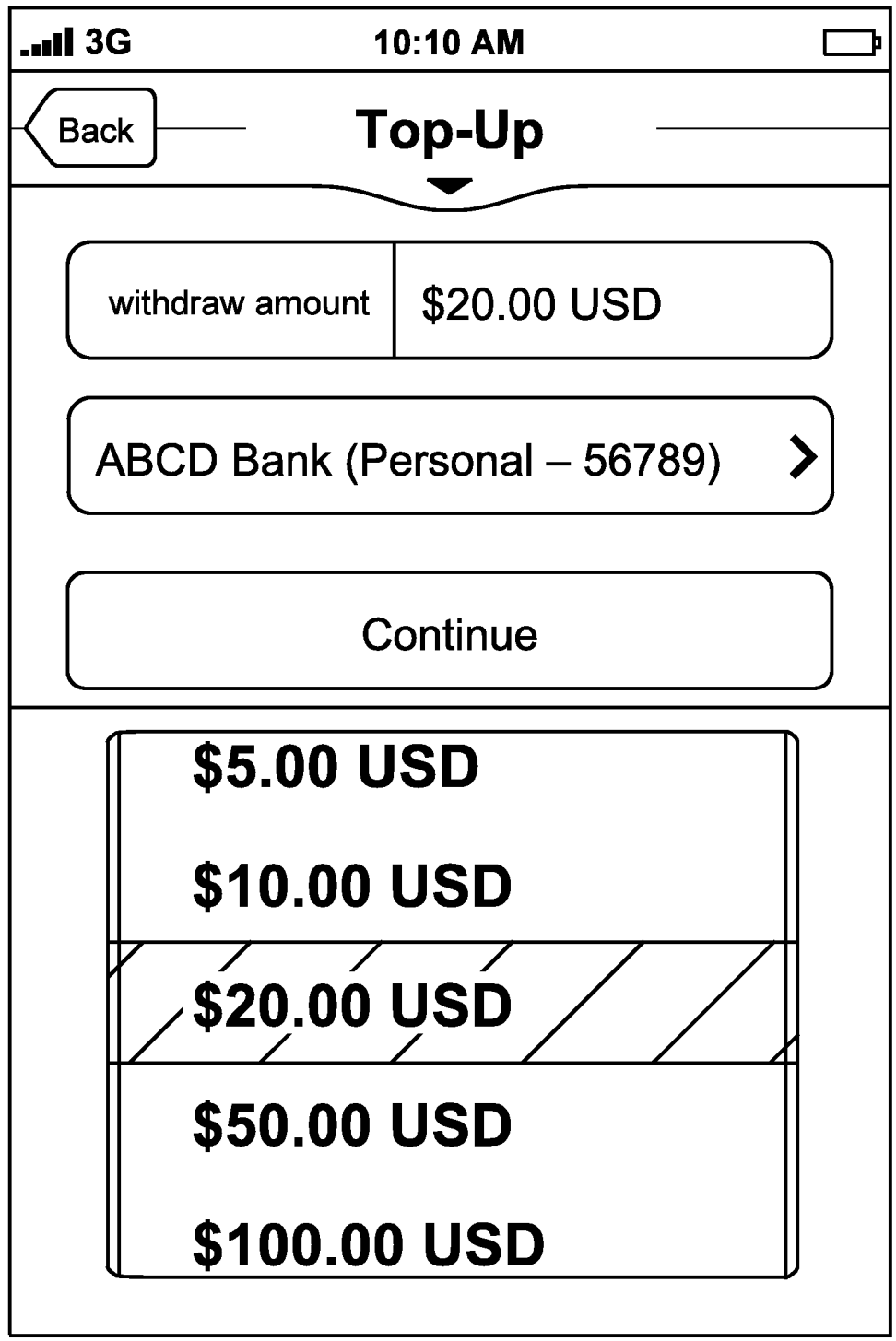
FIG. 7H is a view similar to FIG. 7G wherein the consumer uses a top up feature to transfer funds from a funding source to the stored value.

FIG. 7H is a view that is displayed wherein the consumer uses the top-up feature to transfer funds from a payment source to the stored value. In the example of FIG. 7H, the credit value 234 in FIG. 6A is $20. The consumer is also given a selection of a funding source from the funding sources in FIG. 7F for purposes of the transfer.

Figure 7I:
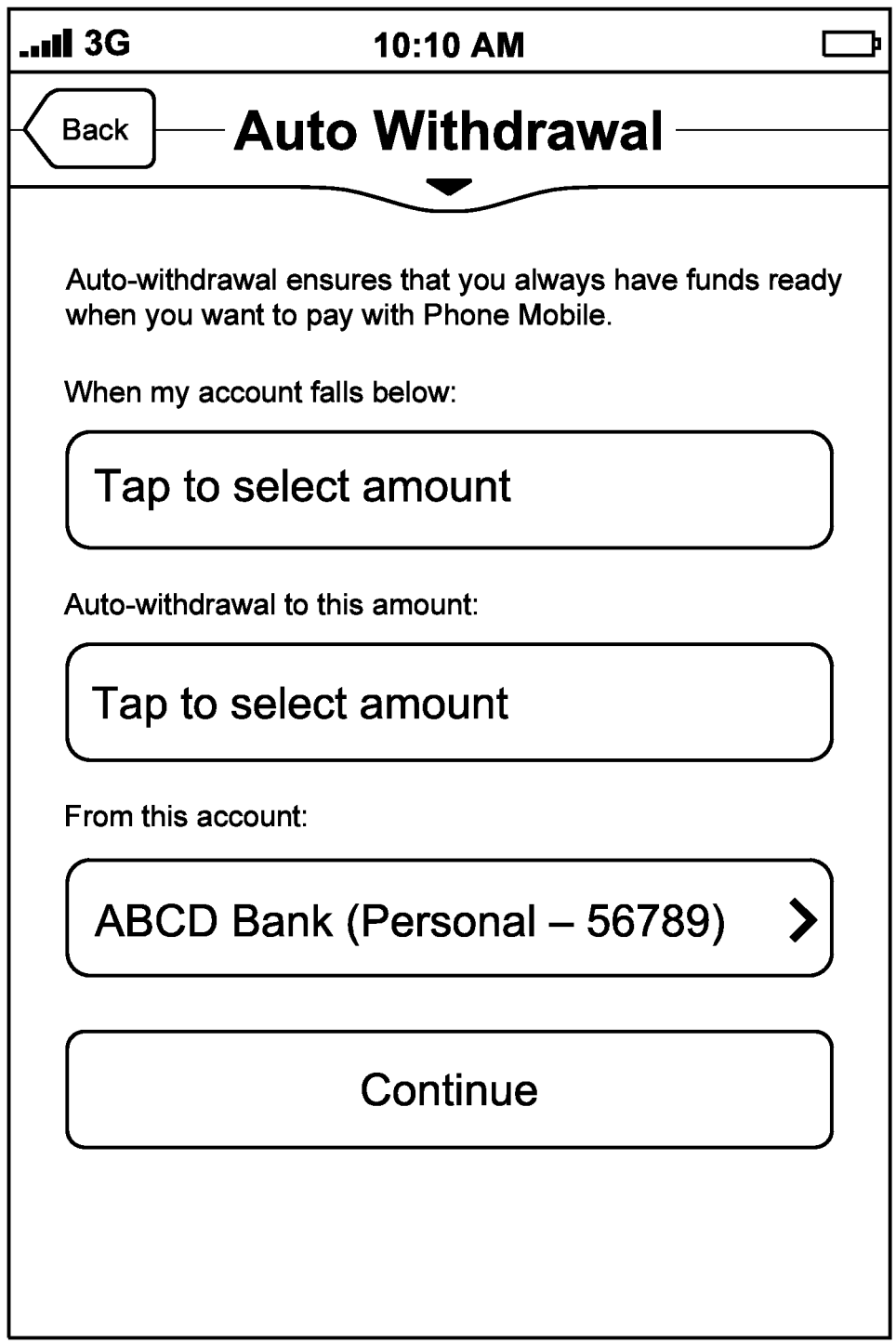
FIG. 7I is a view similar to FIG. 7H for the consumer to select automatic top-up settings.

FIG. 7I is a view that is displayed to allow the consumer to select the automatic top-up selection 236 and limit 238 in FIG. 6A. The consumer is given the option to select both a trigger amount for top-up to occur, i.e. when the stored value falls below a certain value, and to select the amount by which the stored value should be replenished. Again, the consumer is given the option to select one of a plurality of funding sources.

Figure 7J:
FIG. 7J is a view similar to FIG. 7I displaying offers that are available based on the consumer account.

FIG. 7J illustrates a plurality of voucher images such as the voucher images 262 in FIG. 6A. The consumer can select any one of the vouchers to obtain more information about the voucher and the offer.

Figure 6B:
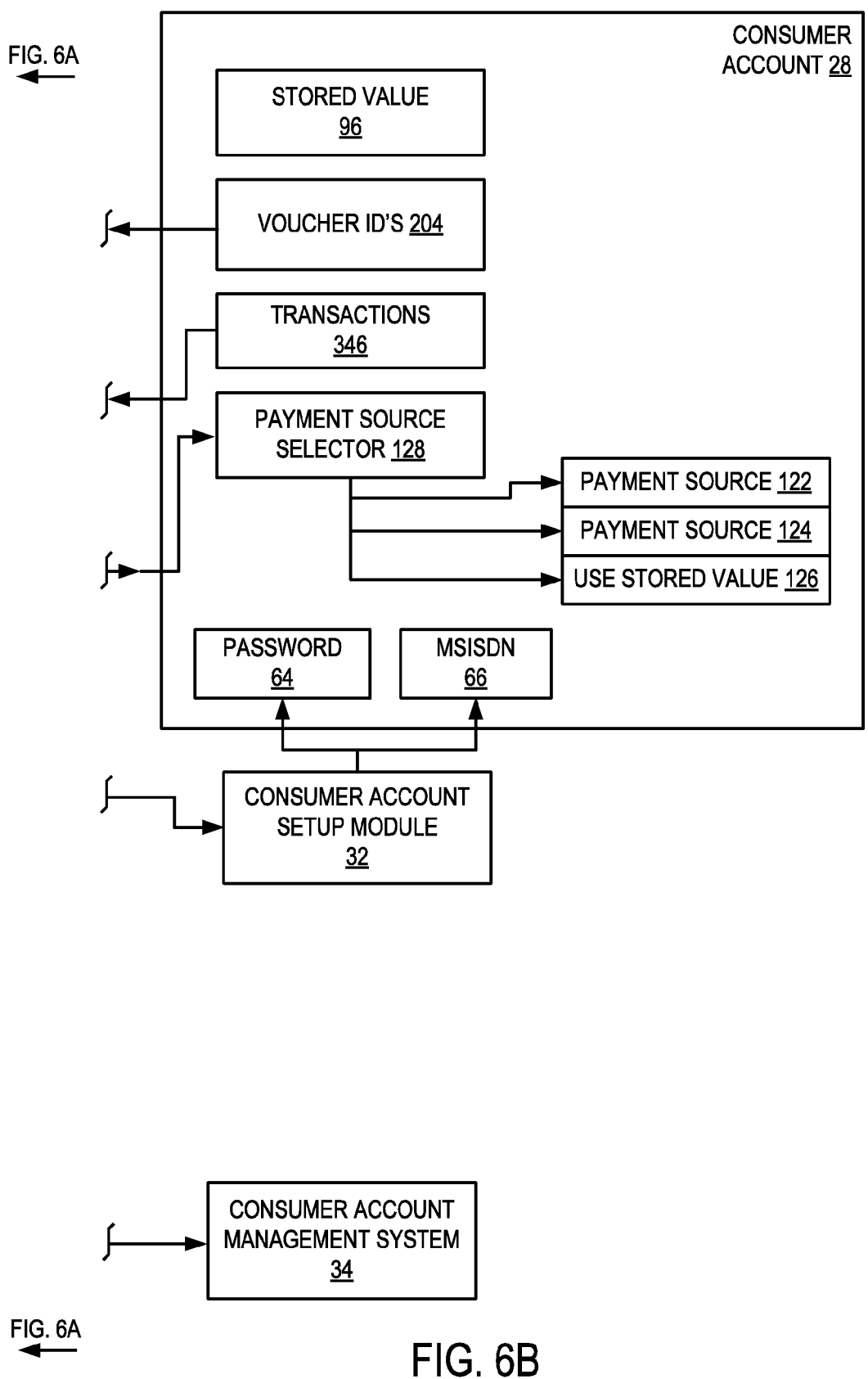
Figure 7K:
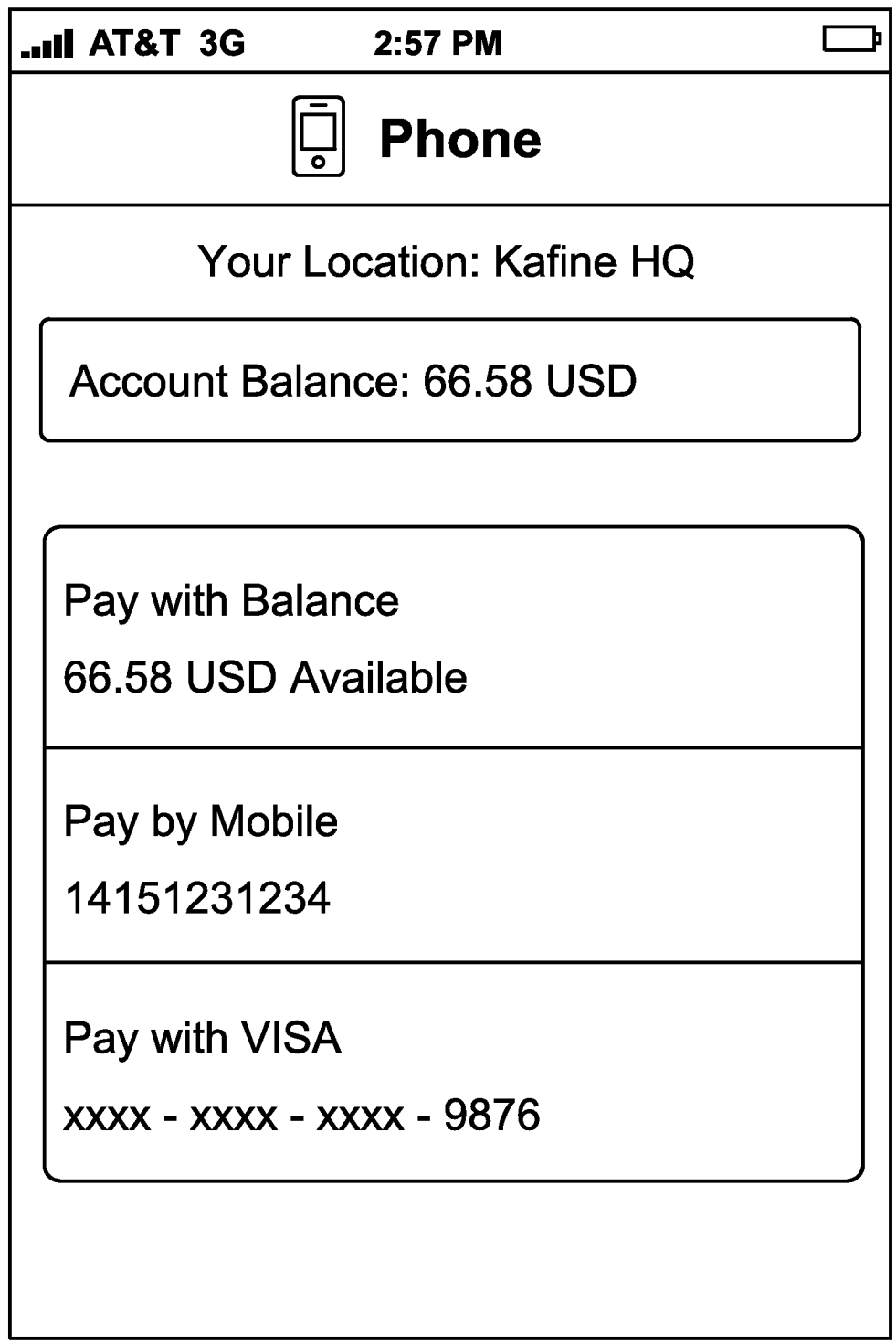
FIG. 7K is a view similar to FIG. 7J permitting a consumer to enter a pass-through payment source or to select whether payment should be made from the stored value of the account.

FIG. 7K is a view that is displayed to allow for the consumer to select a pass-through payment source or to pay using the stored value. By selecting one of the payment sources, the consumer makes the payment source selection 264 in FIG. 6A. As described above, the selection made in the view of FIG. 7K will set payment source selector 128 in FIG. 6B to point to one of the payment sources 122 or 124 or to point to the setting for use stored value 126.

Figure 8:
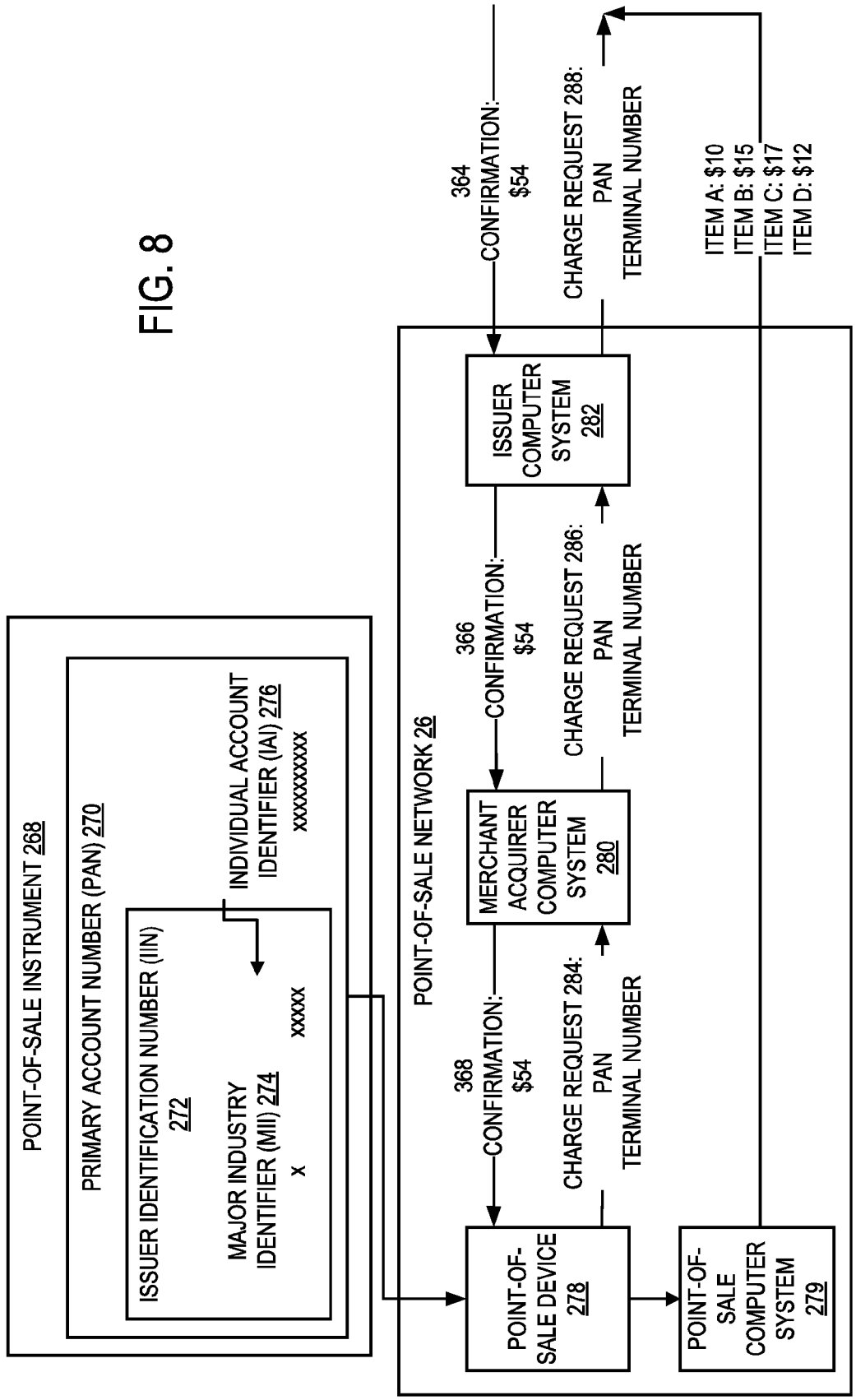
FIG. 8 is a block diagram of a point-of-sale instrument and a point-of-sale network that are used for point-of-sale transaction processing and for routing of a charge request and receiving confirmation if a transaction is good.

Referring to FIG. 8, the consumer uses a single point-of-sale instrument 268 to pay for an item that the consumer wishes to purchase. The point-of-sale instrument 268 may for example be a credit card, a bank card or a Near Field Communication (NFC) device. The point-of-sale instrument 268 includes a single 16 digit primary account number (PAN) 270. The first six digits of the PAN 270 are an issuer identification number (IIN) 272. The first digit of the IIN 272 is a major industry identifier (MII) 274. The last ten digits of the PAN 270 comprise an individual account identifier (IAI) 276.

The point-of-sale network 26 includes a point-of-sale device 278, a point-of-sale computer system 279, a merchant acquirer computer system 280, and an issuer computer system 282. In the present example, the consumer has chosen to purchase the following four items, item A: $10, item B: $15, item C: $17, item D: $12.

The total purchase is $54. An operator records the four items within the point-of-sale computer system 279. The consumer then uses the point-of-sale instrument 268 to communicate with the point-of-sale device 278. The point-of-sale device 278 receives the PAN 270 from the point-of-sale instrument 268. In the case where the point-of-sale instrument 268 is a credit card or a bank card, the PAN 270 is located on a magnetic strip and the point-of-sale device 278 is a device that has a magnetic strip reader. In the example where the point-of-sale instrument 268 is an NFC device, the point-of-sale device 278 communicates with the point-of-sale instrument 268 through electromagnetic waves to receive the PAN 270.

The point-of-sale device 278 transmits a charge request 284 to the merchant acquirer computer system 280. The charge request 284 includes the PAN 270, the terminal number of the point-of-sale device 278. The point-of-sale computer system simultaneously transmits item identifiers for items A, B, C and D, and the price of each one of the items over the internet. Although not shown, the charge request 284 also includes a merchant account ID 130 to determine a merchant account 36 (FIG. 4A) to which the point-of-sale device 278 belongs to.

The merchant acquirer computer system 280 then transmits a charge request 286 to the issuer computer system 282. The charge request 286 includes the same data as the charge request 284. The point-of-sale network 26 has a number of different issuer computer systems 282 and the merchant acquirer 280 utilizes the IIN 272 to route the charge request 286 to the appropriate issuer computer system 282. The issuer computer system 282 then transmits a charge request 288 to the server computer system 12. The charge request 288 includes the same data as the charge request 286. The issuer computer system 282 utilizes the PAN 270 to route the charge request 288 to the server computer system 12.

Figure 9A:
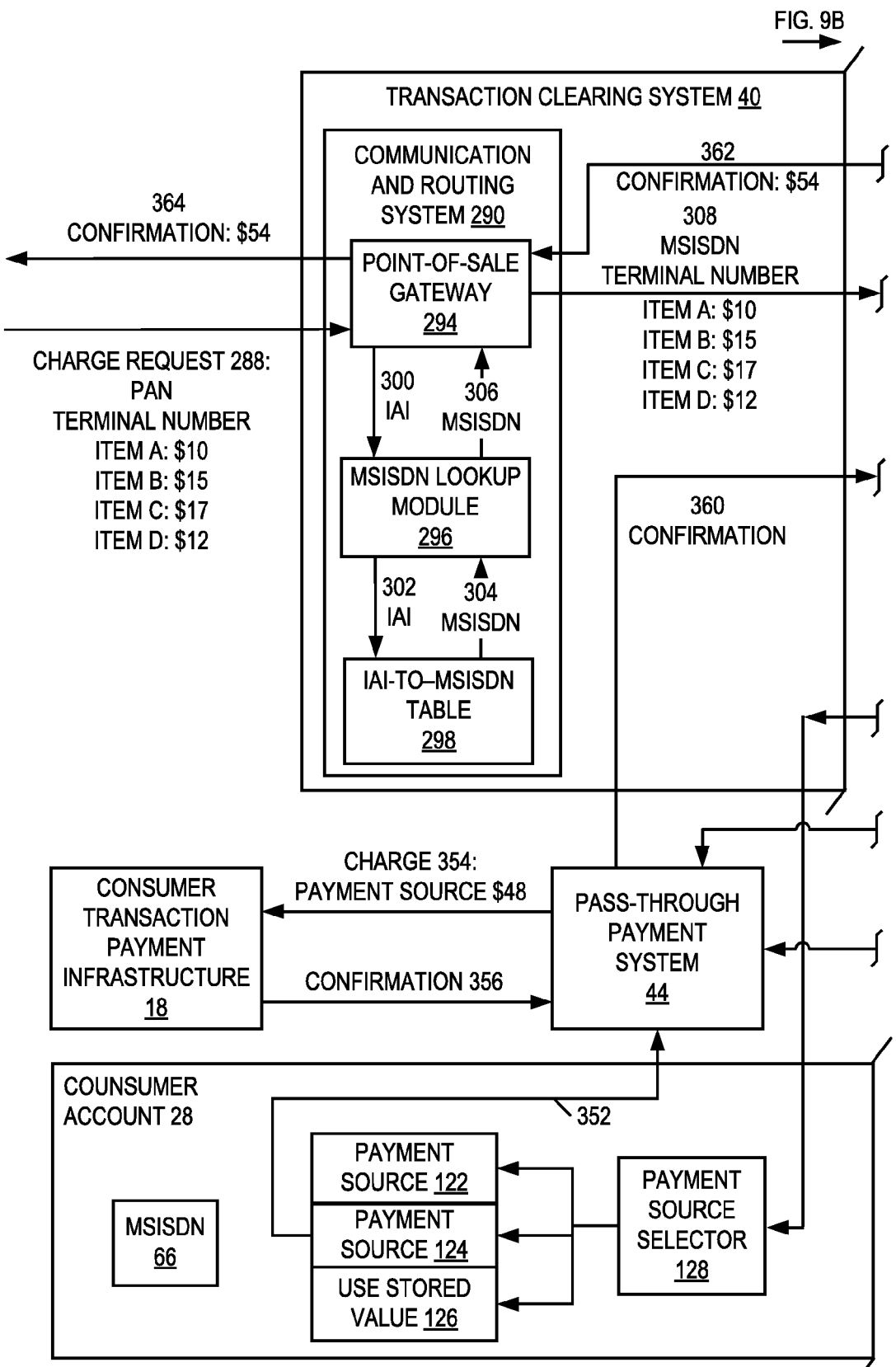
FIGS. 9A, B and C are a block diagram of a transactions clearing system for processing a charge request and providing confirmation back to a point-of-sale, a voucher clearing system to check for and apply vouchers as appropriate, and a pass-through payment system.

Referring to FIGS. 9A, B and C, the transaction clearing system 40 includes a communication and routing system 290 and a transaction processing system 292. The communication and routing system 290 communicates bidirectionally with the issuer computer system 282 (FIG. 8), communicates bidirectionally with the point-of-sale computer system 279 (FIG. 8) and communicates bidirectionally with the transaction processing system 292.

The communication and routing system 290 includes a point-of-sale gateway 294, an MSISDN lookup module 296 and an IAI-to-MSISDN table 298. The point-of-sale gateway 294 receives the charge request 288 from the issuer computer system 282 (FIG. 8) and receives the item identifiers for items A, B, C and D, and the price of each one of the items over the internet from the point-of-sale computer system 279. At 300, the point-of-sale gateway 294 provides the IAI 276 in the PAN 270 received in the charge request 288 to the MSISDN lookup module 296. At 302, the MSISDN lookup module 296 utilizes the IAI 276 as an input lookup into the IAI-to-MSISDN table 298. At 304, the MSISDN lookup module 296 receives a MSISDN from the IAI-to-MSISDN table 298. A plurality of IAIs is stored within the IAI-to-MSISDN table 298, each with a respective associated MSISDN. The MSISDN received at 304 corresponds to a specific IAI 276 provided at 302. At 306, the point-of-sale gateway 294 receives the MSISDN from the MSISDN lookup module 296. At 308, the point-of-sale gateway 294 provides a data set to the transaction processing system 292, including the MSISDN retrieved from the IAI-to-MSISDN table 298 via the MSISDN lookup module 296, the terminal number received in the charge request 288, the item identifiers and associated amounts received in the charge request 288, and the respective merchant account ID 130 received in the charge request 288.

The transaction processing system 292 includes an account lookup and debit module 310, a voucher application module 312, and a transaction validation or pass-through module 314.

The account lookup and debit module 310 receives the data set provided at 308 from the point-of-sale gateway 294. At 316, the account lookup and debit module 310 provides a data set to the voucher application module 312, including the terminal number, the item identifiers and their associated amounts. At 318, the voucher application module 312 provides a data set to the voucher management system 42 corresponding to the data set received from the account lookup and debit module 310 at 316.

Figure 10A:
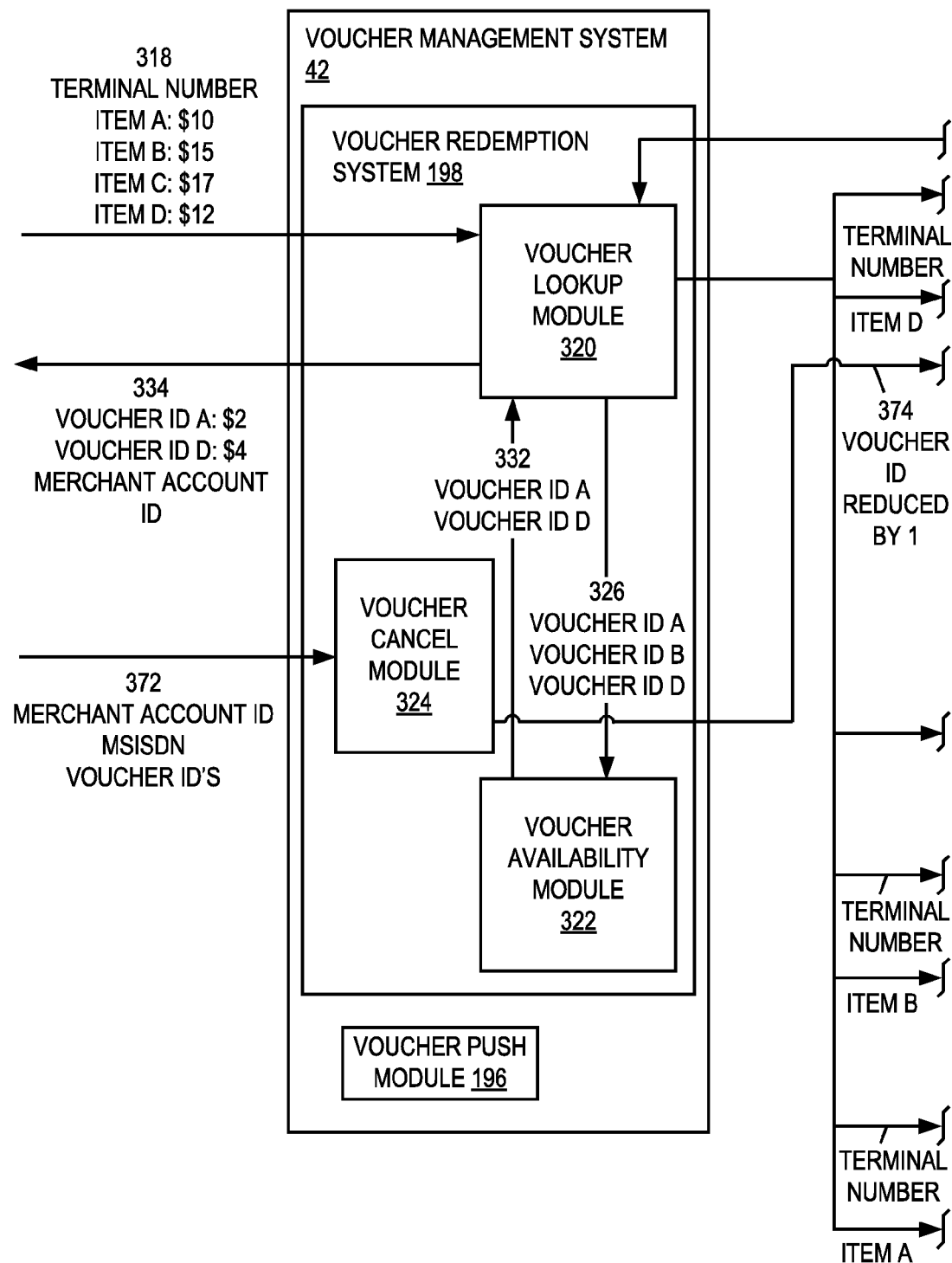
FIGS. 10A and B are a block diagram illustrating interaction between the voucher management system and the merchant account to check for and apply vouchers and to cancel them once they have been used.
Figure 10B:
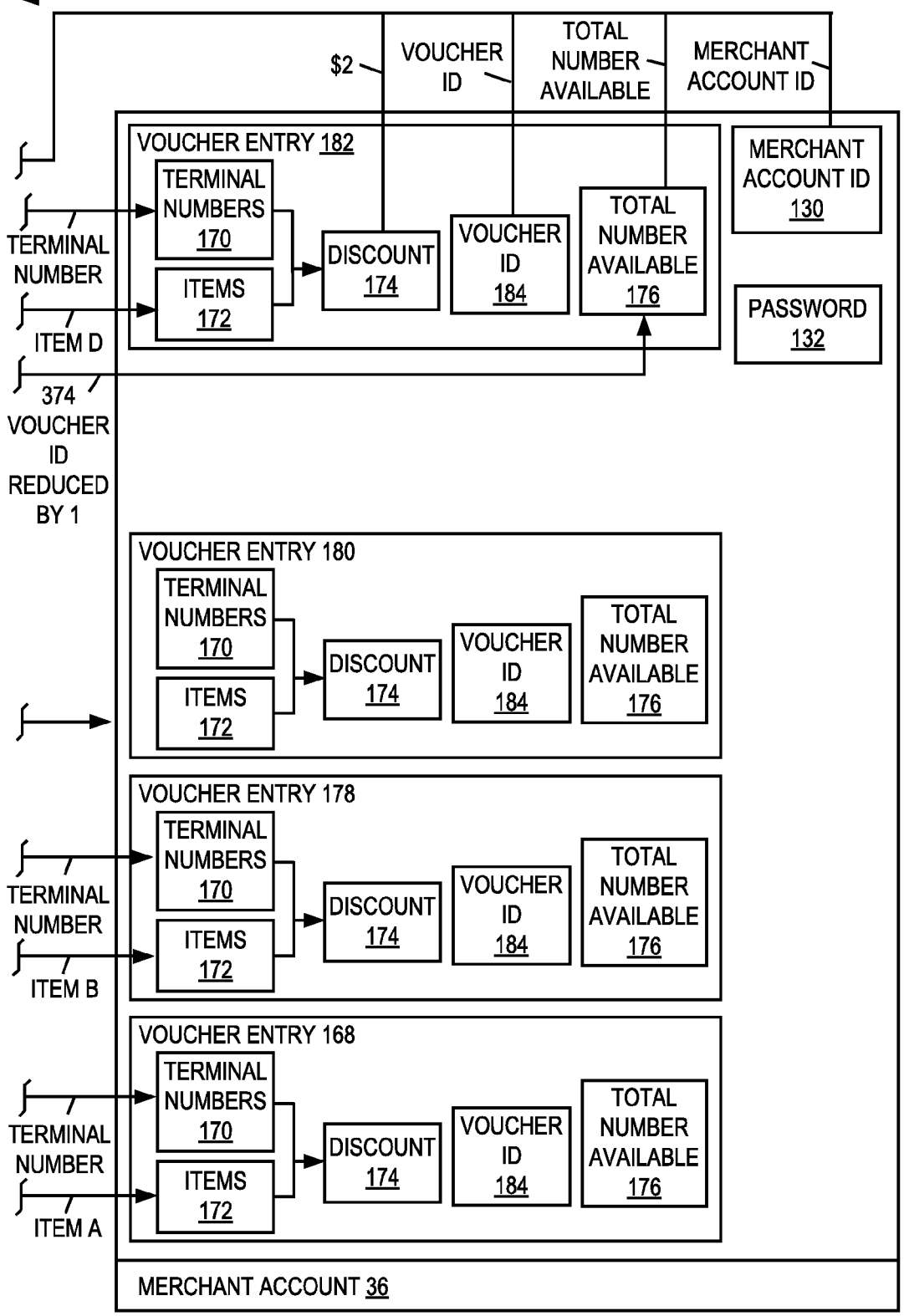

Reference is now made to FIGS. 10A and B. The purpose of the voucher application module 312 is to determine if, and if so, which voucher discounts may apply to the items identified in the data set received at 316. The voucher redemption system 198 includes a voucher lookup module 320, a voucher availability module 322 and a voucher application module 324.

The voucher lookup module 320 receives the data transmitted at 318 from the voucher application module 312. The voucher lookup module 320 then uses the data received at 318 to determine whether the data matches the data in the voucher entries 168, 178, 180 and 182. In each case, the terminal number received in the data 318 is used to determine which ones of the voucher entries 168, 178, 180 and 182 have matching terminal numbers 170. Each one of the item identifiers for items A, B, C and D is also used to determine whether they match any one of the items 172 in the voucher entries 168, 178, 180 and 182. Only if a respective voucher entry 168, 178, 180 or 182 has both a terminal number 170 and an item 172 matching the terminal number and one of the item identifiers in the data 318 is the respective discount 174 of the respective voucher entry 168, 178, 180 or 182 applied. In the present example, the voucher entry 168 has one of the terminal numbers 170 matching the terminal number received in the data 318 and has an item within the items 172 matching the item identifier for item A. Similarly, voucher entry 178 has both a matching terminal number and one of the items 172 matches one of the item identifiers, namely item B from the data 318. The voucher entry 182 also has a matching terminal number within the terminal numbers 170 and one of the items 172 matches the item identifier for item A in the data 318. The voucher 180 either does not have a matching terminal number within the terminal numbers 170 or the items 172 thereof do not match any one of the item identifiers for items A, B, C or D in the data 318. Only the discounts for voucher entries 168, 178 and 182 are now applied and the discount 174 of the voucher entry 180 is not applied.

The voucher lookup module 320 subsequently retrieves a set of data from the voucher entry 182, including the discount 174, in the present example $2, the voucher ID 184 and the total number available 176. Although not shown in the drawing, the voucher lookup module 320 also receives a similar set of data for the voucher entries 168 and 178. The voucher lookup module 320 then makes a determination whether the total number available 176 of the respective voucher entries 168, 178 or 182 is more than zero, in which case and only in that case, is the voucher entry still valid. The voucher lookup module 320 also retrieves the merchant account ID 130. For purposes of further discussion, the voucher ID's 184 of the voucher entries 168, 178 and 182 are all still valid and referred to herein as voucher ID's A, B and D.

Referring again to FIGS. 9A, B and C, the voucher lookup module at 320 submits the voucher ID's A, B and D to the voucher availability module 328. The voucher availability module 322 uses the voucher ID's A, B and D to determine which ones of the voucher ID's A, B and D are valid within the voucher ID's 204 of the respective consumer account 28. In the present example, the voucher ID B is not valid, either because it has previously been used or the particular consumer account 28 having the MSISDN 66 has not been targeted by a merchant. In the present example, voucher ID's A and D are found within the voucher ID's 204 and are determined as being valid. At 330, the voucher ID's A and D that are valid are returned to the voucher availability module 322 and at 332 the voucher lookup module 320 retrieves the voucher ID's A and D from the voucher availability module 322.

At 334 the voucher lookup module 320 submits the voucher ID's A and D together with their associated discounts, in the present example $2 and $4, in a data set to the voucher application module 312. The data set received at 334 by the voucher application module 312 also includes the respective merchant account ID 130 retrieved by the voucher lookup module 320. The voucher application module 312 then calculates a discounted amount based on the amounts of the items A to D minus the discounts found for items A and D. In the present example, the amount before the discount is $10+$15+$17+$12=$54 and the discounts total $2+$4=$6. The discounted amount is thus $54-$6=$48. At 336, the voucher application module 312 submits the voucher ID's A and D, the discounted amount of $48 and the respective merchant account ID 130 to the transaction validation or pass-through module 314.

At 338, the transaction validation or pass-through module 314 reads the payment source selector 128. If the payment source selector 128 points to the selector "use stored value" 126, then the transaction validation or pass-through module proceeds to 340, wherein the transaction validation or pass-through module 314 determines whether the discounted amount of $48 is less than the stored value 96. If the discounted amount of $48 is less than the stored value 96, then the transaction validation or pass-through module 314 validates the transaction to the account lookup and debit module 310. If the transaction validation or pass-through module 314 at 340 determines that the discounted amount of $48 is not less than the stored value 96, then the transaction validation or pass-through module 314 does not validate the transaction at 342 to the account lookup and debit module 310.

Only if the transaction is validated at 342 at the account lookup and debit module 310 does the account lookup and debit module 310 proceed at 344. At 344, the account lookup and debit module 310 utilizes the MSISDN received at 308 to identify the respective consumer account 28 having a MSISDN 66 matching the MSISDN received at 308.

The account lookup and debit module 310 then reduces the stored value 96 of the respective consumer account 28 having the respective MSISDN 66 by the discounted amount of $48. The consumer account 28 also has a set of previous transactions 346. At 348, the account lookup and debit module 310 records the respective transaction within the transactions 346. The account lookup and debit module 310 utilizes the respective MSISDN to retrieve the consumer account 28 having a matching MSISDN 66 and records the transaction including item identifiers for items A, B, C and D, a respective voucher ID associated with the respective item, and the respective discounted price of the respective item.

If at 338, the transaction validation or pass-through module 314 determines that the payment selector 128 is set to for example the payment source 124, then the transaction validation or pass-through module 314 does not proceed to 340, but instead proceeds to 350. At 350, the transaction validation or pass-through module 314 submits a charge request for $48 to the pass-through payment system 44 and receives confirmation from the pass-through payment system 44 as appropriate. At 352, the pass-through payment system 44 reads routing information from the payment source 124 to which the payment source selector 128 points. The pass-through payment system 44 then transmits a charge request 354 over a network such as the Internet to the consumer transaction payment infrastructure 18. The charge request 354 includes the routing information of the payment source and the discounted amount of $48. The consumer transaction payment infrastructure 18 then transmits a confirmation 356 that is received by the pass-through payment system 44. It may also be possible that the consumer transaction payment infrastructure 18 does not transmit the confirmation 356, in which case the transaction is denied. If the pass-through payment system 44 receives the confirmation 356, the pass-through payment system 44 proceeds to 348 wherein the transaction is recorded within the transactions 346 of the consumer account 28.

The stored value 96 is not charged in the latter scenario. By setting the payment source selector 128, the consumer is thus given the option to either charge the stored value 96, or to have the charge pass through the pass-through payment system 44 and have the charge of $48 be delivered to the consumer transaction payment infrastructure 18 instead of reducing the stored value 96. The payment source 122, 124 or the stored value 126 is selectable irrespective of the single PAN 270 used to create the charge request 284. Subsequent charge requests including the single PAN 270 result in processing of each subsequent charge request based on the payment source selector 128 until payment source selector 128 is changed to select another one of the payment sources 122, 124 or the stored value 126.

Following receipt of the confirmation 356, the pass-through payment system 44 at 360 provides a confirmation to the account lookup and debit module 310. Following either the validation received at 342 or the confirmation received at 360, the account lookup and debit module 310 at 362 submits a confirmation of a charge of the full undiscounted amount of $54 to the point-of-sale gateway 294. The point-of-sale gateway 294 at 364 transmits the confirmation of $54 to the issuer computer system 282 in FIG. 8. At 366, the issuer computer system 282 routes the confirmation of $54 to the merchant acquirer system 280. At 368, the merchant acquirer 280 routes the confirmation of $54 to the point-of-sale device 278. An operator of the point-of-sale device 278 will then know that the sale is good and will permit the consumer to leave the store with the items.

Figure 9C:
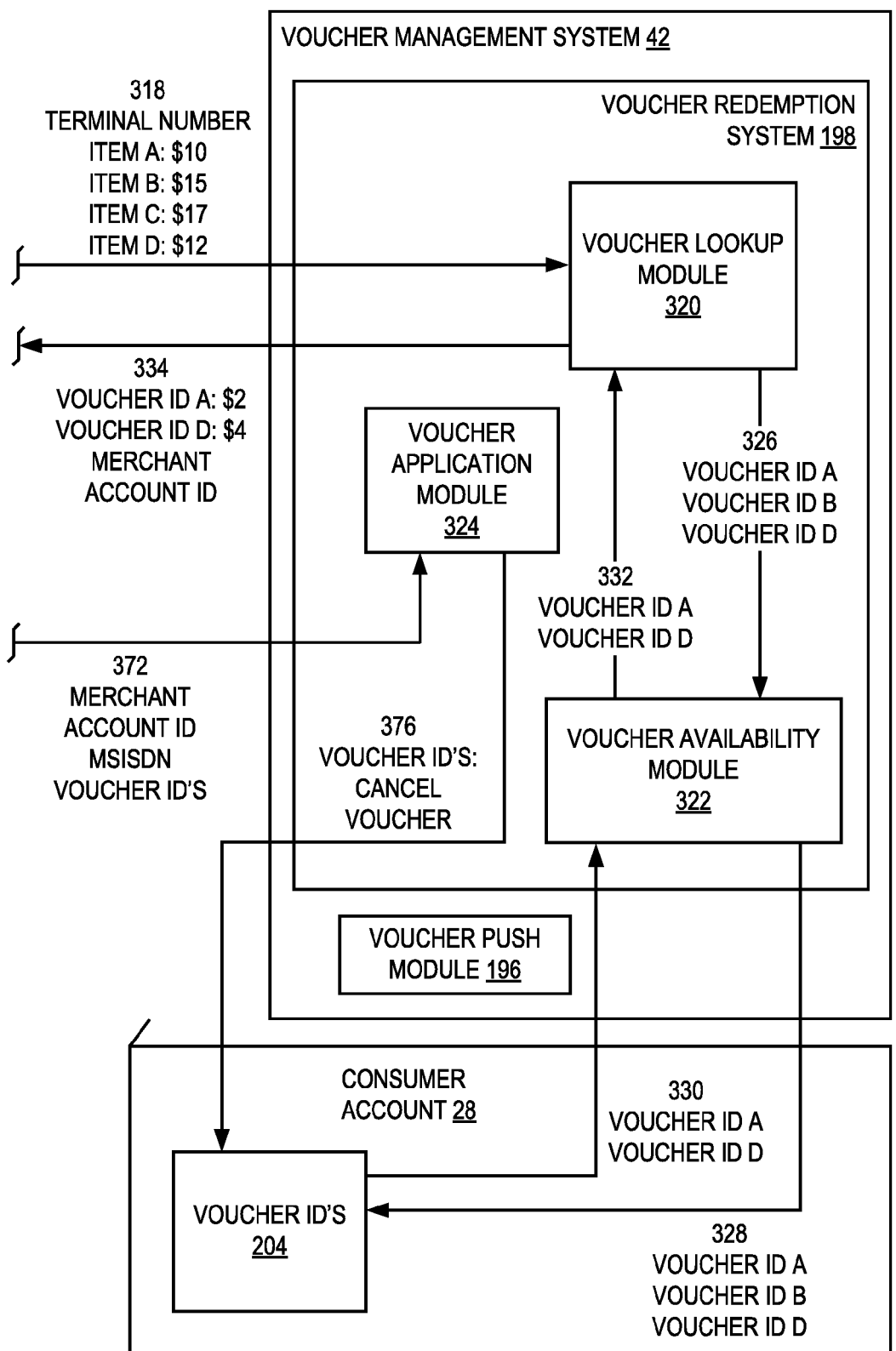

Referring again to FIGS. 9 A, B and C, the account lookup and debit module 310 at 370 communicates with the transaction validation or pass-through module 314 to indicate that the transaction is complete. The transaction validation or pass-through module 314 responds to the communication at 370 to communicate at 372 with the voucher application module 324. The communication 374 includes the merchant account ID, the MSISDN and the voucher ID's that have been applied. Referring again to FIGS. 10A and B, at 374, the voucher application module 324 retrieves the voucher entry 182 having the voucher ID 184 corresponding to one of the voucher ID's received in the communication 372 and reduces the entry for total number available 176 by 1. The voucher application module 324 also reduces the total number available 176 of the voucher entry 168 by 1. The reduction of the total number available 176 effectively transfers one paid for discount out of the merchant account 36.

Referring again to FIGS. 9 A, B and C, the voucher application module 324 proceeds at 376 to cancel the respective voucher ID's from the voucher ID's 204 in the consumer account 28. In one example, there may be only one voucher ID A among the voucher ID's 204 and only the single voucher ID A is cancelled. In another example, the voucher ID may have two or more numbers associated therewith, and only a single number is deducted from the numbers for voucher ID A, such that further numbers of the voucher ID are available until the number reaches zero.

Figure 11A:
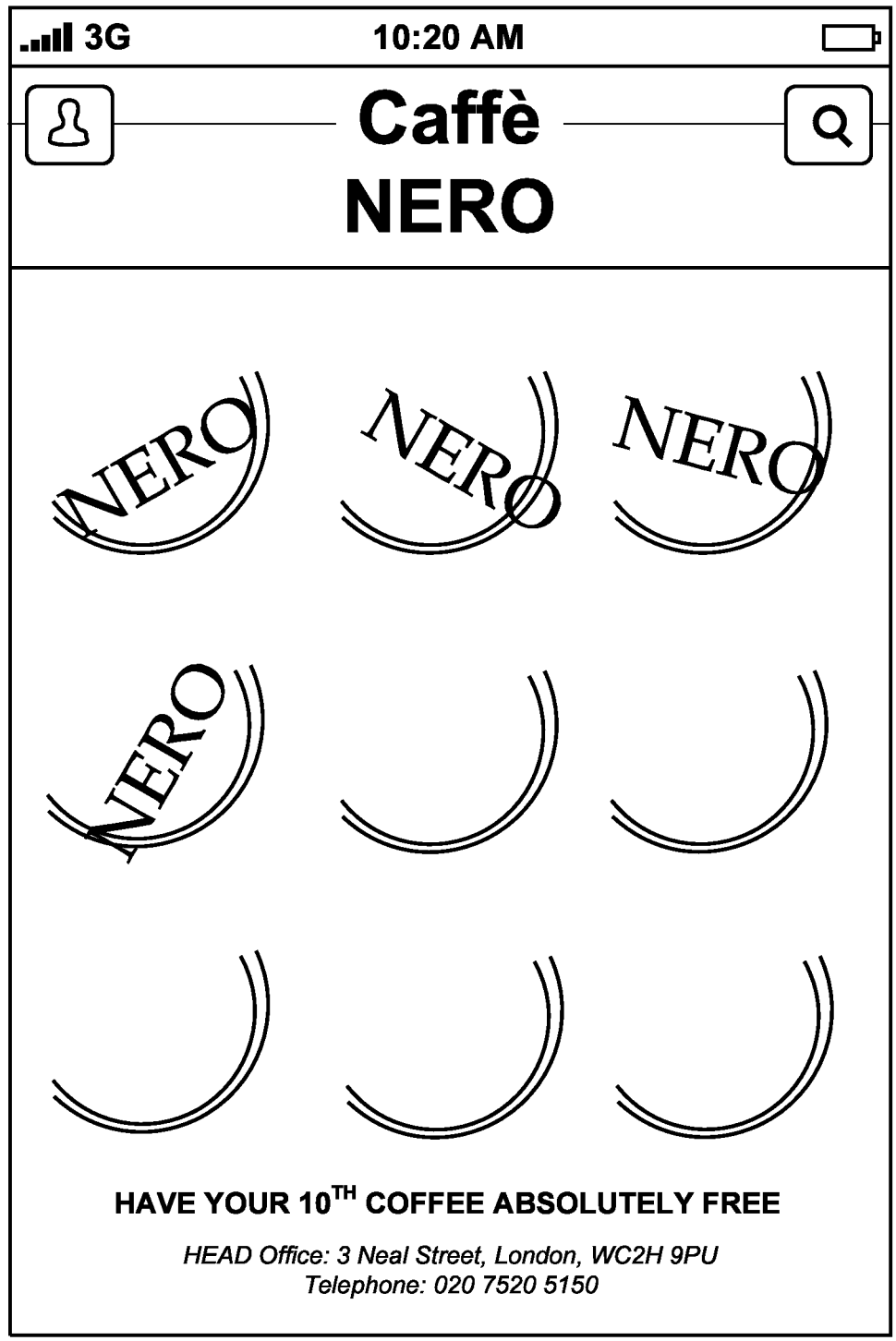
FIG. 11A is a view similar to FIG. 7K displaying a coffee stamp card.

FIG. 11A illustrates an alternative arrangement wherein the consumer is provided one free (or discounted) item after having made a series of purchases. In the present example, the view in 11A illustrates a coffee stamp card requiring nine purchases before the tenth purchase is free. The consumer has already made four purchases and has received four stamps out of a total of nine. In this example, the voucher application module 324 in FIGS. 9A, B and C at 376 proceeds to increase a number associated with the respective voucher ID 204 in the consumer account 28. The voucher ID 204 is updated to reflect that it has been used four times out of a total of nine times before it will be regarded as "valid." Before the voucher ID 204 is regarded as "valid" the discount set therein is regarded as zero. When the voucher ID 204 becomes "valid" the discount amount thereof is set to match the price of a single item.

Figure 11B:
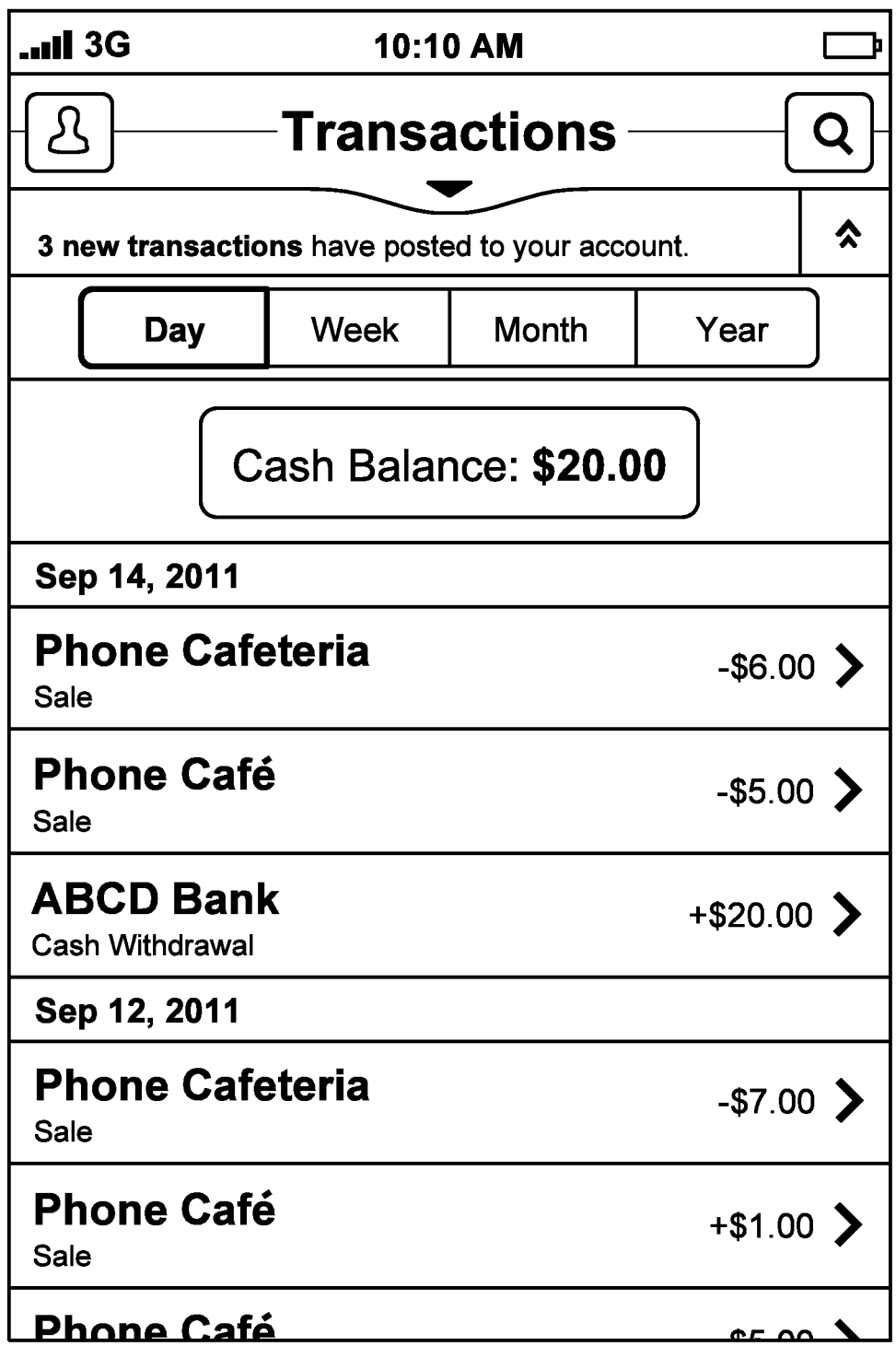
FIG. 11B is a view similar to FIG. 11A for a consumer to view transactions that have been recorded for the respective consumer account.

As mentioned, the transaction is recorded within the transactions 346. Referring again to FIG. 6A, the transactions viewing module 220 downloads the transactions 346 in FIG. 9B as transactions 380 and displays the transactions 380 as transactions 382 within the Interface 210. FIG. 11B is a view that is displayed within the Interface 210 in FIG. 6A where the consumer can view all transactions 382. The transactions include both purchases that have been made and credits that have been made to the stored value ("Cash Withdrawal").

Figure 12:
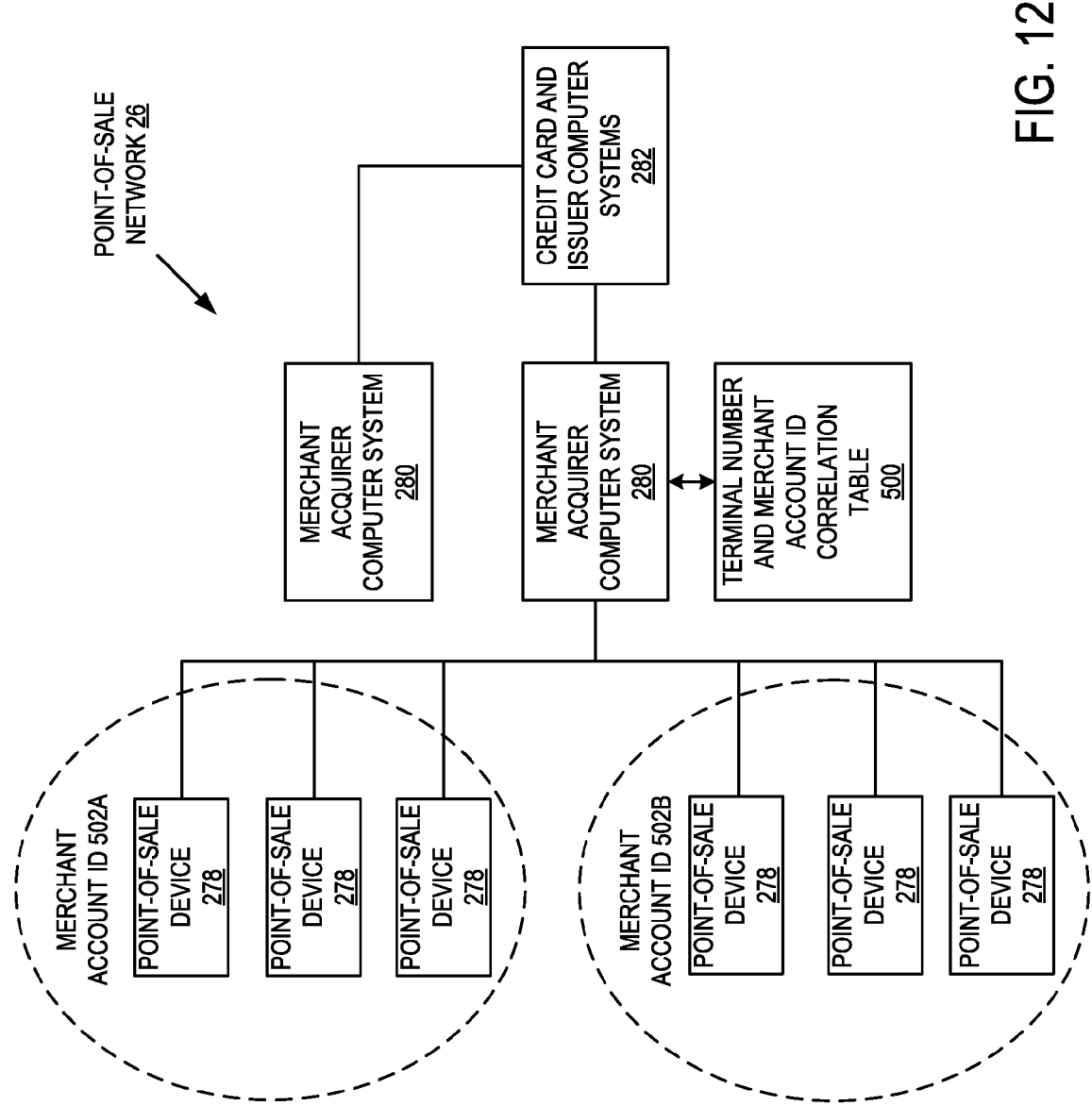
FIG. 12 is a block diagram illustrating further components of the point-of-sale network, including multiple point-of-sale devices, and a terminal number and merchant account ID correlation table.

FIG. 12 illustrates that the point of sale network 26 may have a plurality of point-of-sale devices 278 and a plurality of merchant acquirer computer systems 280. Each merchant acquirer computer system 280 may have a plurality of point-of-sale devices 278 connected thereto, although only the point-of-sale devices 278 connected to one of the merchant acquirer computer systems 280 are shown in FIG. 12.

Each one of the point-of-sale devices 278 includes a respective terminal number stored in memory. The point-of-sale devices 278 typically belong to the same operator as the operator of the merchant acquirer computer system 280 to which they are connected. The operator has insured that the terminal numbers stored in the point-of-sale devices 278 are all different, e.g., 1, 2, 3, 4, 5 and 6. The point-of-sale network 26 also includes a terminal number and merchant account ID correlation table 500 connected to one of the merchant acquirer computer systems 280. The table 500 includes the terminal numbers of the point-of-sale devices 278 and each point-of-sale device 278 is tagged with a respective merchant account ID within the table 500. The dashed lines indicate the grouping of the point-of-sale devices 278 as represented within the table 500. The point-of-sale devices having terminal numbers 1, 2 and 3 may for example be tagged with a merchant account ID 502A and the point-of-sale devices 4, 5 and 6 may be tagged with a merchant account ID 502B within the table 500.

When the merchant acquirer computer system 280 receives a charge request including a terminal number from one of the point-of-sale devices 278, the merchant acquirer computer system 280 utilizes the terminal number to look-up the respective merchant account ID 502A or 502B within the table 500 corresponding to the terminal number. By way of example, the charge request may include terminal number 4 and the merchant acquirer computer system 280 may use the table 500 to determine that terminal number 4 belongs to merchant account ID 502B. The merchant acquirer computer system 280 then passes the merchant account ID 502B to the credit card and issuer computer systems 282. Each merchant acquirer computer system 280 may have a respective terminal number and merchant account ID correlation table 500 connected thereto for purposes of identifying respective merchant account ID's.

Figure 13A:
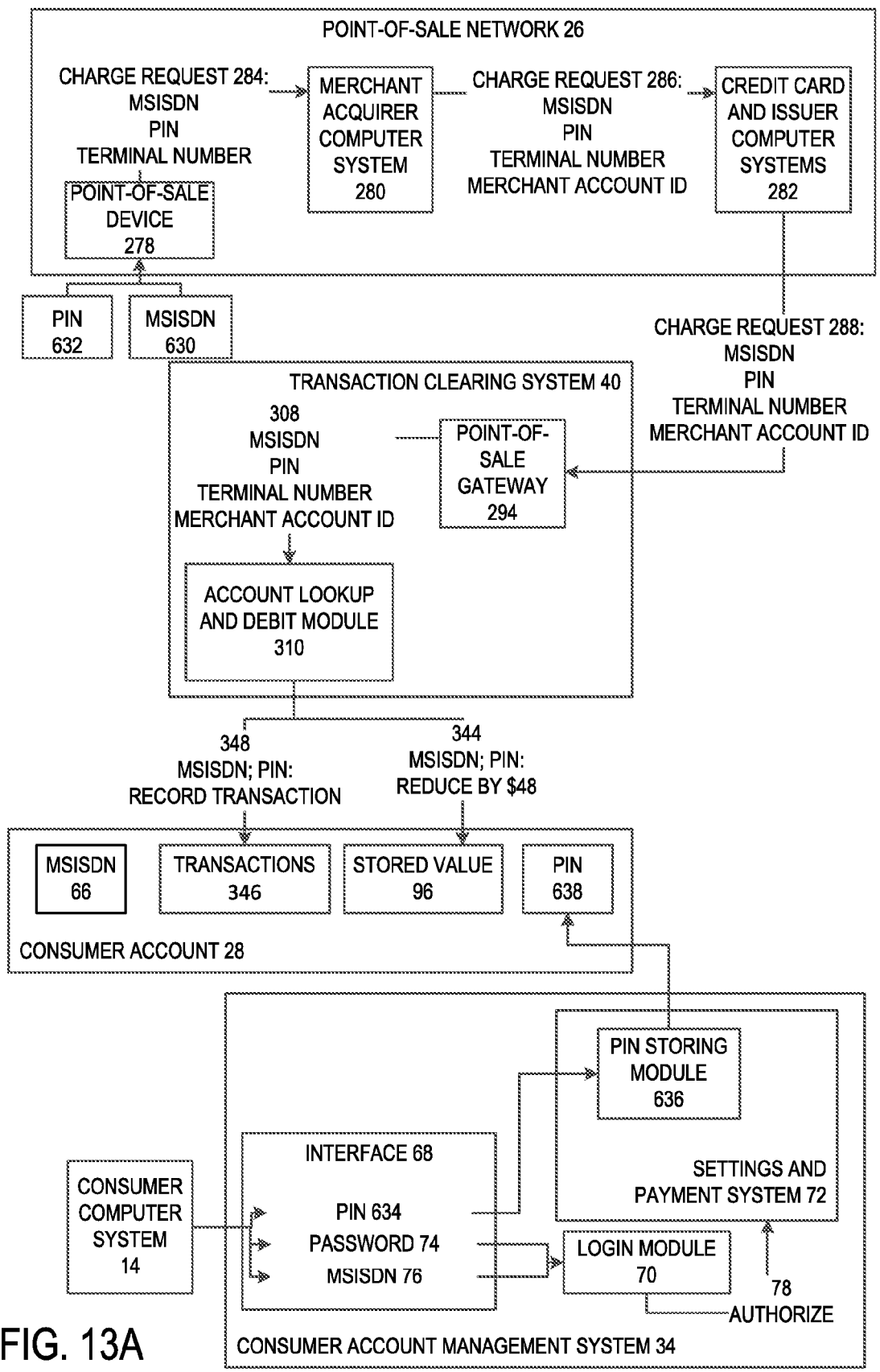
FIG. 13A illustrates an alternative embodiment wherein a "Mobile Subscriber Integrated Services Digital Network Number" (MSISDN) and Personal Identification Number (PIN) are entered into a point-of-sale device.

FIG. 13A illustrates an embodiment that uses a MSISDN 630 at a point-of-sale device 278, instead of a PAN such as the PAN 270 shown in FIG. 8. In addition to entry of the MSISDN 630 into the point-of-sale device 278, the point-of-sale device 278 also requires a Personal Identification Number (PIN) 632 to be entered into the point-of-sale device 278. The interface 68 provided to the consumer computer system 14 has a field for entry of a PIN 634. The login module 70 at 78 authorizes access for the consumer computer system 14 to the settings and payment system 72 only for purposes of the respective consumer account 28 having the MSISDN 76 matching the MSISDN 66, as hereinbefore described. A PIN storing module 636 within the settings and payment system 72 stores the PIN 634 as a PIN 638 in and associated with the respective consumer account 28 matching the login credentials.

When a purchase is made, the point-of-sale device 278 at 284 transmits the MSISDN 630, PIN 632 and terminal number of the point-of-sale device 278 to the merchant acquirer computer system 280. The merchant acquirer computer system 280 then transmits a charge request 286, including the MSISDN 630, PIN 632, terminal number and a merchant account ID to the credit card and issuer computer systems 282. The credit card and issuer computer systems 282 then transmit the charge request 288 to the point-of-sale gateway 294, including the MSISDN 630, PIN 632, terminal number and merchant account ID.

The point-of-sale gateway 294 subsequently provides the same data set at 308 to the account lookup and debit module 310. The account lookup and debit module 310 at 344 uses the MSISDN received at 308 that originated as the MSISDN 630 to identify the consumer account 28 having the MSISDN 66 matching the MSISDN 630. The account lookup and debit module 310 then compares the PIN 632 with the PIN 638. Upon favorable comparison of the PIN's 632 and 638, the account lookup and debit module 310 reduces the stored value 96 by the appropriate amount, in the present example $48. At 348, the account lookup and debit module 310 records the transaction within the transactions 346 as hereinbefore described.

FIG. 13A thus illustrates a transaction authentication with an MSISDN 630 entered at a point-of-sale device 278 and routed through a merchant acquirer computer system 280. FIG. 13A also illustrates a form of transaction authentication with a non-PAN identifier in the form of the MSISDN 630 used together with the PIN 632.

Figure 13B:
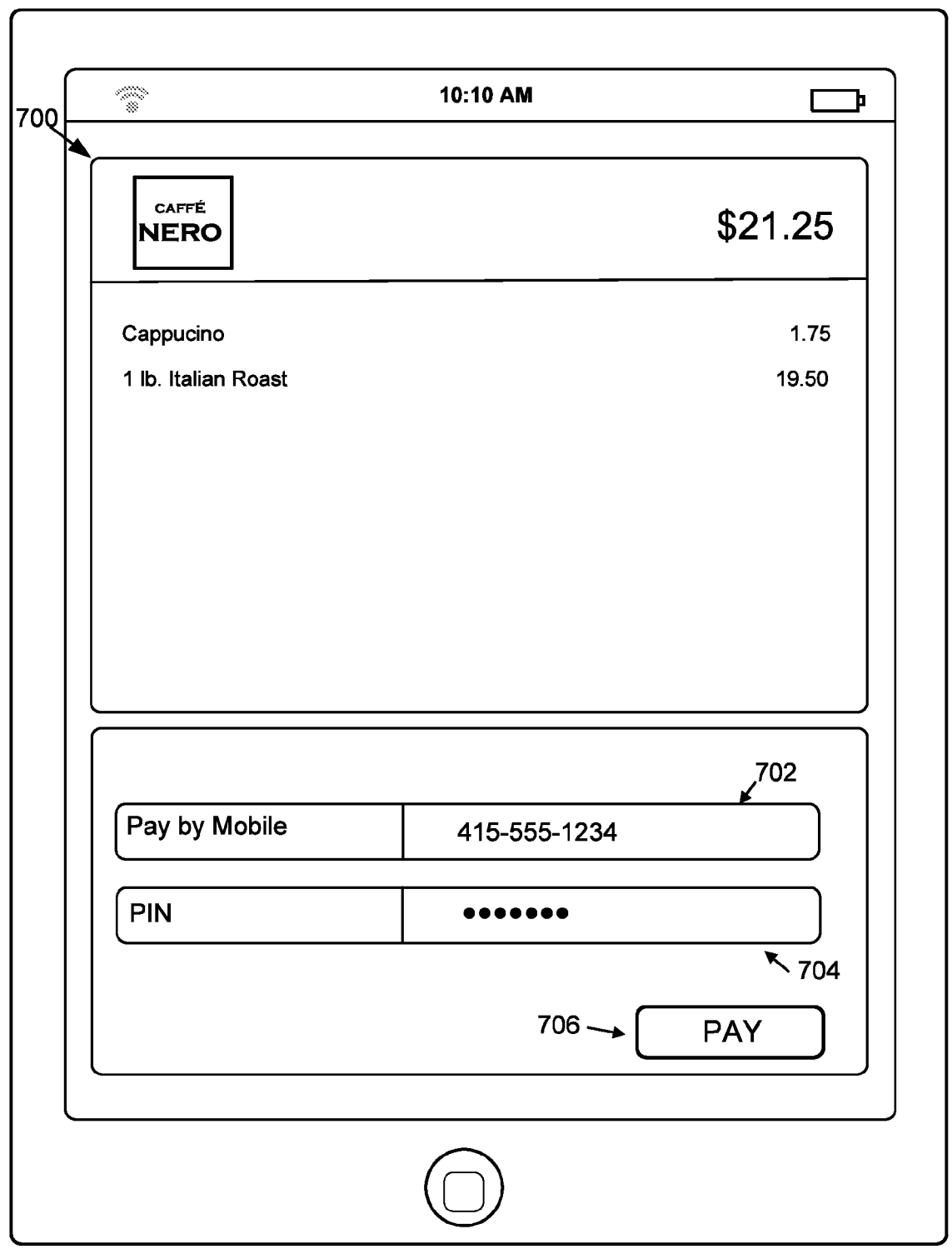
FIG. 13B is a screenshot of a point-of-sale device wherein an MSISDN and a PIN are entered for transaction authentication.

FIG. 13B illustrates a screenshot of a point-of-sale device 278 that includes an interface 700, a MSISDN field 702, a PIN field 704 and a "PAY" button 706. The MSISDN 630 is entered into the MSISDN field 702 and the PIN 632 is entered into the PIN field 704. The "PAY" button 706 is then tapped or pressed to initiate transaction authentication as hereinbefore described with reference to FIG. 13A.

Figure 13C:
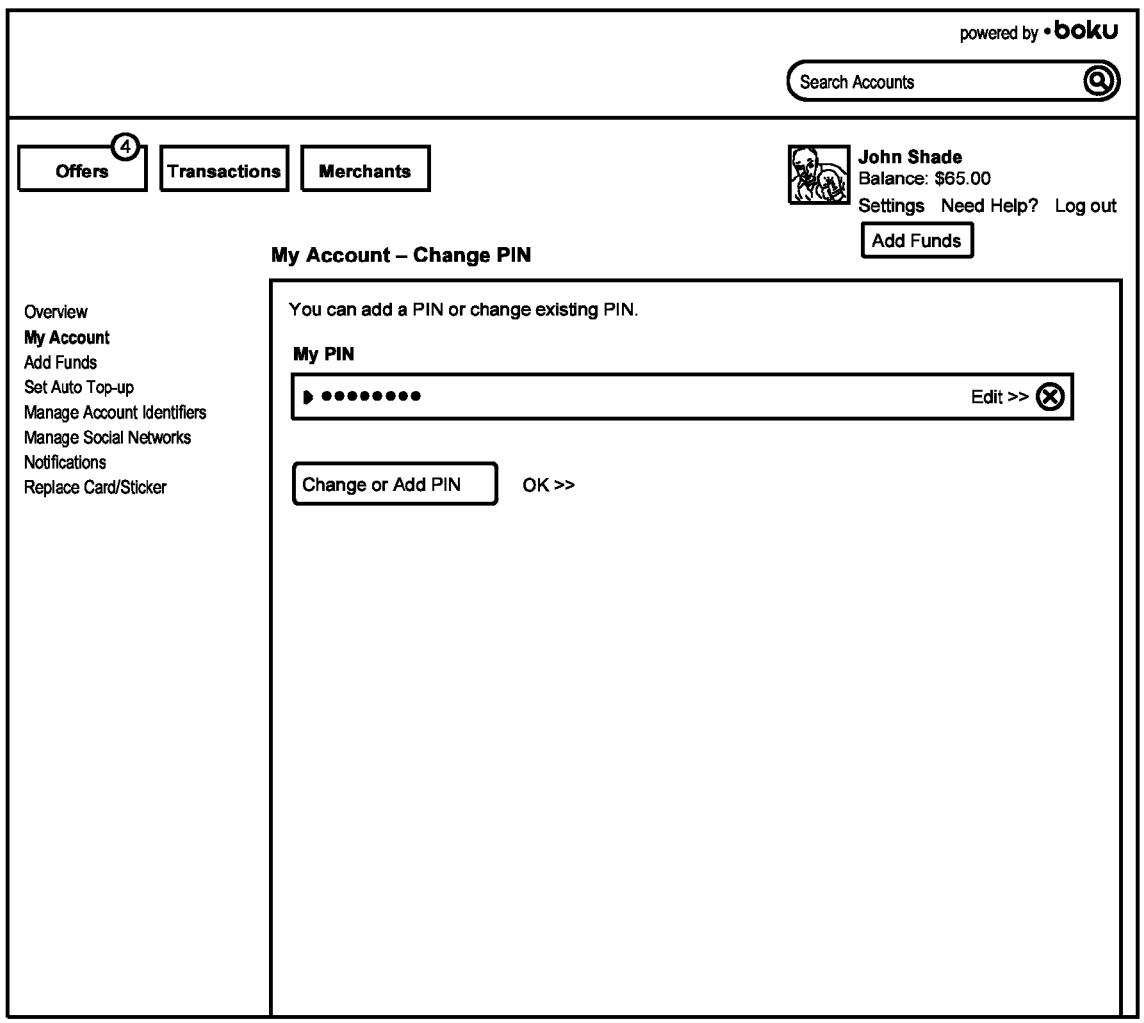
FIG. 13C is a view similar to FIG. 3A for the consumer to enter and store a PIN.

The screenshot in FIG. 13C is similar to the screenshot in FIG. 3A. The screenshot in FIG. 13C allows for the consumer to add or update a PIN 634 in the field "My PIN." The PIN 634 is stored in the PIN storing module 636 as hereinbefore described with reference to FIG. 13A.

Figure 14A:
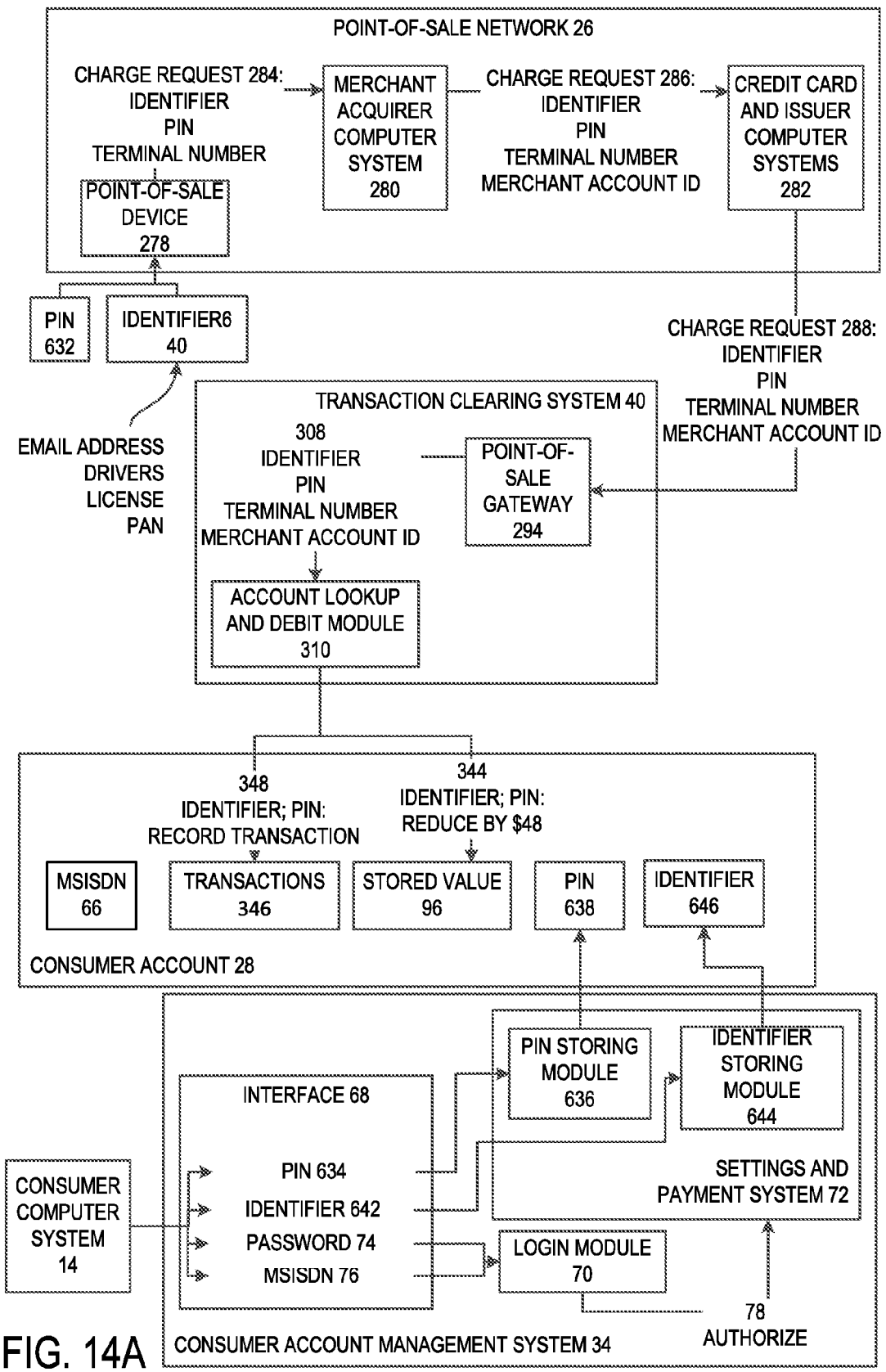
FIG. 14A is another example wherein a variable-type user-stored account identifier and a PIN can be entered into a point-of-sale device.

FIG. 14A illustrates a transaction authentication system that uses a point-of-sale device 278 that can receive an identifier 640 that is variable. For purposes of illustration in the drawings, the identifier 640 could be an email address, a driver's license number, or a PAN. Other examples are a social security number or a primary or secondary MSISDN. The point-of-sale device 278 also requires a PIN 632. The interface 68 provided to the consumer computer system 14 allows for entry of the PIN 634 and an identifier 642. The PIN storing module 636 stores the PIN 634 as the PIN 638. The settings and payment system 72 also includes an identifier storing module 644, which stores the identifier 642 as an identifier 646 within the relevant consumer account 28 to which the consumer computer system 14 is logged in using the login module 70.

The point-of sale device 278, after receiving the identifier 640 and PIN 632, transmits the charge request 284 to the merchant acquirer computer system 280, including the identifier 640, the PIN 632 and a terminal number of the point-of-sale device 278. The merchant acquirer computer system 280 then transmits the charge request 286 to the credit card and issuer computer systems 282, including the identifier 640, PIN 632, terminal number and a merchant account ID. The credit card and issuer computer systems 282 then transmit a charge request 288 including the same data set to the point-of-sale gateway 294, which at 308 provides the same data set to the account lookup and debit module 310. At 344, the account lookup and debit module 310 utilizes the identifier 640 to find the relevant consumer account 28. If the consumer has for example entered an email address as the identifier 642 which is stored as the identifier 646, the account lookup and debit module 310 will find the relevant consumer account 28 having the identifier 646 if the identifier 640 entered at the point-of-sale device 278 is the same email address. Any other identifier will not work. For example, if the consumer enters a driver's license as the identifier 640, the account lookup and debit module 310 will not find the consumer account 28 because the identifier 646 is an email address of the consumer. The account lookup and debit module 310 then reduces the stored value 96 by the relevant amount. At 348, the account lookup and debit module 310 records the transaction within the transactions 346.

FIG. 14A thus provides an example of transaction authentication with a non-PAN identifier (in the scenario where the consumer selects the identifier 640 to be an email address, driver's license, social security number or any other identifier that is not a PAN) used together with a PIN 632. FIG. 14A also describes an example of transaction authentication with a variable-type user-stored identifier 646. The type of identifier 646 can thus be changed from an email address, to a driver's license, PAN, MSISDN, social security number, etc., all having different types, and potentially having different storing lengths.

Figure 14B:
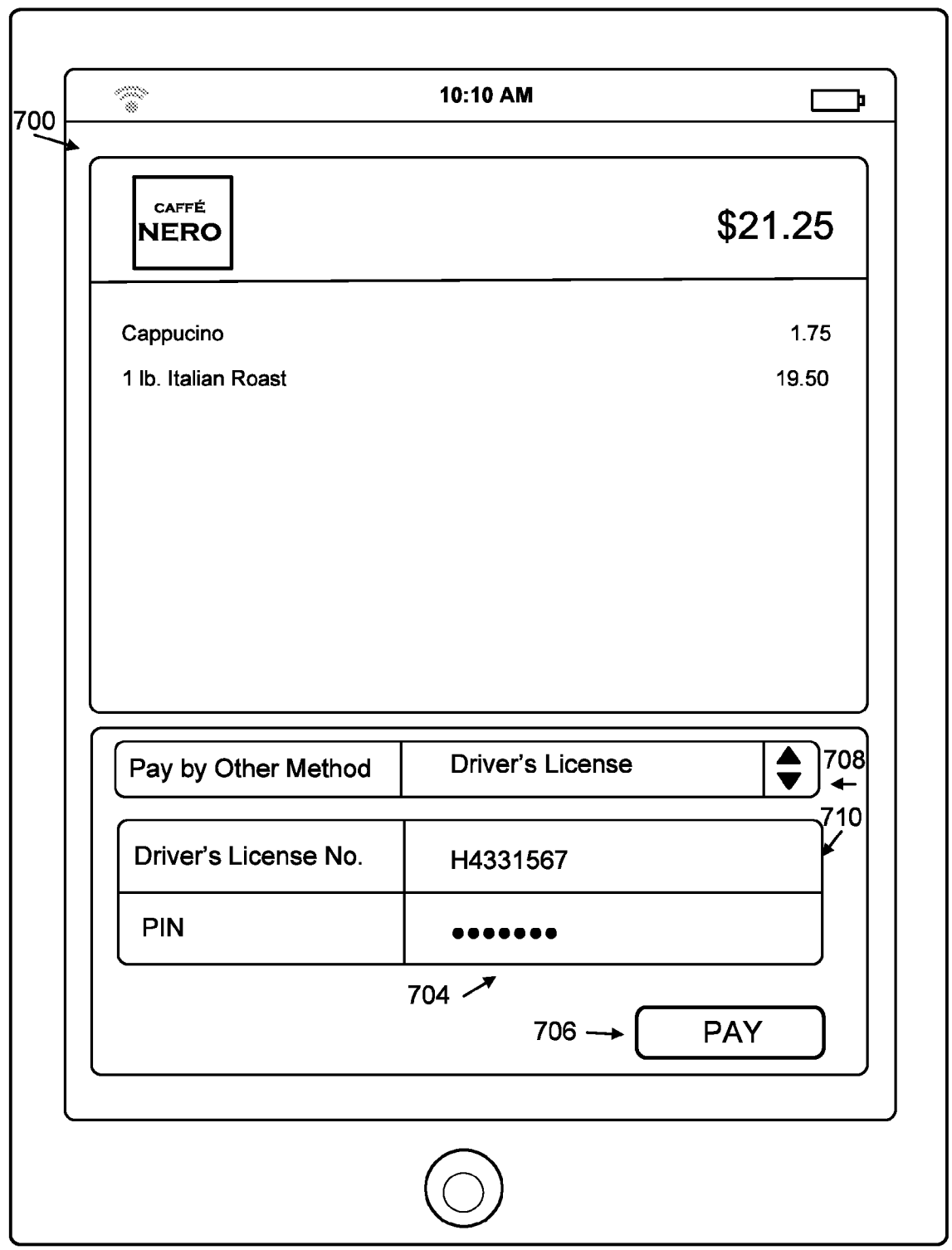
FIG. 14B is a screenshot of a point-of-sale device wherein a variable-type user-stored account identifier and a PIN are entered for transaction authentication.

FIG. 14B illustrates a screenshot displayed on the interface 700 including a variable-type user-stored identifier selector 708, a variable-type user-stored identifier field 710, the PIN field 704 and the "PAY" button 706. The consumer selects which type of identifier 640 (e.g. an email address, driver's license, social security number or any other identifier that is not a PAN) to utilize at the variable-type user-stored identifier selector 708. In the present example the consumer has selected "Driver's License" as the identifier 640. The Driver's License No. is then entered into the variable-type user-stored identifier field 710 and the PIN 632 is entered into the PIN field 704. The "PAY" button 706 is then tapped or pressed to initiate transaction authentication as hereinbefore described with reference to FIG. 14A.

Figure 14C:
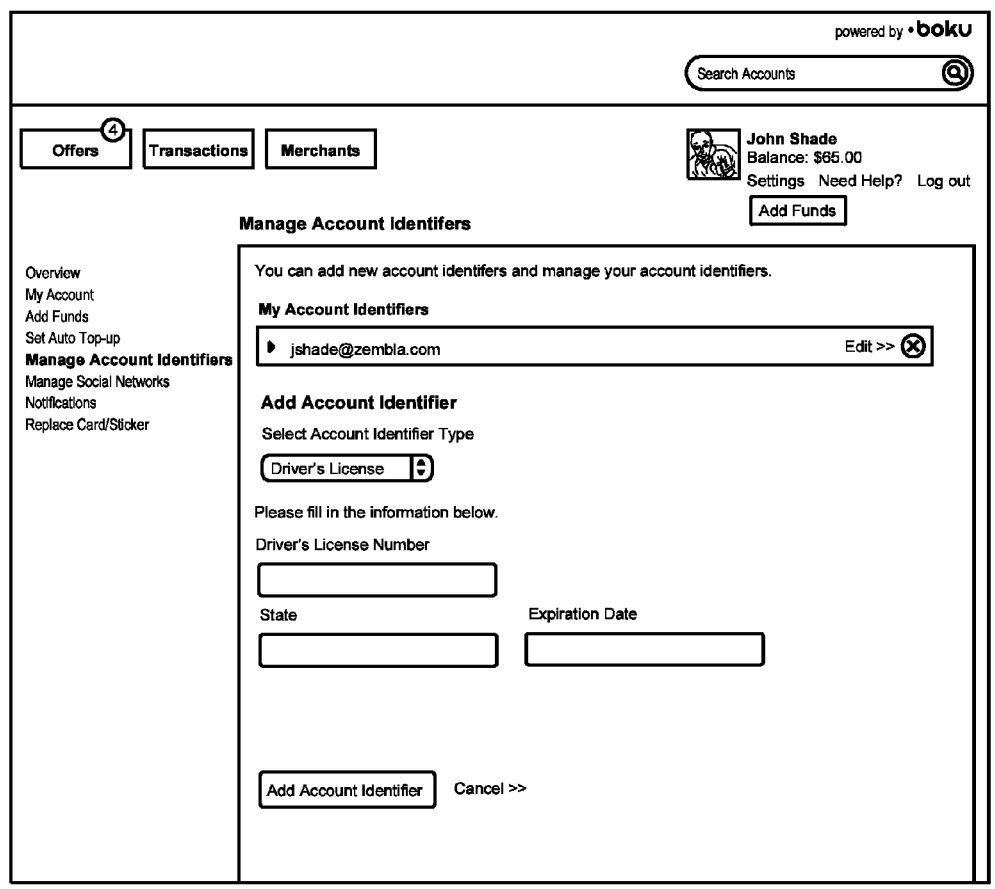
FIG. 14C is a view similar to FIG. 13C wherein the consumer can manage variable-type user-stored account identifier identifiers.

FIG. 14C is a screenshot similar to FIG. 13C wherein the consumer can manage account identifiers. One identifier 642 is already stored in the form of an email address. The consumer also has the option of adding further identifiers 642, or to edit or delete existing identifiers 642. The identifier 642 is stored in the identifier storing module 644 as hereinbefore described with reference to FIG. 14A.

Figure 15A:
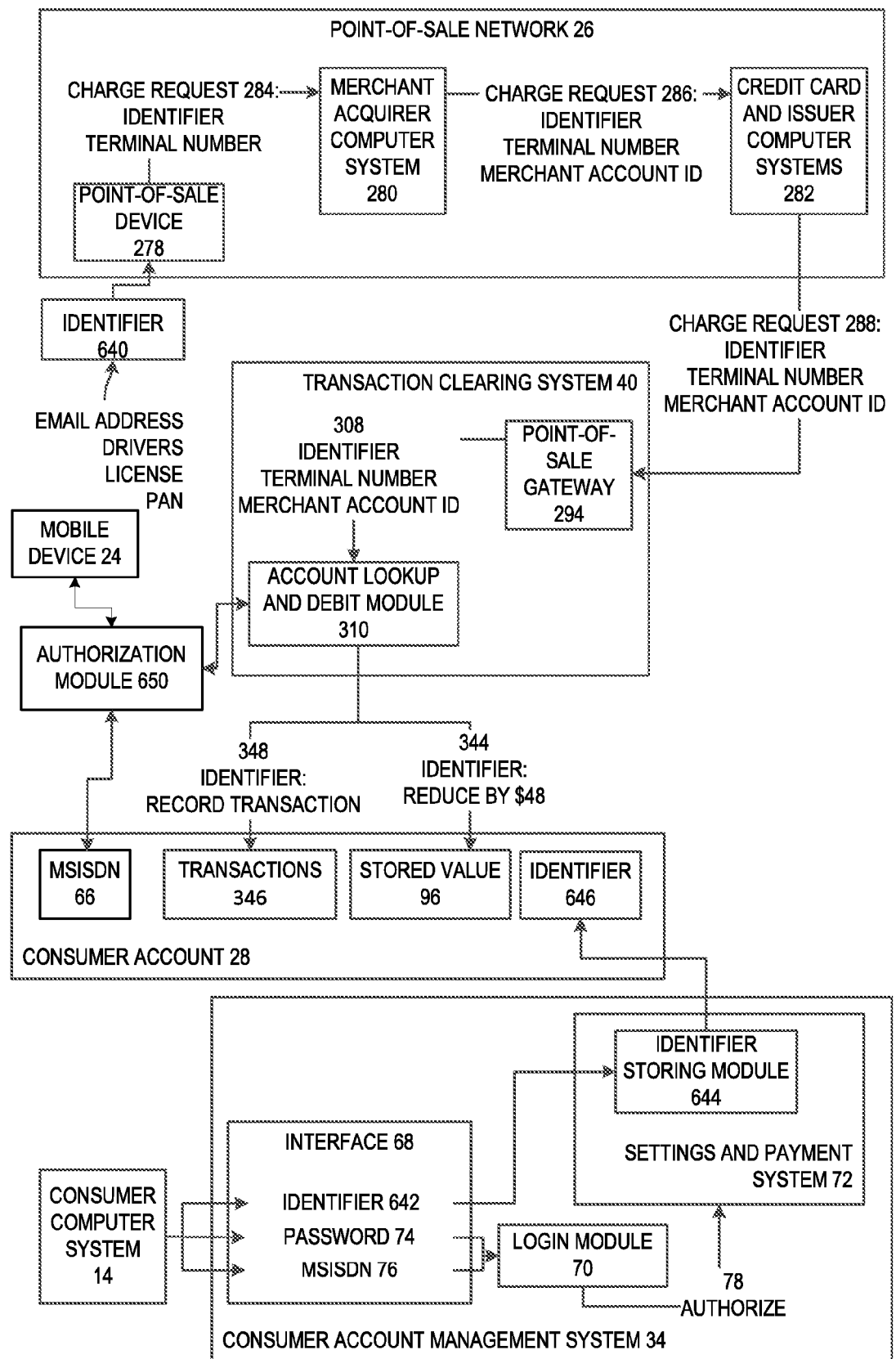
FIG. 15A is a further embodiment wherein a variable-type user-stored account identifier can be entered into a point-of-sale device and an authorization module authorizes a transaction by communicating with a consumer mobile device.

FIG. 15A illustrates an example of transaction authentication wherein the point-of-sale device 278 accepts a variable identifier 640 as described with reference to FIG. 14A and a customized or variable identifier 646 as stored within the consumer account 28 using an identifier storing module 644. The point-of-sale device 278 does not require a PIN and the settings and payment system 72 does require a PIN storing module such as the PIN storing module 636 in FIG. 14A.

The point-of-sale device 278 transmits a charge request 284 to the merchant acquirer computer system 280, including the identifier 640 and the terminal number of the point-of-sale device 278. The merchant acquirer computer system 280 then transmits the charge request 286 to the credit card and issuer computer systems 282, including the identifier 640, the terminal number of the point-of-sale device 278 and the merchant account ID. The credit card and issuer computer systems 282 then transmit the charge request 288 to the point-of-sale gateway 294, including the same data set, and the point-of-sale gateway 294 at 308 provides the same data set to the account lookup and debit module 310.

The server computer system (reference numeral 12 in FIG. 1) also includes an authorization module 650 connected to the account lookup and debit module 310. The authorization module 650 utilizes the identifier 640 to find the relevant consumer account 28 having the same identifier 646. When the relevant consumer account 28 is identified, the authorization module 650 extracts the MSISDN 66 therefrom. The authorization module 650 then transmits a Short Message Service (SMS) to the mobile device 24 requesting authorization of the transaction. The consumer at the mobile device 24 then has the option to respond to the SMS by authorizing the transaction in a return SMS or an SMS to a short code that has been identified in the original SMS. If the authorization module 650 does not receive an authorization SMS from the mobile device 24, it will not authorize the account lookup and debit module 310 to proceed with the transaction. Only if the authorization module 650 receives an authorization SMS from the mobile device 24 does it authorize the account lookup and debit module 310 to proceed with the transaction.

The account lookup and debit module 310 will not proceed with the transaction until it has received an instruction from the authorization module 650 to proceed with the transaction. At 344, the account lookup and debit module 310 utilizes the identifier 640 to find the relevant consumer account 28 and reduces the stored value 96 by the appropriate amount. At 348, the account lookup and debit module 310 records the transaction within the transactions 346.

FIG. 15A thus provides an example of transaction authentication with variable-type user-stored account identifier 646. FIG. 15A also provides an example of transaction authentication with a non-MSISDN identifier 640 and authorization by communicating with a consumer device in the form of the mobile device 24.

Figure 15B:
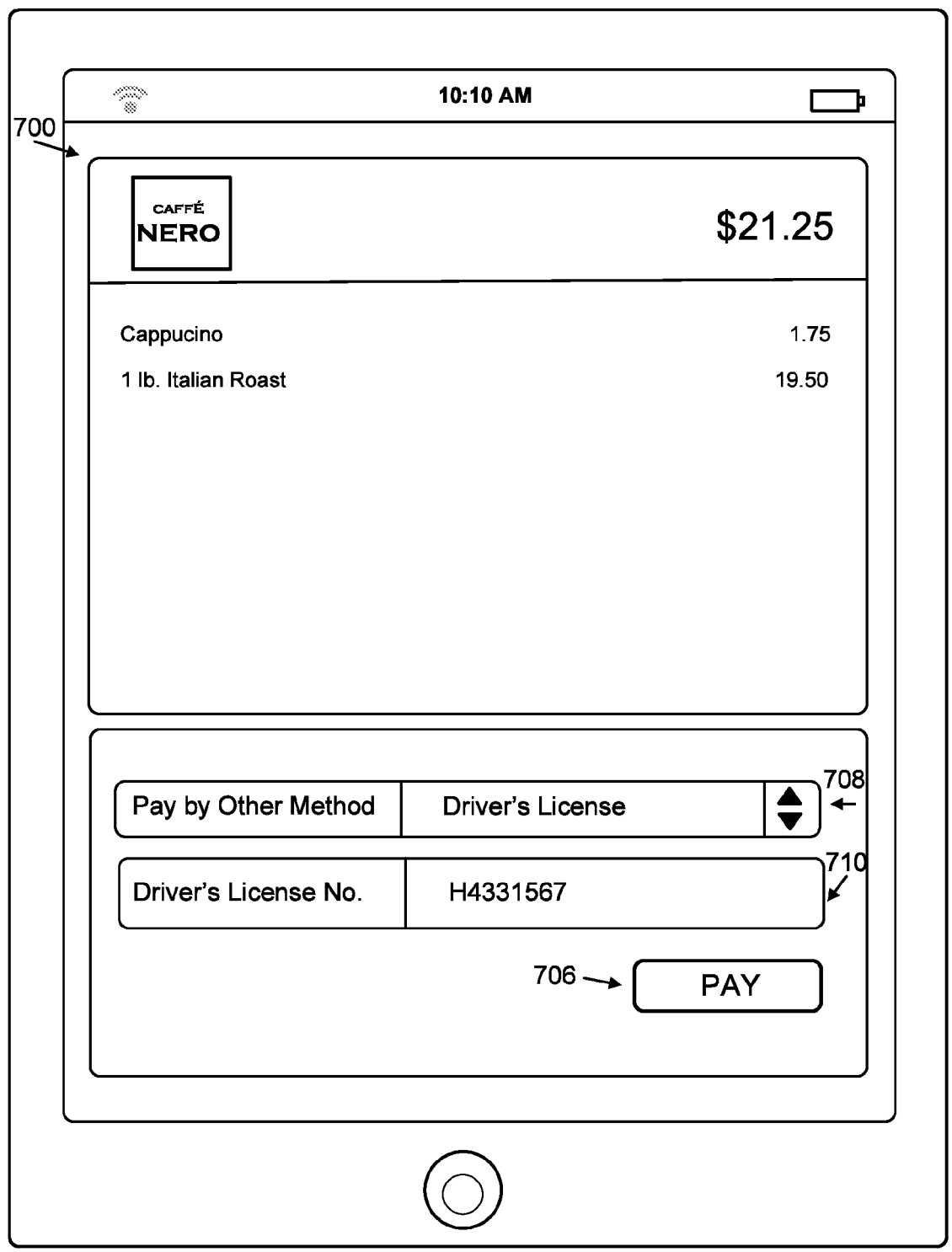
FIG. 15B is a screenshot of a point-of-sale device wherein a variable-type user-stored account identifier is entered for transaction authentication.

FIG. 15B illustrates a screenshot of the interface 700 displaying the variable-type user-stored identifier selector 708, the variable-type user-stored identifier field 710 and the "PAY" button 706. The consumer selects which type of identifier 640 (e.g. an email address, driver's license, social security number or any other identifier that is not a PAN) to utilize at the variable-type user-stored identifier selector 708. In the present example the consumer has selected "Driver's License" as the identifier 640. The Driver's License No. is then entered into the variable-type user-stored identifier field 710. The "PAY" button 706 is then tapped or pressed to initiate transaction authentication as hereinbefore described with reference to FIG. 15A.

Figure 15C:
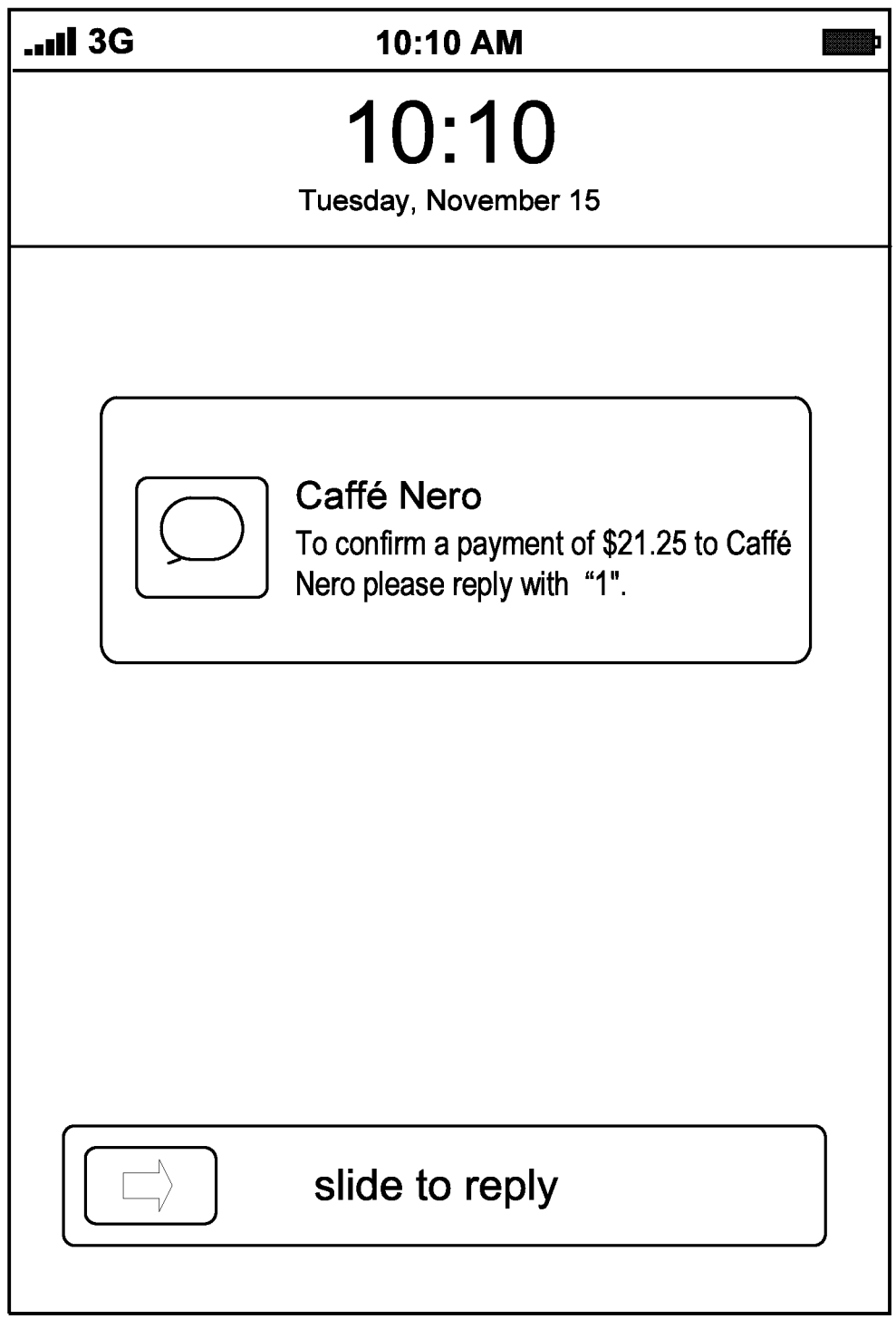
FIG. 15C is a screenshot of an SMS message communicated by the authorization module to the consumer mobile device.

FIG. 15C is a screenshot of an authorization SMS message that is displayed on the interface 210 of the mobile device 24 in FIG. 6A as described with reference to FIG. 15A.

Figure 16A:
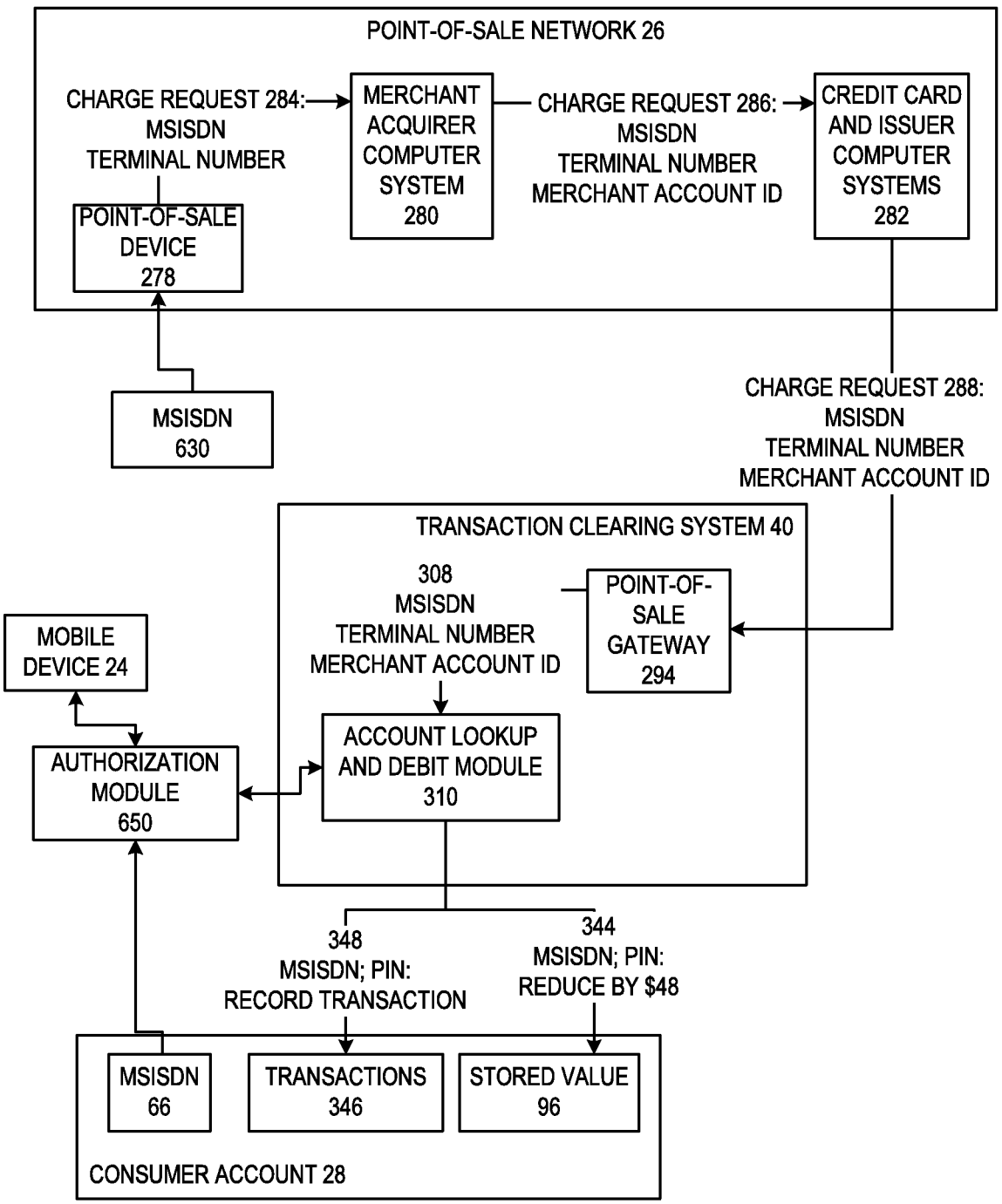
FIG. 16A is a further embodiment wherein a MSISDN can be entered into a point-of-sale device and authorization module communicates with a consumer mobile device to authorize the transaction.

FIG. 16A is an example where the point-of-sale device 278 can receive a MSISDN 630, but does not require a PIN. Because a MSISDN 66 is already stored in the consumer account 28 when it is established, there is no need for an additional identifier such as the identifier 646 in FIGS. 14A and 15A to be stored within the consumer account 28 of FIG. 16A. The point-of-sale device 278 transmits a charge request 284 to the merchant acquirer computer system 280, including the MSISDN 630 and the terminal number of the point-of-sale device 278. The merchant acquirer computer system 280 then transmits the charge request 286 to the credit card and issuer and computer systems 282, including the MSISDN 630, the terminal number of the point-of-sale device 278 and the merchant account ID. The credit card and issuer and computer systems 282 then transmit a charge request 288 including the same data set to the point-of-sale gateway 294, which at 308 provides the same data set to the account lookup and debit module 310. The authorization module 650 then uses the MSISDN 630 to identify the consumer account 28 having the same MSISDN 66. The authorization module 650 then uses the MSISDN 630 to send an SMS to the mobile device 24 requesting authorization of the transaction. The authorization module 650 then determines whether an authorization SMS has been received from the mobile device 24 and subsequently instructs the account lookup and debit module 310 to proceed with the transaction. The account lookup and debit module 310 at 344 uses the MSISDN 630 to identify the relevant consumer account 28 and reduces the stored value 96 and at 348 records the transaction within the transactions 346.

FIG. 16A thus provides an example of transaction authentication with an MSISDN 630 entered at a point-of-sale device 278 and routed through a merchant acquirer computer system 280.

Figure 16B:
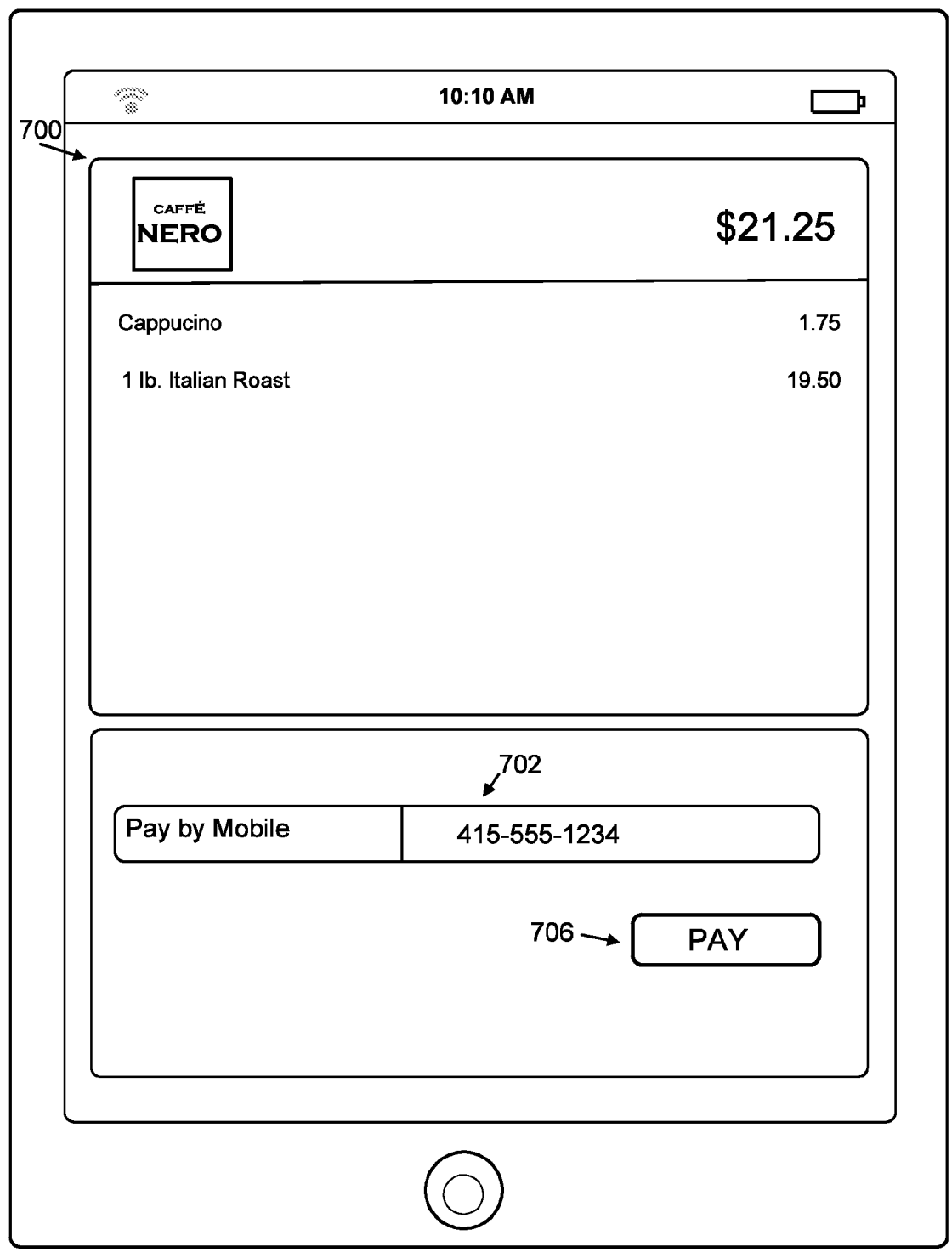
FIG. 16B is a screenshot of a point-of-sale device wherein an MSISDN is entered for payment.

FIG. 16B illustrates a screenshot of the interface 700 displaying the MSISDN field 702 and the "PAY" button 706. The consumer enters the MSISDN 630 into the MSISDN field 702. The "PAY" button 706 is then tapped or pressed to initiate transaction authentication as described with reference to FIG. 16A. An authorization SMS message as shown in FIG. 15C is then transmitted and displayed on the interface 210 of the mobile device 24 as described with reference to FIG. 16A.

In FIGS. 13A, 14A, 15A and 16A, the stored value 96 of the consumer account 28 is reduced. It should however be understood that the payment sources 122 or 124 in FIG. 9A may alternatively be used for purposes of pass-through payment using the pass through payment system 44 in conjunction with the teachings of FIGS. 9A-D.

Figure 17:
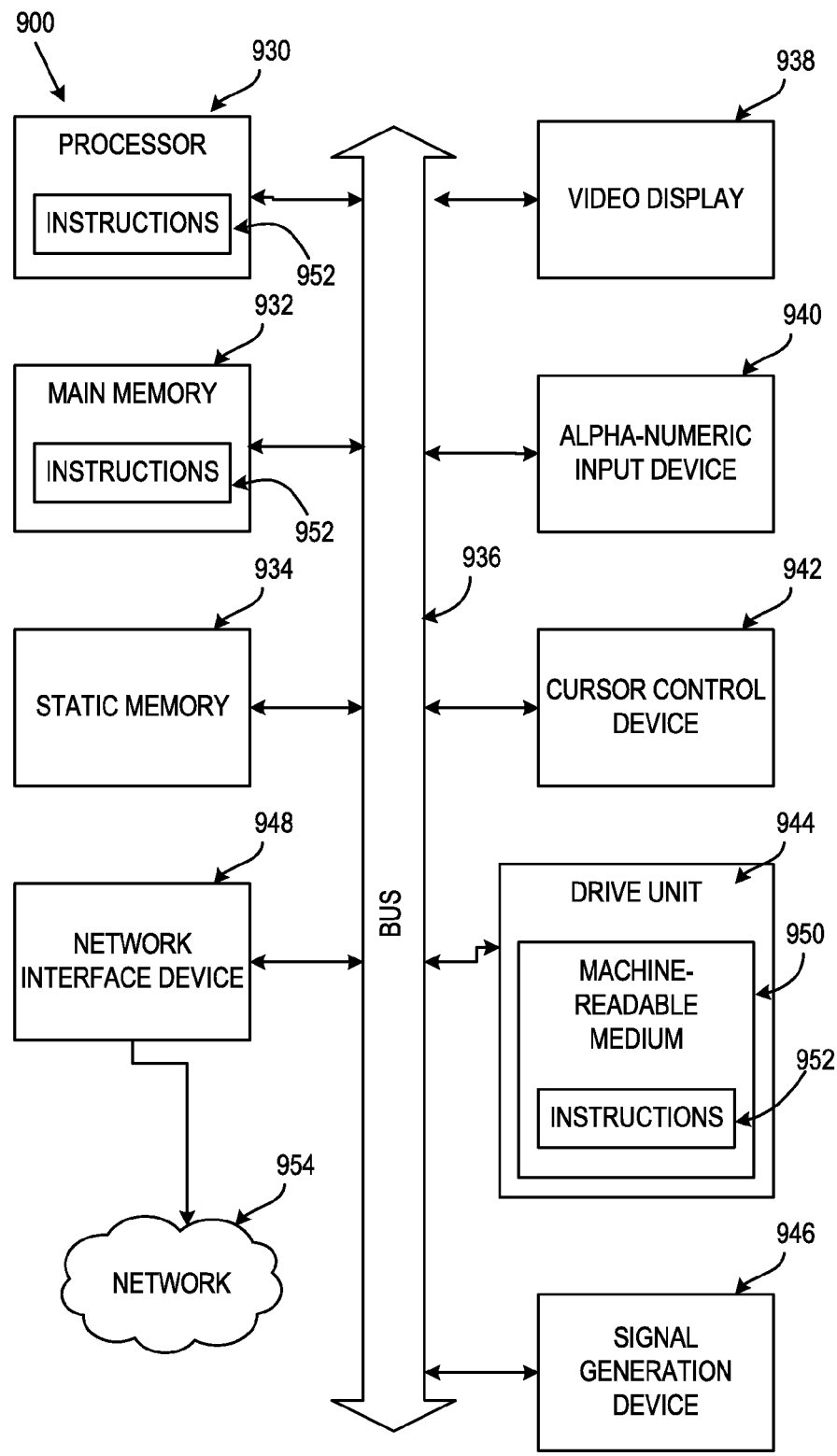
FIG. 17 is a block diagram of a machine in the form of a computer system forming part of the transactions network.

FIG. 17 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Figure 18:
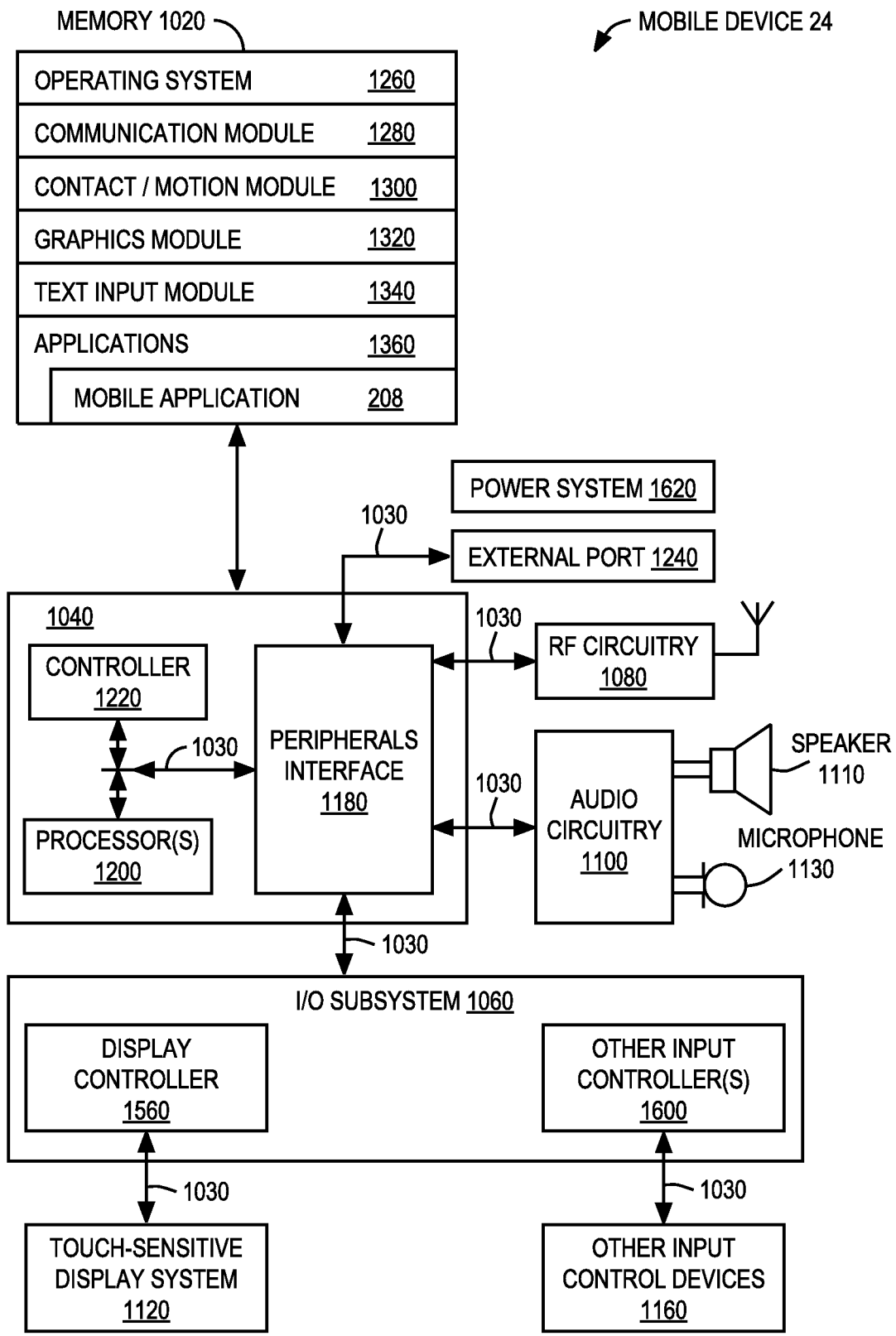
FIG. 18 is a block diagram of the mobile device illustrating SmartPhone features thereof.

FIG. 18 is a block diagram illustrating the mobile device 24, illustrating a touch-sensitive display 1120 or a "touch screen" for convenience. The mobile device 24 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 18 may be implemented in hardware, software or a combination of both hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the mobile device 24, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the mobile device 24 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the mobile device 24. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the mobile device 24, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the mobile device 24 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The mobile device 24 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A computer system for managing electronic transactions, comprising:
    a server computer system including:
    a processor;
    a computer-readable medium connected to the processor;
    a network interface device connected to the processor; and
    a set of instructions on the computer-readable medium, the set of instructions being executable by the processor and including:
        a data store;
        a plurality of consumer accounts stored in the data store;

a login module receiving login information from a consumer device over the network interface device;

an identifier storing module receiving the first consumer account identifier from the consumer device, and storing the first consumer account identifier in association with the consumer account, wherein the first consumer account identifier is selectably and interchangeably storable as one of at least first and second types of identifiers and the storing by the consumer device of the first consumer account identifier only being permitted upon successful login based on the login information;

a communication and routing module that receives a charge request over the network interface device, the charge request including an amount and a second consumer account identifier and identifies a selected one of the consumer accounts by associating one of the first consumer account identifiers with the second consumer account identifier, wherein if the first consumer account identifier is stored as the first type of consumer account identifier then the second consumer account identifier only identifies the first consumer account identifier if the second consumer account identifier has the first type but not if the second consumer account identifier has the second type; and a transaction processing system that processes the charge request based on an account detail of the selected consumer account.

2. The computer system of claim 1, wherein the two types of identifiers have different lengths, wherein the first consumer account identifier is variable to be one of at least two of a PAN, an MSISDN, an email address, a social security number, and a driver's license number.

3. The computer system of claim 1, wherein the second consumer account identifier is not a PAN.

4. The computer system of claim 3, wherein each consumer account has a respective first PIN and the charge request includes a second PIN, the processing of the charge request only being permitted upon a favorable comparison of the first PIN and the second PIN.

5. The computer system of claim 3, wherein the second consumer account identifier is not an MSISDN.

6. The computer system of claim 5, further comprising:
an authorization module transmitting an authorization request over the network interface device to a consumer device and receiving a response to the authorization request over the network interface device from the consumer device, wherein the charge request is processed if the response is an authorization response.

7. The computer system of claim 6, wherein the authorization module extracts an MSISDN from the consumer account, wherein the consumer device is a mobile phone having the MSISDN that is extracted from the account to contact the mobile phone.

8. The computer system of claim 1, further comprising:
a point-of-sale device receiving the second consumer account identifier.

9. The computer system of claim 8, wherein the point-of-sale device transmits the charge request to a merchant acquirer computer system, which routes the charge request to the processor.

10. The computer system of claim 1, wherein the set of instructions further includes:
a stored value in the consumer account;
a funding module receiving a top-up instruction from a consumer account funding infrastructure, and increasing the stored value based on the top-up instruction, wherein the transaction processing system includes:
an account lookup and debit module that reduces the stored value based on the amount.

11. The computer system of claim 10, wherein the transaction processing system includes:
a transaction validation module that compares the stored value with the amount, wherein the account lookup and debit module only reduces the stored value with the amount, wherein the stored value is (i) only reduced if the stored value is at least as much as the amount and (ii) not reduced if the stored value is less than the amount, and transmits a confirmation over the network interface device (i) to accept the charge request only reduced if the stored value is at least as much as the amount and (ii) to deny the charge request if the stored value is less than the amount.

12. The computer system of claim 1, wherein the set of instructions further includes:
a payment source storing module storing a plurality of payment sources associated with the respective consumer account having the respective consumer account identifier; and
a payment source selector set upon receiving a payment source selection over the network interface device to indicate a selected one of the payment sources, the payment source selector indicating a selected one of the payment sources based on the payment source selection, the transaction processing system determining a payment source selected with the payment source selector, wherein the charge request is processed based on the payment source selected by the payment source selector.

13. The computer system of claim 12, wherein a first of the payment sources is a stored value in the consumer account, wherein the charge request is processed by reducing the stored value if the payment selector is set to use the first payment source.

14. The computer system of claim 13, wherein a second of the payment sources includes routing information for a bank account, wherein the charge request is processed by transmitting a pass-through request over the network interface device based on the routing information if the payment selector is set to use the second payment source.

15. The computer system of claim 14, wherein the transaction processing system includes:
a transaction bypass module that either (i) reduces the stored value if the payment selector is set to use the first payment source, or (ii) transmits the pass-through request over the network interface device based on the routing information if the payment selector is set to use the second payment source.

16. The computer system of claim 12, wherein the instructions further comprise:
a login module receiving login information from a user computer system over the network interface device, access to the payment source storing module by the user computer system to store the plurality of payment sources only being permitted upon successful login based on the login information.

17. A computer-based method of managing electronic transactions, further comprising:
storing, by a processor, a plurality of consumer accounts in a data store;
receiving, by the processor, login information from a consumer device over the network interface device;
receiving, by the processor, the first consumer account identifier from the consumer device;

storing the first consumer account identifier in association with the consumer account, wherein the first consumer account identifier is selectably and interchangeably storable as one of at least first and second types of identifiers and the storing by the consumer device of the first consumer account identifier only being permitted upon successful login based on the login information;

receiving, by the processor, a charge request over a network interface device, the charge request including an amount and a second consumer account identifier;

identifying, by the processor, a selected one of the consumer accounts by associating one of the first consumer account identifiers with the second consumer account identifier, wherein if the first consumer account identifier is stored as the first type of consumer account identifier then the second consumer account identifier only identifies the first consumer account identifier if the second consumer account identifier has the first type but not if the second consumer account identifier has the second type; and processing, with the processor, the charge request based on an account detail of the selected consumer account.

18. The method of claim 17, wherein the two types of identifiers have different lengths.

19. The method of claim 17, wherein the first consumer account identifier is variable to be at least two of a PAN, an MSISDN, an email address, a social security number, and a driver's license number.

20. The method of claim 17, wherein the second consumer account identifier is not a PAN.

21. The method of claim 20, wherein each consumer account has a respective a first PIN and the charge request includes a second PIN, the processing of the charge request only being permitted upon a favorable comparison of the first PIN and the second PIN.

22. The method of claim 20, wherein the second consumer account identifier is not an MSISDN.

23. The method of claim 22, further comprising: transmitting, by the processor, an authorization request over the network interface device to a consumer device; and receiving, by the processor, a response to the authorization request over the network interface device from the consumer device, wherein the charge request is processed if the response is an authorization response.

24. The method of claim 23, further comprising:
extracting an MSISDN from the consumer account, wherein the consumer device is a mobile phone having the MSISDN that is extracted from the account to contact the mobile phone.

25. The method of claim 17, further comprising:
receiving the second consumer account identifier in a point-of-sale device.

26. The method of claim 24, further comprising: transmitting, with the point-of-sale device, the charge request to a merchant acquirer computer system, which routes the charge request to the processor, further comprising:
saving, with the processor, a stored value in the consumer account;
receiving, with the processor, a top-up instruction from a consumer account funding infrastructure;
increasing, with the processor, the stored value based on the top-up instruction;
reducing, with the processor, the stored value based on the amount, further comprising:
comparing, with the processor, the stored value with the amount, wherein the stored value is (i) only reduced if the stored value is at least as much as the amount and (ii) not reduced if the stored value is less than the amount; and
transmitting, with the processor, a confirmation over the network interface device (i) to accept the charge request only reduced if the stored value is at least as much as the amount and (ii) to deny the charge request if the stored value is less than the amount.

27. The method of claim 17, further comprising:
storing, with the processor, a plurality of payment sources associated with the respective consumer account having the respective consumer account identifier;
receiving, with the processor, a payment source selection over the network interface device to indicate a selected one of the payment sources;
setting, with the processor, a payment source selector to indicate a selected one of the payment sources based on the payment source selection; and
determining, with the processor, a payment source selected with the payment source selector, wherein the charge request is processed based on the payment source selected by the payment source selector.

28. The method of claim 26, wherein a first of the payment sources is a stored value in the consumer account, wherein the charge request is processed by reducing the stored value if the payment selector is set to use the first payment source.

29. The method of claim 27, wherein a second of the payment sources includes routing information for a bank account, wherein the charge request is processed by transmitting a pass-through request over the network interface device based on the routing information if the payment selector is set to use the second payment source.

30. The method of claim 26, further comprising: receiving, with the processor, login information from a user computer system over the network interface device, the storing by the user computer system of the plurality of payment sources only being permitted upon successful login based on the login information.

* * * * *